United States Patent
Badita et al.

(10) Patent No.: US 12,064,675 B2
(45) Date of Patent: Aug. 20, 2024

(54) SWIM IN PLACE POOL/SPA

(71) Applicant: HYDROPOOL INC., Mississauga (CA)

(72) Inventors: Nicolae Badita, Brampton (CA); Douglas Robert Wyatt, Jr., Beamsville (CA)

(73) Assignee: HYDROPOOL INC., Mississauga (CA)

( * ) Notice: Subject to any disclaimer, the term of this patent is extended or adjusted under 35 U.S.C. 154(b) by 275 days.

(21) Appl. No.: 17/574,984

(22) Filed: Jan. 13, 2022

(65) Prior Publication Data

US 2022/0219059 A1   Jul. 14, 2022

Related U.S. Application Data

(60) Provisional application No. 63/136,828, filed on Jan. 13, 2021.

(51) Int. Cl.
  *A63B 69/12* (2006.01)
(52) U.S. Cl.
  CPC .................................. *A63B 69/125* (2013.01)
(58) Field of Classification Search
  CPC .............. A63B 69/125; A63B 2220/13; A63B 2024/0025
  USPC ................................ 4/492, 904, 541.1, 541.3
  See application file for complete search history.

(56) References Cited

U.S. PATENT DOCUMENTS

| | | | |
|---|---|---|---|
| 2005/0005349 A1* | 1/2005 | Gardenier | A61H 33/6063 4/541.1 |
| 2013/0237375 A1 | 9/2013 | Hyland | |
| 2021/0322849 A1* | 10/2021 | van der Weide | A63B 69/125 |
| 2021/0327316 A1* | 10/2021 | Evans | A63B 69/125 |

FOREIGN PATENT DOCUMENTS

| | | |
|---|---|---|
| EP | 3 188 482 A1 | 7/2017 |
| FR | 2 822 183 A1 | 9/2002 |
| JP | H01 170481 A | 7/1989 |

OTHER PUBLICATIONS

J.M. Kim, J.H. Song, S.K. Sul, "A New Robust SPMSM Control to Parameter Variations in Flux Weakening Region", IEEE IECON, vol. 2, 1996.

Y.S. Kim, Y.K. Choi and J.H. Lee, "Speed sensorless vector control for permanent-magnet synchronous motors based on instantaneous reactive power in the wide-speed region," IEE Proc-Electr. Power Appl., vol. 152, No. 5, Sep. 2005.

(Continued)

*Primary Examiner* — Tuan N Nguyen
(74) *Attorney, Agent, or Firm* — Bennett Jones LLP; Salvatore F. Barbieri; Lorelei G. Graham

(57) ABSTRACT

A swim in place system and method are provided. The system comprises a swim in place pool, at least one sensor, at least one pump associated with said at least one sensor, at least one processor, and a memory comprising instructions which when executed by the at least one processor configure the at least one processor to perform the method. The method comprises receiving object location data from at least one sensor, and actuating the at least one pump associated with the at least one sensor when the object is positioned inside a set perimeter within said swim in place pool. The object positioned in a swim in place pool.

18 Claims, 54 Drawing Sheets

(56) References Cited

OTHER PUBLICATIONS

S. Morimoto, M. Sanada, K. Takeda, "Widespread Operation of Interior Permanent Magnet Synchronous Motors with High-Performance Current Regulator," IEEE Trans. Ind. Applicat., vol. 30, Jul./Aug. 1994, Abstract.

N. Bianchi, S. Bologani, M. Zigliotto "High-Performance PM Synchronous Motor Drive for an Electrical Scooter", IEEE Trans. on Industry Applications, vol. 37, No. 5, Sep./Oct. 2001.

T. Liu, G. Chen, S. Li, "Application of Vector Control Technology for PMSM Used in Electric Vehicles" The Open Automation and Control Systems Journal, 2014, vol. 6.

Y. Liu, Z. Zhang, "PMSM Control System Research Based on Vector Control", International Conference on Information Sciences, Machinery, Materials and Energy, 2015.

R. Krishnan, "Electric Motor Drives Modelling, Analysis, and Control", Prentice Hall, Inc., New Jersey, United States of America, 2001.

National Instruments Corp., "NI Hardware Encoder Measurements: How-To Guide", Updated 2024, https://knowledge.ni.com/KnowledgeArticleDetails?id=kA03q000000x1riCAA&l=en-CA.

Microsemi, "Park, Inverse Park & Clarke, Inverse Clarke Transformations MSS Software Implementations User Guide", 2013.

D.S. Maric, S. Hiti et al., "Two flux weakening schemes for surface mounted permanent-magnet synchronous drives. Design and transient response considerations," in Proc. ISIE, 1999, Abstract.

S.M. Dawood, S.H. Majeed, H.J. Nekad, "PID Controller Based Multiple (Master/Slaves) Permanent Magnet Synchronous Motor Speed Control", Iraq J. Electrical and Electronics Engineering, vol. 11, No. 2, 2015.

B.K. Bose, "Modern Power Electronics and AC Drives", Prentice Hall PTR, New Jersey, United States of America, 2002.

C. Lovescu, S. Rao, Texas Instruments, "The fundamentals of millimeter wave sensors", May 2017.

P. Vas, "Sensorless Vector and Direct Torque Control", Oxford University Press, 1998.

M.E. Haque, L. Zhong, M.F. Rahman, "Improved trajectory control for an interior permanent magnet synchronous motor drive with extended operating limit", The University of New South Wales, 2002.

O. Wallmark, "On control of permanent-magnet synchronous motors in hybrid-electric vehicle applications", Chalmers University of Technology, Goteborg, Sweden, 2004.

C. Ong, "Dynamic Simulations of Electric Machinery: Using MATLAB/SIMULINK", Prentice Hall PTR, New Jersey, United States of America, 1998.

F. Yang, A. Taylor, et al., "Using d-q Transformation to vary the switching frequency for an Interior Permanent Magnet Synchronous Motor Drive Systems", IEEE Transactions on Transportation Electrification, vol. 1, No. 3, Oct. 2015, Abstract.

X. Zhao, X. Wang, et al., "Switching frequency variation based on current ripple analysis of a 3-L PMSM drive system considering neutral point balance", IET Power Electronics, vol. 13, No. 4, pp. 776-787, 2020.

\* cited by examiner

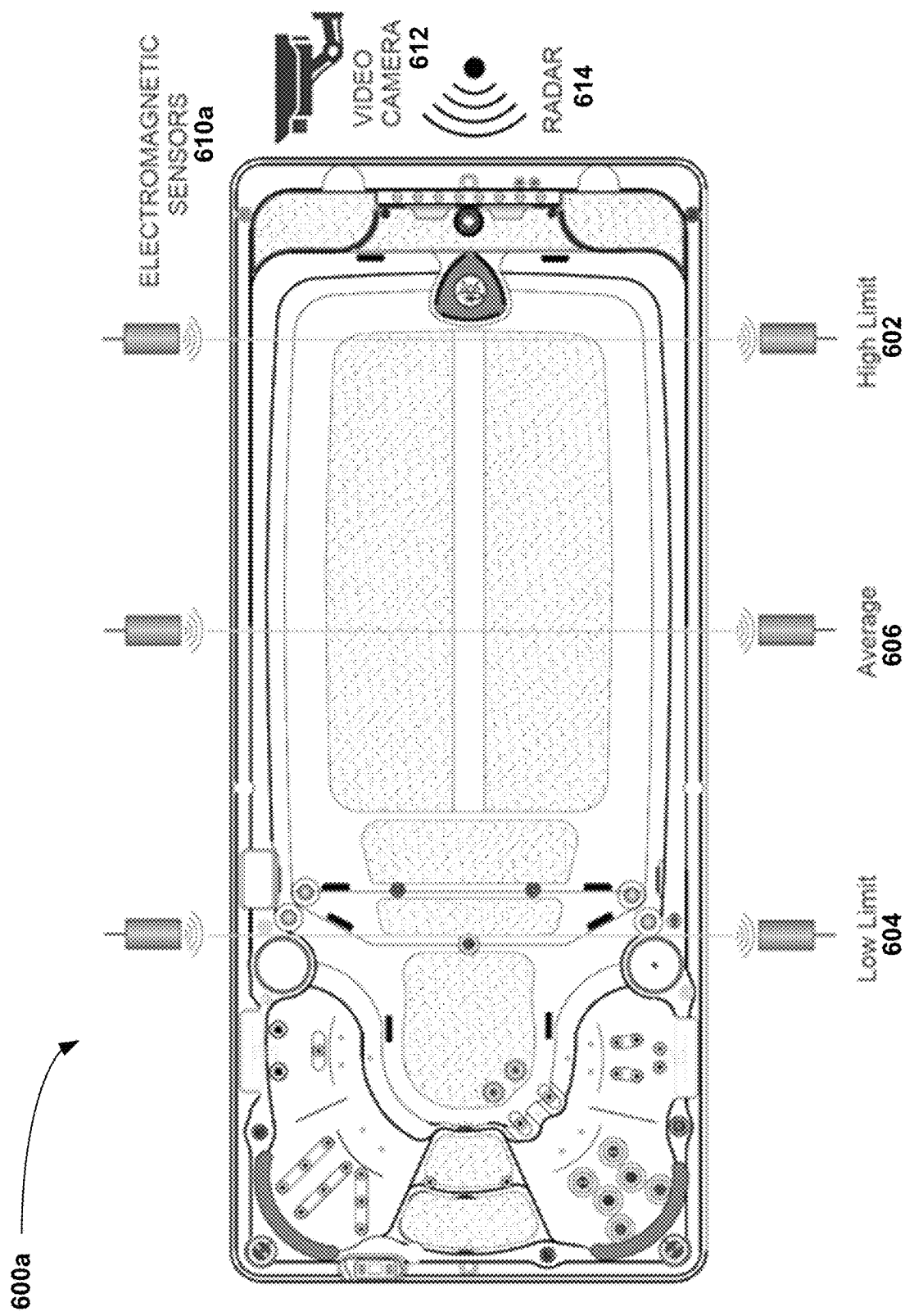

SWIM IN PLACE POOL/SPA

CROSS REFERENCE TO RELATED APPLICATIONS

This application is a non-provisional of, and claims all benefit, including priority, to U.S. Application No. 63/136,828, dated Jan. 13, 2021, entitled SWIM IN PLACE POOL/SPA and incorporated herein in its entirety by reference.

FIELD

The disclosure generally relates to the field of swim in place pools, and more specifically to the systems for controlling the circulating flow rate of water.

INTRODUCTION

Swim in place pools (including swim-spas) have a water circulation system which pumps water from one end (front) of the basin to the other end (rear) of the basin, thus generating a flow such as a river in which the user can swim without moving relative to a land reference. Using such systems, the user can swim in an uninterrupted manner in a relatively small volume of water. Indeed, by swimming at the speed of the flow of water, the user can stay in place as he/she swims. Different users have different preferences in terms of swimming speeds. For instance, some users may prefer casual swimming whereas others can prefer swimming at a higher intensity. The swimming speed is directly related to the speed of the water in the basin. It was known to provide water circulation systems which allowed more than one speed of water, so as to be adaptable to various user preferences. Although known systems were satisfactory to a certain degree, there remained room for improvement. In particular, the operation of adjusting the speed was uncomfortable, burdensome or strenuous to the user.

SUMMARY

There is provided a swim in place pool where the speed of the water flow is automatically adjusted while a swimmer is swimming.

In accordance with one aspect, there is provided a swim in place system. The system comprises a swim in place pool, at least one sensor, at least one pump associated with said at least one sensor, at least one processor, and a memory comprising instructions which when executed by the at least one processor configure the at least one processor to receive object location data from at least one sensor, and actuate the at least one pump associated with the at least one sensor when the object is positioned inside a set perimeter within said swim in place pool. The object positioned in a swim in place pool.

In accordance with another aspect, there is provided a swim in place method. The method comprises receiving object location data from at least one sensor, and actuating the at least one pump associated with the at least one sensor when the object is positioned inside a set perimeter within said swim in place pool. The object positioned in a swim in place pool.

In accordance with another aspect, there is provided a swim in place pool comprising a basin for receiving water therein, at least one circulation subsystem, at least one sensor for detecting a location of the object relative to a centre of the basin, and a controller subsystem to control valve actuators and pumps of the at least one circulation subsystem. The basin has a rear end and a front end, and is adapted to receive an object. The at least one circulation subsystem comprises a primary conduit extending from an inlet located at the rear end of the basin, a circulation conduit leading to a circulation outlet located at the front end of the basin and configured to create a swimming flow in the basin with the primary conduit inlet, a diverter conduit having a diverter outlet leading into the basin, a pump operable to pump water from the primary conduit inlet, and a diverter valve connecting the primary conduit to both the circulation conduit and the diverter conduit and having a valve actuator operable to adjust the relative ratio of the water pumped from the primary conduit inlet between the circulation conduit and the diverter conduit. The controller subsystem comprises at least one processor, and a memory comprising instructions which when executed by the at least one processor configure the at least one processor to: actuate at least one valve actuator and associated pump of the at least one circulation system when the object is located between a corresponding sensor and the centre of the basin.

In accordance with another aspect, there is provided a swim in place system. The system comprises a swim in place pool, at least one sensor, at least one pump associated with said at least one sensor, at least one processor, and a memory comprising instructions which when executed by the at least one processor configure the at least one processor to receive object location data from at least one sensor of a swim in place pool, and actuate a corresponding at least one pump associated with the at least one sensor when the object is not at an approximate centre of said swim in place pool.

In accordance with another aspect, there is a swim in place method. The method comprises receiving object location data from at least one sensor of a swim in place pool, and actuating a corresponding at least one pump associated with the at least one sensor when the object is not at an approximate centre of said swim in place pool.

Many further features and combinations thereof concerning the present improvements will appear to those skilled in the art following a reading of the present disclosure.

DESCRIPTION OF THE FIGURES

Embodiments will be described, by way of example only, with reference to the attached figures, wherein in the figures:

FIGS. 6A to 6G illustrate, in schematic diagrams, examples of sensor configurations of a swim spa system, in accordance with some embodiments;

It is understood that throughout the description and figures, like features are identified by like reference numerals.

DETAILED DESCRIPTION

Embodiments of methods, systems, and apparatus are described through reference to the drawings.

Figure 1:
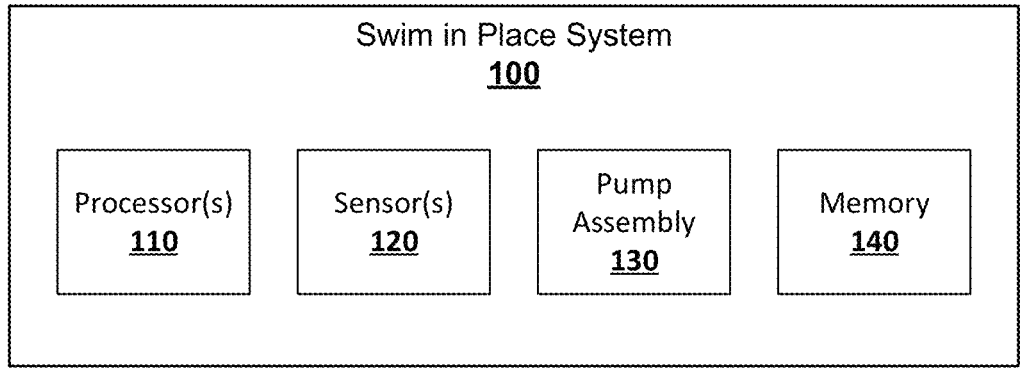
FIG. 1 illustrates an example of a swim in place pool/spa system, in accordance with some embodiments.

In some embodiments, an intelligent flow control system for a swim in place pool/spa is provided. FIG. 1 illustrates an example of a swim in place pool/spa system 100, in accordance with some embodiments. The intelligent flow control system 100 may be an artificial intelligence device, or a swim teaching device. The intelligent flow control system 100 may comprise a processor 110, a sensor 120, and an intelligent pump assembly 130. In some embodiments, the processor 110 may be driven by machine learning or artificial intelligence and may process instructions stored in a memory 140. In some embodiments, the sensor 120 may comprise a Lidar sensor, a ToF sensor, or a video camera, or a set of sensors (such as IR, electromagnetic sensors, etc.) or a combination thereof. In some embodiments, the intelligent pump assembly 130 may comprise a set of intelligent pumps (for example one or more pumps) comprising an electrical motor controlled by a smart motor drive which may comprise a PLC or an advanced intelligent system (having AI/ML methods dedicated to the motor/sensors control and communication with the central processor). Other components may be added to the system 100.

Figure 2:
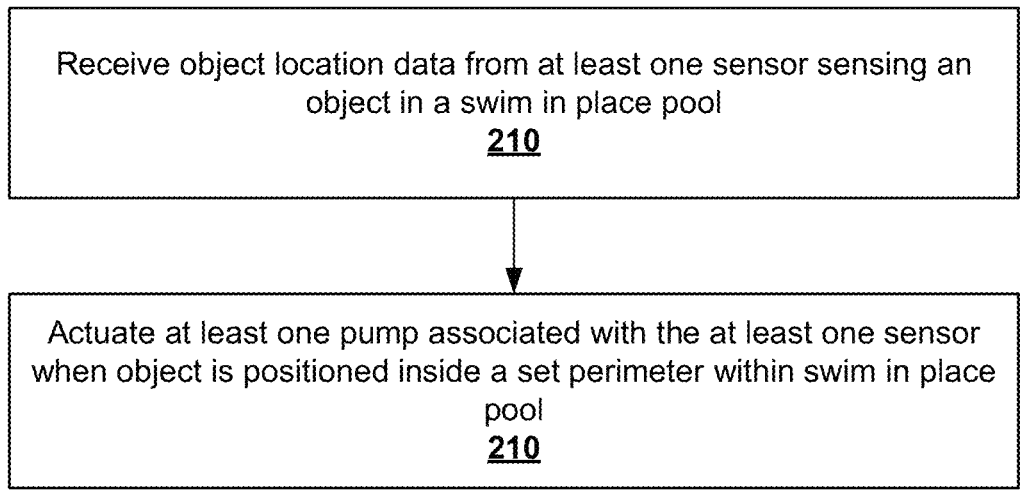
FIG. 2 illustrates, in a flowchart, an example of a swim in place pool/spa method, in accordance with some embodiments.

FIG. 2 illustrates, in a flowchart, an example of a swim in place pool/spa method 200, in accordance with some embodiments. The method 200 comprises receiving 210 object location data from at least one sensor 120, the object positioned in a swim in place pool. Next, at least one pump 130 associated with the at least one sensor 120 is actuated 220 when the object is positioned inside a set perimeter within said swim in place pool. Other steps may be added to the method 200.

In some embodiments, the swim in place pool/spa intelligent flow control system 100 may have at least one or more (could be two or more) variable speed pumps controlled by an intelligent flow control system which is capable to train and to make predictions using artificial intelligence/neural network algorithms and specific sensors for an accurate feedback. In some embodiments, electromagnetic waves sensors (EM Wave sensors) are used that work underwater and have high speed of data transmission. Further details of the new system are presented below.

Autonomous Mode

In some embodiments, the swim spa may include an autonomous mode. For example, a swim spa system may comprise a system with one, two or more pumps typically designed to create a strong water current to emulate the swimming experience. The water current is produced by a hydraulic system involving centrifugal pumps feeding dedicated nozzles. The volume of water could be high (around 1000 gallons per minute (GPM)/nozzle), the flow may be adjusted according to the swimmer's wish, and up-thrust actions may be controlled by changing the torque of the motors using pulse width modulation (PWM) to give the desired output.

The control of the swim spa water flow using centrifugal pumps with variable speed motor controlled by artificial neural network (ANN) algorithms (including hybrids) provides: simple design, high range of water flow, better payload, quick response and very good performance (it covers all types of swimmers from beginners to professional).

The swim spa system does not have complex mechanical control linkages due to the fact that it relies on centrifugal pumps and uses the variation in motor speed for flow control. However, controlling a swim spa flow is not easy because of the water dynamics and turbulence. In addition, the dynamics of the water flow are highly non-linear and several uncertainties are encountered during the process, thereby making the control a challenging venture. This has led to several control algorithms being proposed in the literature.

In autonomous mode, the swim spa system may generate its flow by controlling the motor rotor angle and speed (flux). The swim spa control system has two main modules: software (including algorithm) and hardware (including the sensors).

Figure 3:
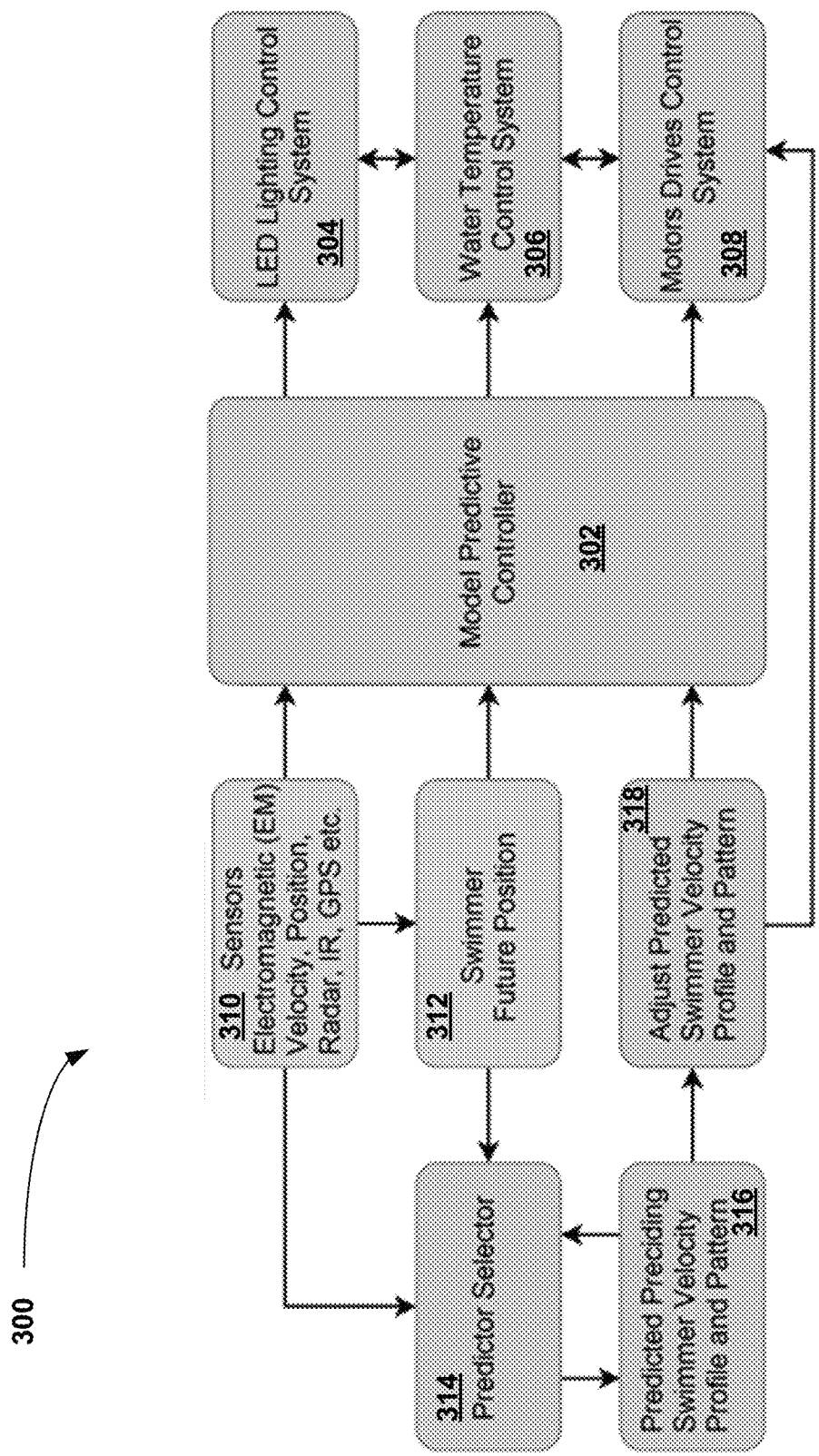
FIG. 3 illustrates, in a schematic diagram, an example of a swim spa intelligent flow control system modules and interconnections, in accordance with some embodiments.

FIG. 3 illustrates, in a schematic diagram, an example of a swim spa intelligent flow control system modules and interconnections 300, in accordance with some embodiments. A model predictive controller 302 communicates with a light emitting diode (LED) lighting control system 304, a water temperature control system 306 and a motors drive control system 308. The water temperature control system 306 also communicates with the LED lighting control system 304 and the motors drive control system 308.

Sensors 310 (such as electromagnetic (EM) velocity, position, radar, IR, GPC, etc.) may be used to sense a swimmer (i.e., object) current position to be used to predict a swimmer's future position 312. The sensor 310 information and swimmer future position information 312 may be input into a predictor selector 314 that also communicates with a predicted preceding swimmer velocity profile and pattern model 316. The model 316 may then be used to adjust a predicted swimmer velocity profile and pattern 318. The sensor 310 information, swimmer future position 312 and adjusted predicted swimmer velocity profile and pattern 318 information may be input into the model predictive controller 302. The adjusted predicted swimmer velocity profile and pattern 318 information may also be provided to the motors drives control system 308.

Figure 4:
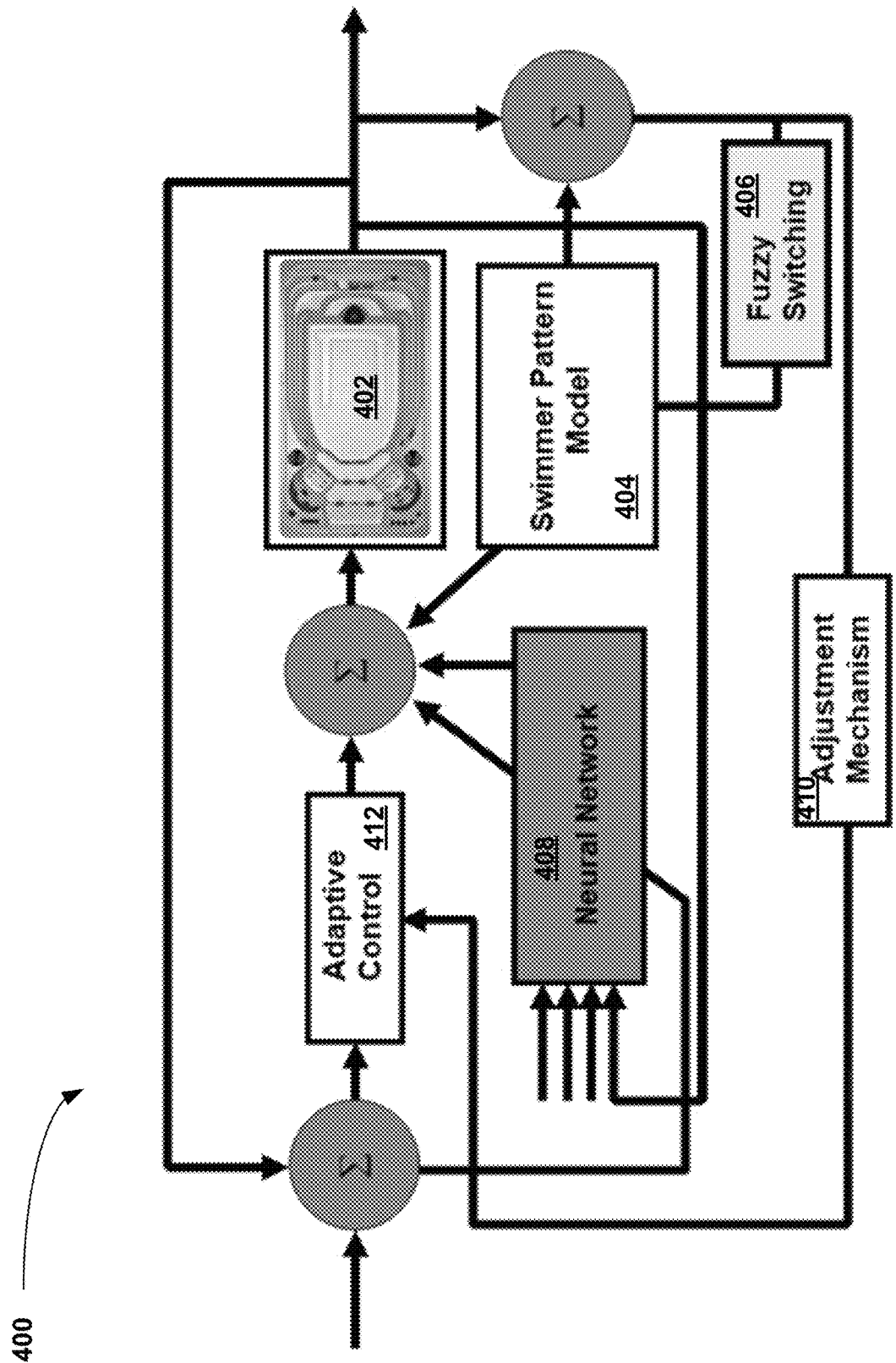
FIG. 4 illustrates, in a schematic diagram, an example of a swim spa system showing algorithm configurations, in accordance with some embodiments.

FIG. 4 illustrates, in a schematic diagram, an example of a swim spa system 400 showing algorithm configurations, in accordance with some embodiments. The system 400 includes the pool 402, a swimmer pattern model 404, fuzzy switching 406, a neural network (or other artificial intelligence network) 408 an adjustment mechanism 410 and an adaptive control unit 412.

In some embodiments, the system comprises a series of devices: one or more pumps connected through a primary conduit to one or more "high flow" convergent divergent swim jets; the pumps are powered by AC/DC motors (preferred PMSM) having an intelligent variable speed drives (VSD), e.g., sensor less field oriented control drive (FOC with integrated electronics control with serial bus communication i.e. Programmable Logic Controller—PLC); a predictive electronic controller (with Human Machine Interface—HMI) connected to the intelligent variable frequency drives thorough the serial bus (e.g., RS 485); for the feedback from the swimmer the system has sensors mounted around the swim spa basin and portable sensors to the swimmer. The system is adjusting the flow against the swimmer using the user preprogrammed preferred speeds, the data from the sensors and the prediction of the future swimmer position (performance).

In some embodiments, an artificial neural network (ANN) (fuzzy logic) algorithm can predict the location of the swimmer and it adjust the water stream accordingly using the FLC (Fuzzy Logic Controller) to adjust the speed of the water pumps; the model predictive controller algorithm is adjusting the $\omega_{REF}$ for the fuzzy logic controller (FLC) and using sensor less FOC model the position of the motor rotor ($\theta$) will be estimated and the necessary angular speed of motor will be setup ($\omega$), the centrifugal pumps will deliver the necessary water flow, The FLC (Fuzzy Logic Controller) algorithm is adaptive and it does what the ANN (Fuzzy) are doing the best, tries to over-fit the relationship.

Artificial Neural Networks (ANN) have many different coefficients, which it can optimize. Hence, it can handle much more variability as compared to traditional models.

In some embodiments, the ideal location of the swimmer is close to the centre or middle of the pool/spa. The ANN may be used to track the location of the swimmer. If the swimmer is not near the centre or middle (or within a front limit, back limit or side limit), the system can then actuate a pump to cause a current to move the swimmer closer to the centre or middle. For example, several sensors and pumps may be placed around the circumference of the pool/spa. When a swimmer is closer to a particular pump that the swimmer should be to be close to the middle of the pool/spa, then that pump may be actuated or adjusted to cause a water current in the pool to adjust thereby causing the swimmer (or object) to move towards the centre of the water surface plane. In some embodiments, the pool/spa may adjust to the swimmers speed by increasing or decreasing the RPM of a pump that is located in front of the swimmer.

Figure 5:
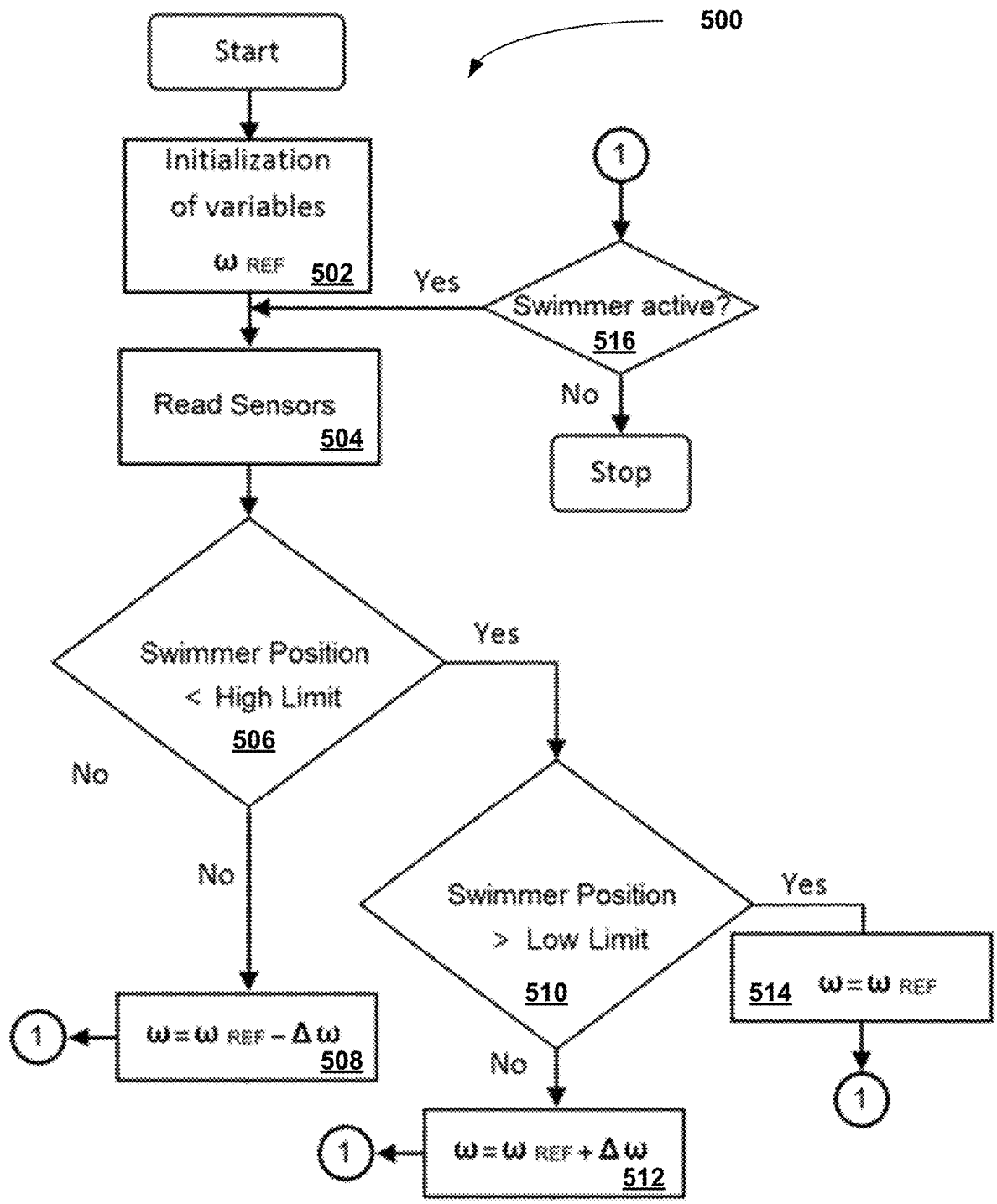
FIG. 5 illustrates, in a flowchart, an example of method of predicting a swimmer's position in the swim spa system, in accordance with some embodiments.

FIG. 5 illustrates, in a flowchart, an example of method 500 of determining an adjustment of the RPM of a pump to keep a swimmer within a set position in the swim spa system 400, in accordance with some embodiments. The method 500 comprises initialization 502 of variable such as angular speed of the motor ($\omega_{REF}$). The angular speed is proportional to a last know position of the swimmer (i.e., object). Next, information from the pool sensors is obtained 504. Using the reference angular speed ($\omega_{REF}$) and the sensor information, a machine learning network may be used to determine an current angular speed ($\omega$) which is proportional to a predicted swimmer's positon. If the swimmer's position is not less than a high limit of a set perimeter of the pool 506, then the current angular speed ($\omega$) is equal to the reference angular speed ($\omega_{REF}$) less a change in angular speed ($\Delta\omega$). Therefore, the change in angular speed ($\Delta\omega$) can be determined 508 ($\omega=\omega_{REF}-\Delta\omega$) and the RPM of a pump adjusted by that change in angular speed.

If the swimmer's position was less than a high limit of a set perimeter of the pool 506, and if the swimmer's position is not greater than a low limit of the set perimeter of the pool 510, then the current angular speed ($\omega$) is equal to the reference angular speed ($\omega_{REF}$) plus a change in angular speed ($\Delta\omega$). Therefore, the change in angular speed ($\Delta\omega$) can be determined 512 ($\omega=\omega_{REF}+\Delta\omega$) and the RPM of a pump adjusted by that change in angular speed.

If the swimmer's position was less than a high limit of a set perimeter of the pool 506, and if the swimmer's position is greater than a low limit of the set perimeter of the pool 510, then the current angular speed ($\omega$) is equal to the reference angular speed ($\omega_{REF}$) 514 ($\omega=\omega_{REF}$) and no change in RPM of the pump is required.

Once a current angular speed an amount of change in RPM required is determined 508, 512, 514, the system checks the sensor to see if the swimmer is active 516. If so 516, then steps 504 to 516 repeat. In this manner, the system is constantly monitoring the swimmer while they are active. If the swimmer is no longer active 516, then the method 500 stops. Further details regarding the high and low limits of the set perimeter, and further details of the calculations for angular speed are provided below.

Swimming Style Recognition, Lap Counting and Performance Using LiDAR, HRM Sensor and Deep Learning Deep learning comes from the use of multiple layers in the network. Deep learning is a modern variation which is concerned with an unbounded number of layers of bounded size, which permits practical application and optimized implementation, while retaining theoretical universality under mild conditions. In deep learning the layers are also permitted to be heterogeneous and to deviate widely from biologically models, to obtain high efficiency, trainability and understandability. Deep-learning architectures such as deep neural networks, deep belief networks, recurrent neural networks and convolutional neural networks can be applied for swimming style recognition using computer vision, machine vision and voice recognition.

The AI may also learn the behaviour of the swimmer, and generate and maintain a profile. For example, if a swimmer's profile shows that the swimmer tends to swim at a first speed during a first time period and then switch to a second speed at a second time period, the system may predict when to actuate/increase/decrease the RPM of one or more pumps as required to keep the swimmer as close as possible to the centre/middle of the pool/spa. In some embodiments, a combination of predictive analytics and real-time analytics may be used. In some embodiments, the swimmer profile may assist with polling strategies when determining conflicting sensor readings in order to determine which sensor readings are more likely to be a reflection of the swimmer's actual current position.

In some embodiments, the pumps of the pool/spa may be used to set up a routine exercise for the swimmer. Should the swimmer not be able to keep pace with the routine, the pool/spa may automatically adjust the pumps such that the swimmer's location is closer to the centre/middle. In some embodiments, a notification (e.g., visual light, audio alarm, audio "coach" voice recording, etc.) may be used if the swimmer is not on pace with the routine to give the swimmer an opportunity to adjust their own speed before the pumps are adjusted.

Working with any Wearable: Smartphone, Tablet, Smart Glasses, Smart Watch Etc.

In some embodiments, the swim in place system may be used to assist with training of a swimmer. For examples, sensors may be added to the arms, legs and head (e.g., googles) of a swimmer to monitor the swimmers movement. The swim in place system may provide audio signals (including voice/speech) to notify a swimmer if a body movement is not ideal, and to instruct the swimmer to adjust their body (e.g., arms, legs) movement and/or positioning.

The modern wearable devices are enabled to track and analyze everyday swimmer activities and to recognize them. However, when used in real world conditions, the performance of off-the-shelf devices is often insufficient. The DL algorithm tackles the problem of swimming style recognition (the freestyle, backstroke, breaststroke, and butterfly) and strokes counting using sensors as presented above (including heart rate monitoring sensors, bracelet sensors, watches and smart glasses). In total hundreds hours of this data could be collected from dozens swimmers of diverse backgrounds, performances and styles. The data could then be used to train a convolutional neural network (CNN) to recognize the four main swimming styles, transition periods and strokes. It is estimated that the experimental method could achieved score of 95.0% for style recognition and 98.0% for counting strokes, the score percentage of the results are influenced by the water turbulence (speed of the water stream), temperature of water (viscosity) and the accuracy of the data sensors. The algorithms measure the number of strokes and evaluate the swimmer efficiency level then based on this data they do calculate the distance and calories burn.

In some embodiments, the algorithms can also discern the stroke of swimmers of all skill levels, as well the calories they are burning, the distance they are swimming and the swim time. The data may be collected from more than 50 swimmers and over 500 swim sessions. The algorithms may collect data from swimmers swimming in swim spas while wearing HRM sensors, smart glasses and 2×ToF sensors at the front and at the end of the swim spa. The swimming style may look similar (i.e., Butterfly vs. Breaststroke) but they affect how many calories the swimmer burnt (Butterfly could burn about 35-45% more calories than Breaststroke).

Autonomous Mode and Sensors

The swim spa autonomous mode is a choice for the swimmer that offers a completely automatic operating mode adapting and predicting the swimmer behaviour will respond accordingly creating a water stream which will balance the swimmer action; basically using Newton third Law (action and reaction). The reaction is created using centrifugal pumps fed by variable speed motors (primarily PMSM or IPMSM) controlled with an electronic control system based on Artificial Neural Network algorithm which uses as input data the signals from sensors.

There are various types of sensors which could be used: classic sensors (less expensive): IR sensors, electromagnetic sensors, simple two parts laser beam sensors (transmitter and receiver) or detection and ranging methods that can be used in these applications; with the most commonly used being Photo-electric, Ultrasonic, Time-of-Flight, Radar and LiDAR technologies. Normally for ranging applications, considerations include distance, accuracy, and environmental performance.

Each of the methods of ranging stated above has unique strengths and weaknesses. Photoelectric sensors are cheap and fast but have range distance limitations. Ultrasonic gets a low-cost solution but with limited range distance, slower data rate, and performance dependent on surface and angle of attack.

With radar, range distance can be much superior to others, but with potential refresh rate limitations and false echoes.

Figure 6B:
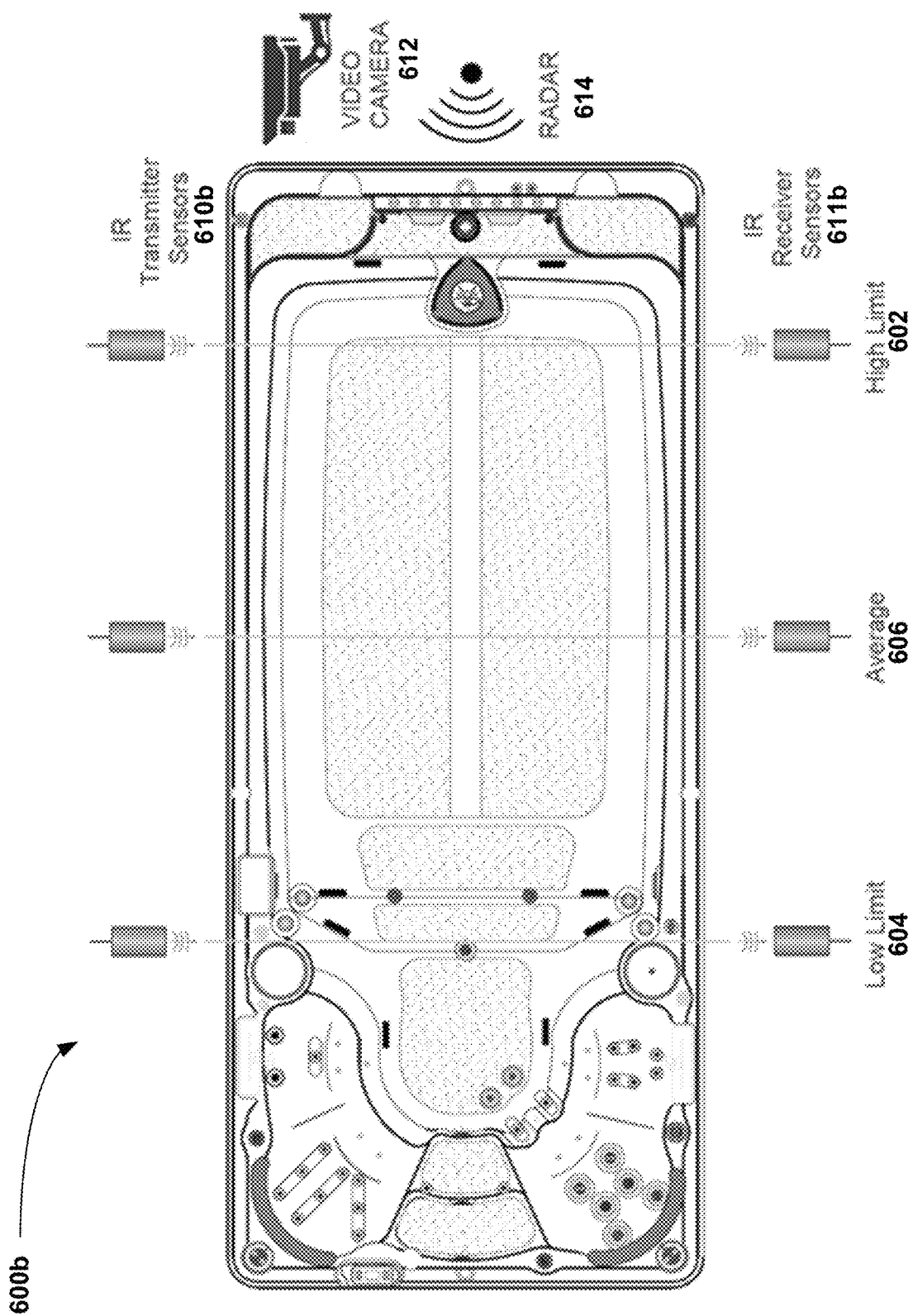
Figure 6C:
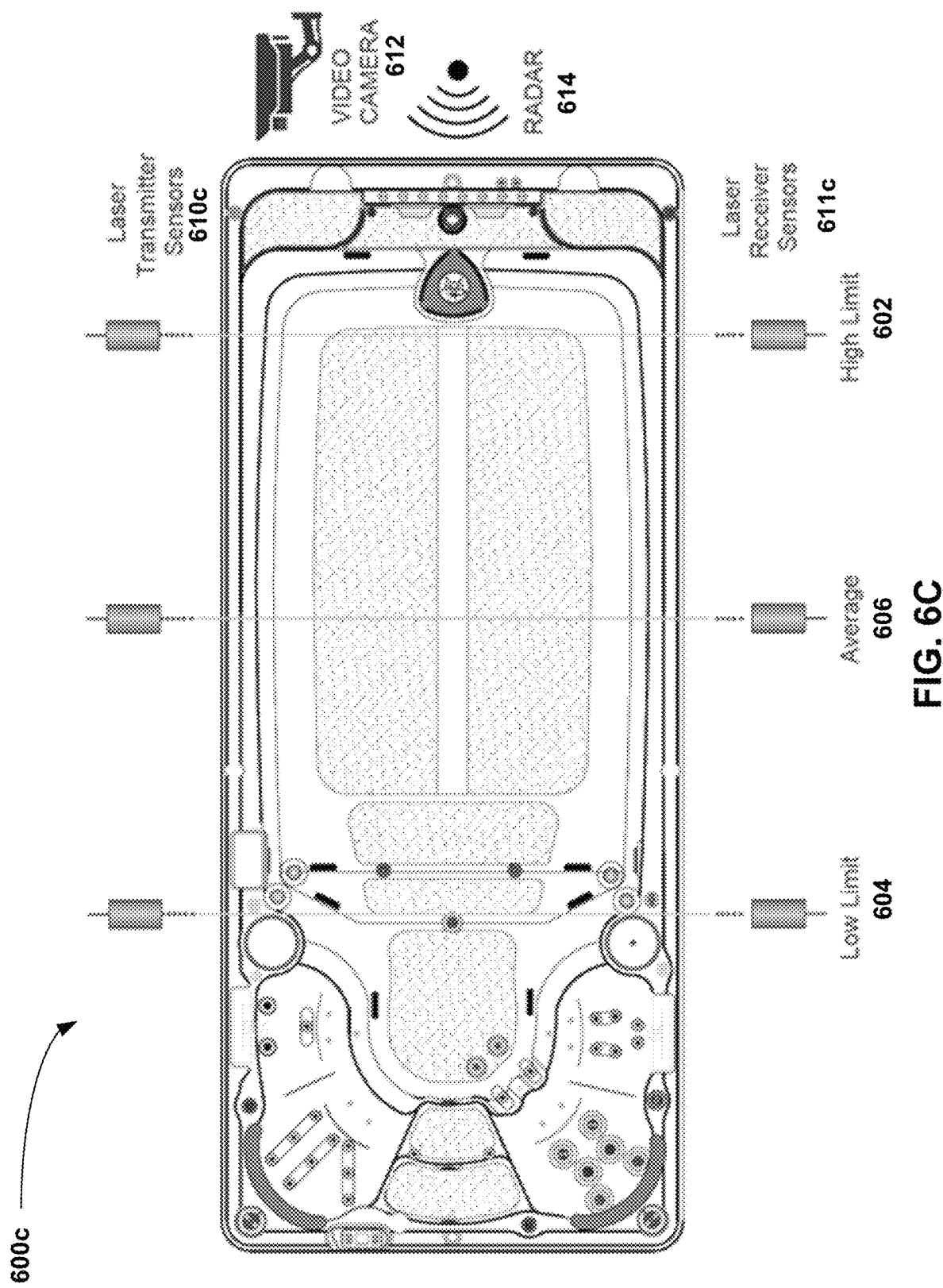
Figure 6D:
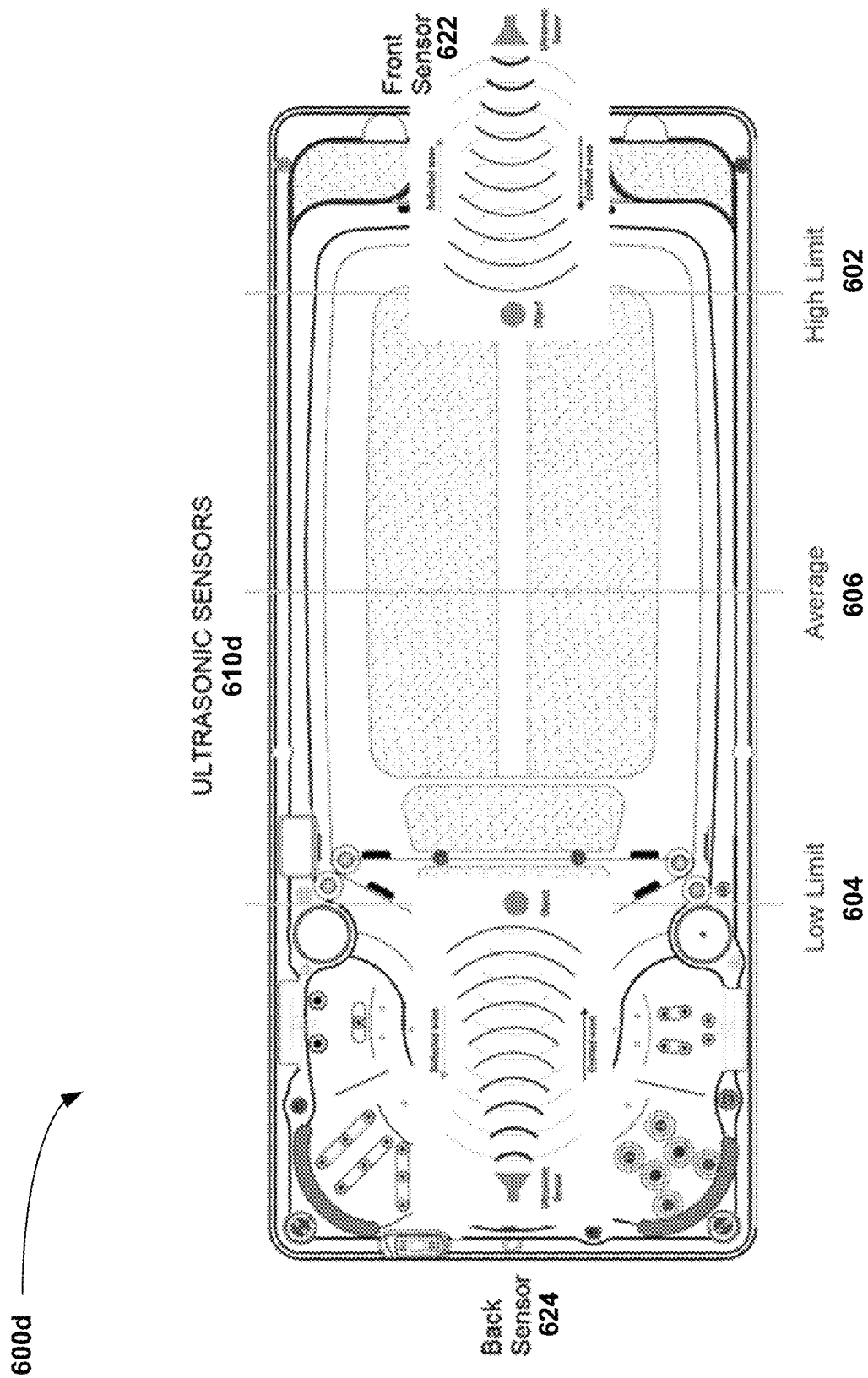
Figure 6E:
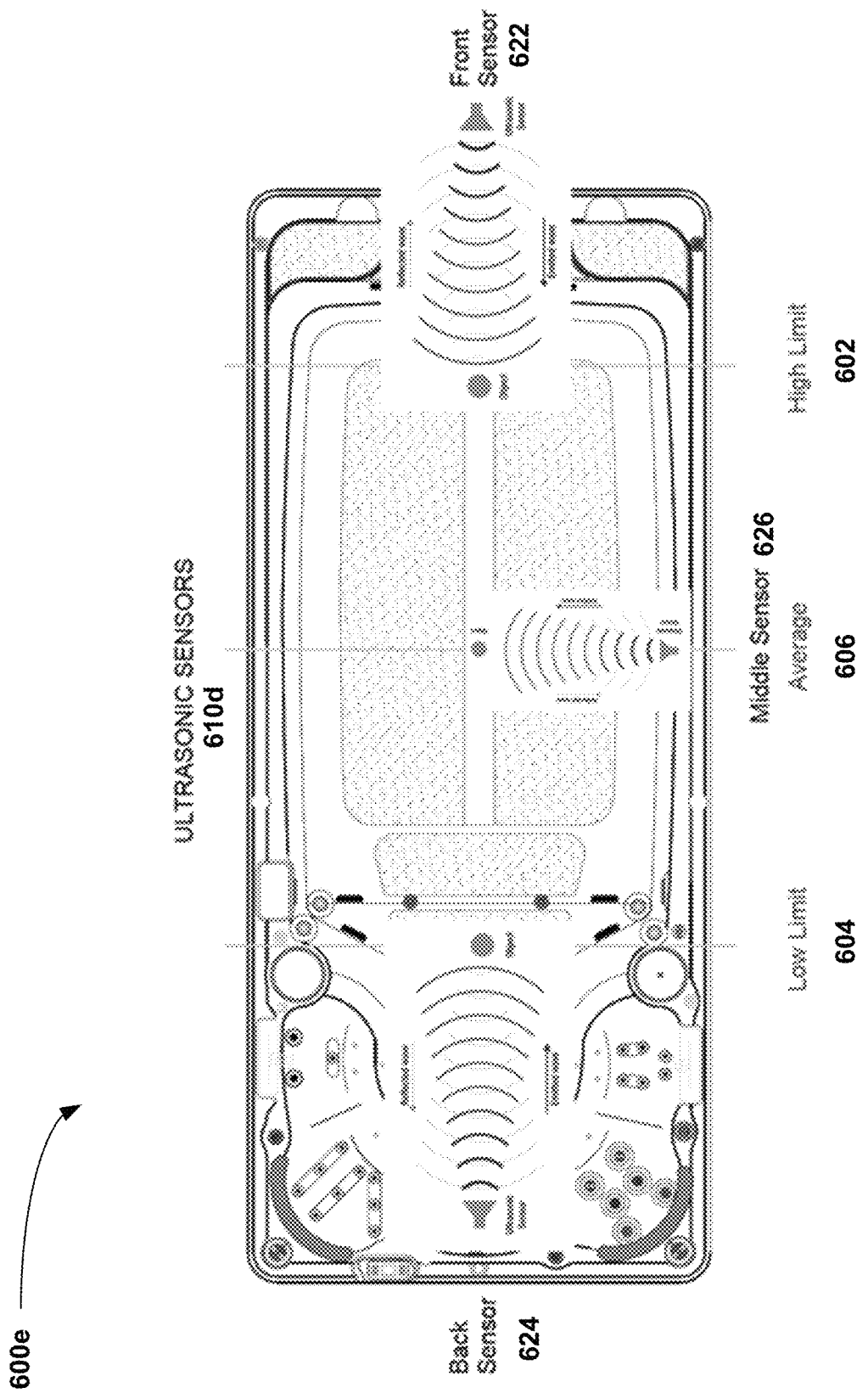
Figure 6F:
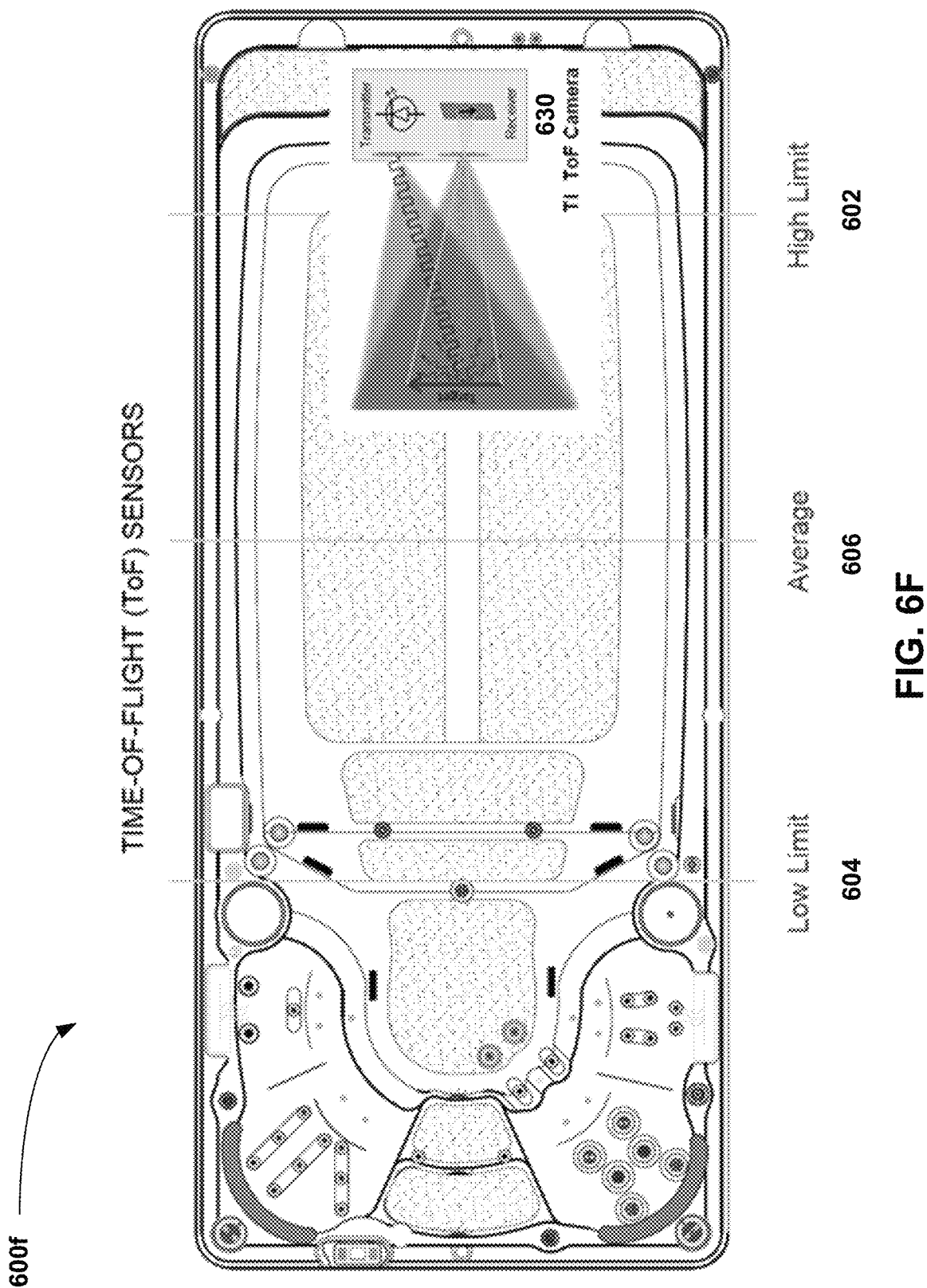
Figure 6G:
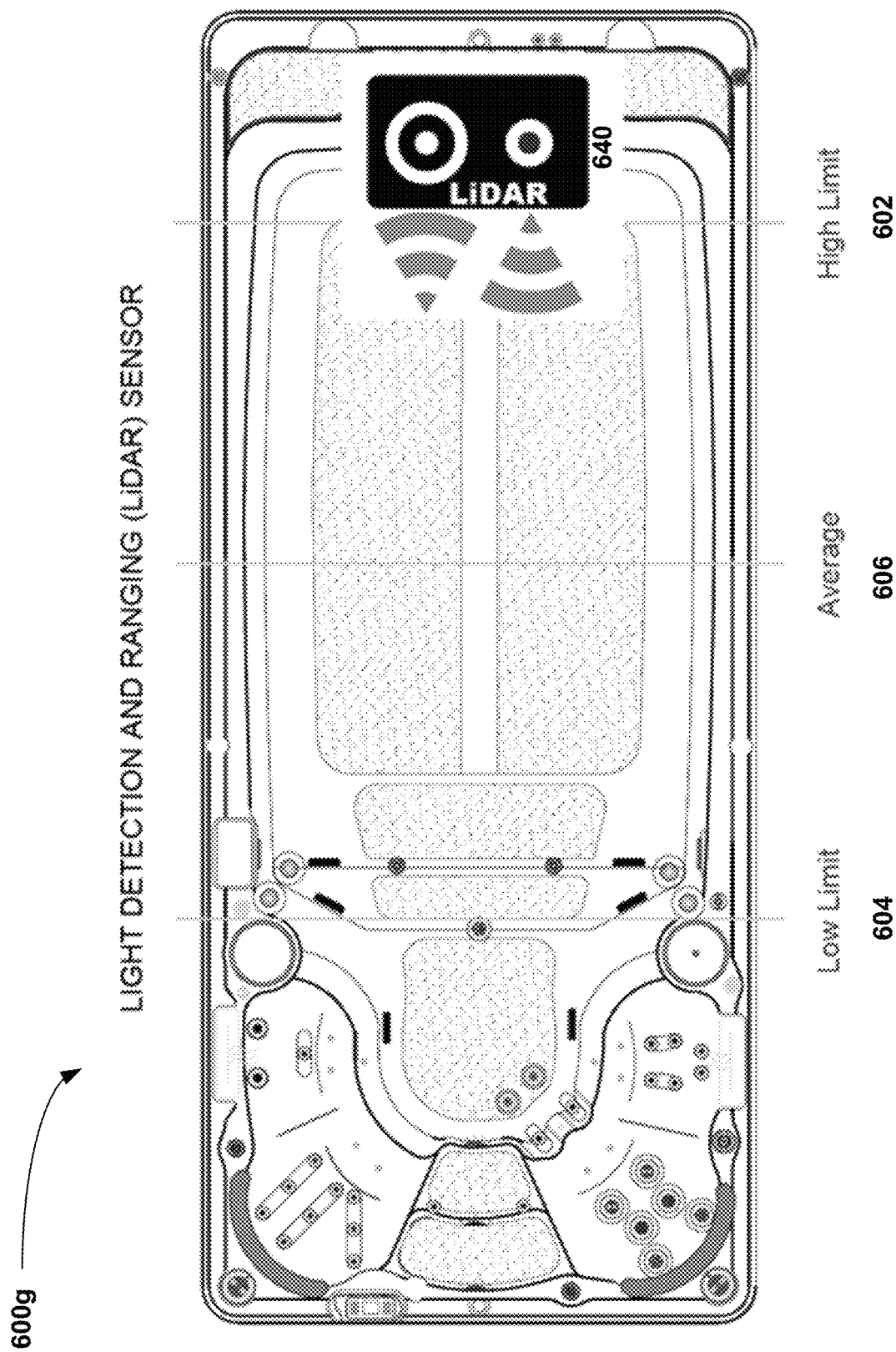

FIGS. 6A to 6G illustrate, in schematic diagrams, examples of sensor configurations 600a to 600g of a swim spa system 400, in accordance with some embodiments. A front or high limit 602, back or low limit 604 and middle or average limit 606 are shown defining an example of a set perimeter or limits within the swim in place pool. FIG. 6A illustrates an example of electromagnetic sensors 610a, and may include a video camera 612 and radar unit 614. FIG. 6B illustrates an example of infrared (IR) sensors 600b including IR transmitter sensors 610b and IR receiver sensors 611b, and may include the video camera 612 and radar unit 614. FIG. 6C illustrates an example of laser sensors 610c including laser transmitter sensors 610c and laser receiver sensors 611c, and may include the video camera 612 and radar unit 614. FIGS. 6D and 6E illustrate examples of ultrasonic sensors 610d, and may include a front sensor 622 and a back sensor 624. The example of FIG. 6E also includes a side or middle sensor 626. FIG. 6F illustrates an example of time-of-flight (ToF) sensors 610f, and may include a ToF camera having a transmitter and receiver 630. FIG. 6G illustrates an example of light detection and ranging (LiDAR) sensors 610g, and may include a LiDAR unit 640. The ToF sensors 610f and LiDAR sensors 610g are further described below.

Photo-Electric Sensor

Under the photo-electric principle, a Distance sensor Analog-Front-End (AFE) may use a Time-of-Flight (ToF) principle to help accurate measurement of distance. With an external LED and photodiode, it can be used to implement a high speed, and high resolution distance sensor. With external transmit and receive, the user has the choice of any wavelength of interest (visible or IR), any illumination source (LED or VCSEL), and any field of view based on added optics.

Time-of-Flight technology has certain distinct benefits. Firstly, since it senses at the speed of light, ToF technologies operate very fast compared to other range sensing methods like ultrasonic sensing. (i.e. can provide data up to 4000 samples/second).

Today, Time-of Flight (ToF) systems are technologies that offer to integrate these devices to provide functions such as 3D imaging, proximity sensing, and ambient light sensing and gesture recognition.

Time-of-Flight Long Range Proximity and Distance Sensing Basics

Light emitter and a receiver form the sensing elements of an Optical time-of-flight (ToF) long range proximity and distance sensing system. The emitter sends modulated light pulses. The emitted light bounces off the objects in the scene and a part of the reflected light comes back to the receiver. The round trip time of the light pulses is measured by the analog front end. The measured time is an indicator of the distance to the object. Emitted light is pulsed continuously with a periodicity determined by the modulation frequency. Since emitted light is periodic, the phase difference between the emitted and the received light is an indicator of the round trip time. The phase determination is aggregated over several cycles of the periodic light modulation.

Figure 7:
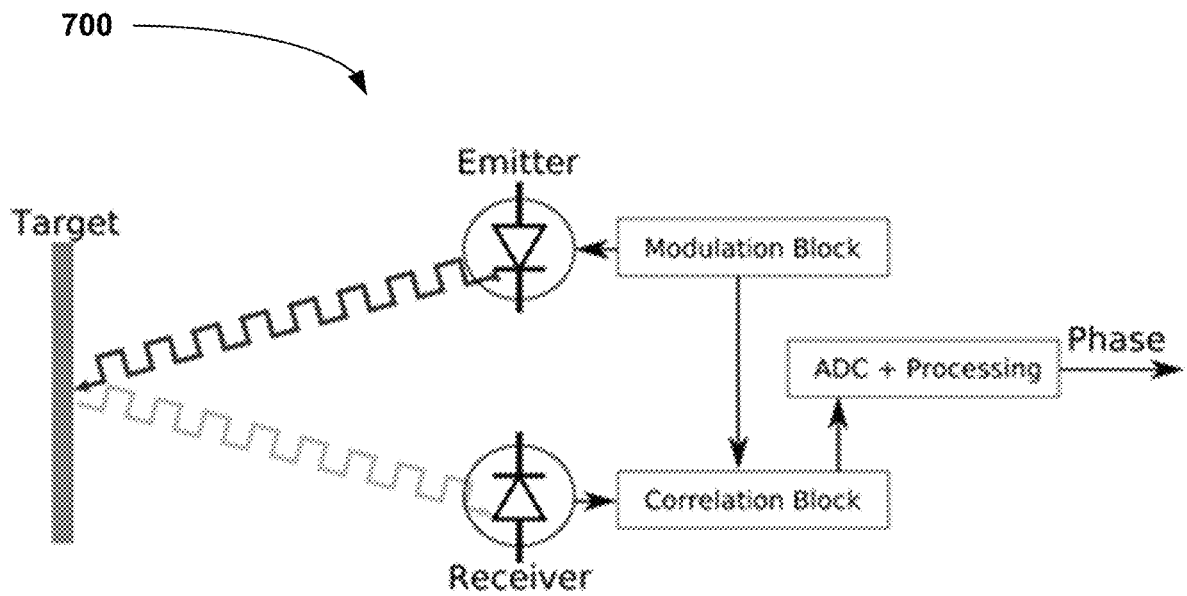
FIG. 7 illustrates a generic ToF proximity sensor system, in accordance with some embodiments.

FIG. 7 illustrates a generic ToF proximity sensor system 700, in accordance with some embodiments.

Imaging technology with deep learning image analysis techniques enable the swim spa control system to control itself (a fully autonomous control). The swim spa control system ANN algorithm will set up a swimmer ID (virtual swimmer—a 3D map) using the ToF infrared (IR) light to illuminate the swimmer body while capturing the images and swimming pattern (including gestures).

Swimmer body is a 'biometric', a measurable biological characteristic. All biometric authentication systems basically compare two complex patterns and calculate how similar they are. The swimmer should set up a biometric system memorized by the swim spa control system microprocessor and will capture and store the reference patterns, known as a template or 'enrolment image'. At next time uses of swim spa the microprocessor the swimmer will present the microprocessor with a 'verification image'.

The microprocessor computes a score between 0 and 1, if it is closer to 1 that means it is the same swimmer pattern. If it is closer to 0, it is not the same swimmer and if it has the password and the owner permission could set up a new user ID profile, otherwise it cannot use "Auto mode".

Figure 8:
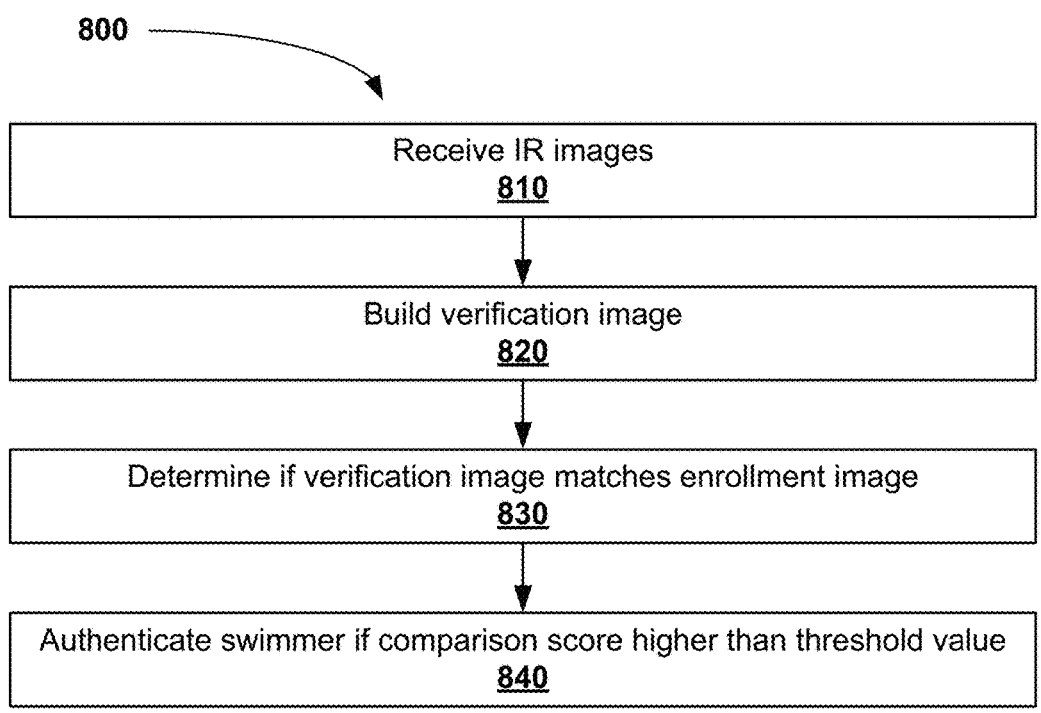
FIG. 8 illustrates, in a flowchart, a method of determining a swimmer's identity, in accordance with some embodiments.
Figure 10:
FIG. 10 illustrates an example of a 3D visualization, in accordance with some embodiments.

As the enrolment and verification images will not be identical due to differences in capture conditions, the system uses a threshold to determine whether they are significantly different. A comparison score of 0.65 might be close enough if a minimum score is not a fixed number.

a. This process may use a microprocessor and an ANN algorithm. FIG. 8 illustrates, in a flowchart, a method 800 of determining a swimmer's identity, in accordance with some embodiments. The method comprises receiving IR images 810. The IR images are sent 810 from the ToF to ANN-microprocessor to build 820 a 3D mathematical model (3D map) of swimmer body. For example, a swimmer's height, length, size, and other factors may be used for the model. FIG. 10 illustrates an example of a visualization of the swimmer using LiDAR sensor technology. The 3D model or 'verification image' is presented to the system's algorithms and compared against one or more swimmer stored template or 'enrolment image'. The processor determines whether the verification and enrolment images match 830, based on a comparison score of similarity between swimmer images. Next, the processor authenticates swimmer identity 840 and unlocks if the comparison score is higher than a certain threshold value (e.g., 0.65).

Ultrasonic Sensors

Ultrasonic sound waves are vibrations at a frequency above the range of human hearing (>20 kHz) that can travel through a wide variety of medium (air or fluid) to detect objects and measure its distance—without making physical contact.

Figure 9:
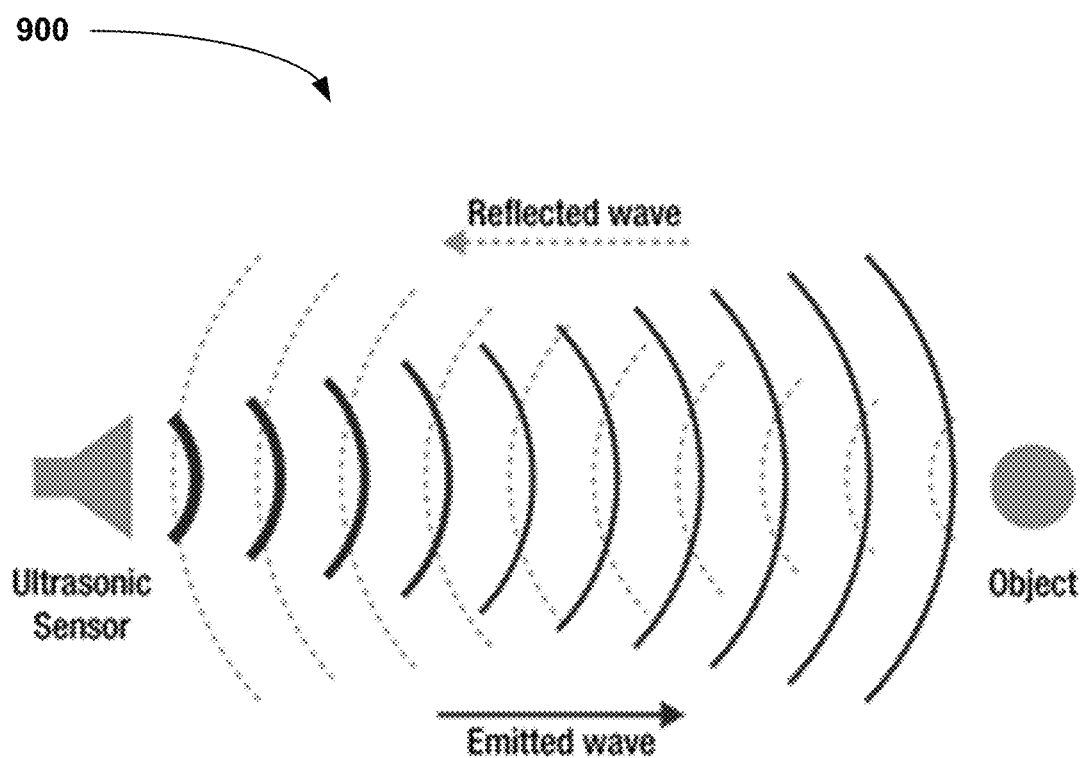
FIG. 9 illustrates ultrasonic waves emitted by the system, in accordance with some embodiments.

Ultrasonic sensors can be used to detect a wide variety of materials regardless of shape, transparency, or color. FIG. 9 illustrates ultrasonic waves 900 emitted by the system, in accordance with some embodiments.

Ultrasonic waves transmitted by the system are reflected by objects present in the vicinity. The system receives the reflected wave, or echo, and compares the object's echo amplitude against a threshold to detect the object. The echo for objects that are closer to the system is stronger than that for objects that are farther from the system. Hence, it is relatively common for the threshold to be varied with time, but in this case a variable threshold is not required and that the threshold can remain fixed.

Ultrasonic Distance Ranging

Ultrasonic transducers installed in the front, rear and sides (if necessary) of a swim spa tank transmit ultrasonic waves and then receive the ultrasonic waves reflected back by nearby objects (swimmer). An ultrasonic wave's time of flight (TOF) is used to calculate the distance to the swimmer to assist the system control to respond in autonomous mode. In some embodiments, four transducers may be installed with one in each of the front and rear, and one transducer installed in each side.

In an ultrasonic swim spa control system, piezoelectric transducers typically are used to convert electrical signals into ultrasonic waves, and reflected ultrasonic waves into electrical signals.

The low receiver sensitivity of piezoelectric ultrasonic transducers usually results in very small electrical signals when the reflected waves are received. This signal is amplified by an amplifier and is digitized with an analog-to-digital converter (ADC), routed through a bandpass filter (BPF), which is primarily used to improve the signal's signal-to-noise ratio then the filtered signal is compared against a threshold to detect the presence of an object (swimmer). There are ultrasonic sensors optimized for liquid sensing medium with a range (e.g., distance: 0.1 m to 1 m), resolution 0.1 cm, frequency range 31.25 kHz-4 MHz.

Radar Sensor (NanoRadar)

Nano radar is used to detect the targets by transmitting and receiving high-frequency electromagnetic waves. The back-end signal processing module will calculate the target information such as the existence, velocity, direction, distance and angle of the moving object by the analysis of the echo signal. And the millimeter-wave radar has the characteristics of small volume, light weight, high integration, and sensitive sensitivity. Besides, with its unique ability to penetrate fog, smoke and dust, it can realize the applications in all weather and all day.

Example TI 'mmWave'

'mmWave' is a sensing technology for detection of objects and providing the range, velocity and angle of these objects. It is a contactless-technology which operates in the spectrum between approximately 30 GHz and 300 GHz. Due to the technology's use of small wavelengths it can provide sub-mm range accuracy and is able to penetrate certain materials such as plastic, drywall, clothing, and is impervious to environmental conditions such as rain, fog, dust and snow.

mmWave sensors transmit signals with a wavelength which is in the millimeter (mm) range. This is considered a short wavelength in the electromagnetic spectrum and is one of the advantages of this technology. Indeed, the size of system components such as antenna required to process mmWave signals is small. Another advantage of short wavelengths is the high resolution. A mmWave system that resolves distances to wavelength has accuracy in the mm range at approximately 76-81 GHz.

Additionally, operating in this spectrum makes mmWave sensors interesting for the following reasons:
  Ability to penetrate materials: see through plastic, drywall and clothing
  Highly Directional: compact beam forming with 1° angular accuracy
  Light-like: can be focused and steered using standard optical techniques
  Large absolute bandwidths: distinguish two nearby objects In one embodiment, a self-contained FMCW radar sensor single-chip solution simplifies the implementation of Automotive Radar sensors in the band of approximately 76 to 81 GHz. It is built on a low-power 45-nm RFCMOS process, which enables a monolithic implementation of a 2TX, 4RX system with built-in PLL and A2D converters. It integrates the DSP subsystem, which contains high-performance DSP for the Radar Signal processing. The device includes an ARM processor subsystem, which is responsible for radio configuration, control, and calibration. Simple programming model changes can enable a wide variety of sensor implementation (Short, Mid, Long) with the possibility of dynamic reconfiguration for implementing a multimode sensor. Additionally, the device is provided as a complete platform solution including reference hardware design, software drivers, sample configurations, API guide, and user documentation.

LiDAR Sensor (nanoLiDAR)

LiDAR is also known as Light Detection and Ranging. It is a technology which detects objects on the surface, as well as their size and exact disposition. LiDAR appeared on the market after RADAR and SONAR, and it uses laser light pulses to scan the environment, as opposed to radio or sound waves. LiDAR is a remote sensing technology and a method for measuring distances (ranging) by illuminating the target with laser light (uses the pulses) and measuring the reflection with a sensor; differences in laser return times and wavelengths can then be used to make digital 3-D representations of the target (e.g, the swimmer). LiDAR works in a similar way to RADAR and SONAR using light waves from a laser (generating light pulses), instead of radio or sound waves.

A LiDAR system calculates how long it takes for the light to hit an object or surface and reflect back to the scanner. The distance is then calculated using the velocity of light. These are known as Time of Flight' measurements. Depending on the sensor used, LiDAR units can fire hundreds of thousands to millions of pulses per second. Each of these measurements, or returns, can then be processed into a 3D visualization known as a 'point cloud'. FIG. 10 illustrates an example of a 3D visualization 1000, in accordance with some embodiments.

LiDAR algorithm functioning:
Laser signals are emitted;
Laser signals reach an obstacle;
Signal reflects from the obstacle;
Signal returns to the receiver; and then
A laser pulse is registered.

The device emits laser pulses which move outwards in various directions until the signals reach an object, and then reflect and return to the receiver. In fact, this is the same principle SONAR uses, except SONAR emits sound waves. With LiDAR, the light is 1,000,000 times faster than the sound. An example is during a storm with lighting—at first, the lightning is seen, and the sound is heard a couple seconds later. Such high speed allows the device to receive data from a tremendous number of laser pulses every second. It means information is updated more frequently and, as a result, more precise data is received.

An inner processor saves each reflection point of a laser and generates a 3D image of the environment. Such working principles allow us to create precise maps using a LiDAR installed on board a plane, for example. Furthermore, the same processor can calculate the distance between a detected object and a LiDAR receiver by using a simple school formula where laser pulse speed and reflection time are known, and then the distance a laser pulse travels along may be determined.

LiDAR has shorter wavelengths than RADAR, which allows for detection of small objects. A LiDAR can build an exact 3D monochromatic image of an object.

The principle of LiDAR is simple. The optical measuring technology is applied in two ways: as time-of-flight LiDAR, to measure the distance to an object, and as Doppler LiDAR, to measure the speed of objects. A transmitter transmits pulses of light. A receiver measures the time between transmitting and receiving the reflected photons using the formula:

$$d=(c \times t)/(2 \times n) \quad (51)$$

where d is the distance in metres, c is the speed of light in a vacuum, t is the duration in seconds and n is the refractive index of the air.

A refractive index, also called index of refraction, is a measure of the bending of a ray. In the swim in place pool, a laser scanning system may be used to survey the swimmer (or object) creating a digital three-dimensional (3D) model of the swimmer (or object), and using it into an artificial intelligence (AI) algorithm capable to emulate the real swimmer (or object) behaviour and predicting the movement and velocity:

$$v=(T1/T2-1) \times c/n \quad (52)$$

where T represents the wave period.

FIG. 6G illustrates, in a schematic diagram, an example of LiDAR sensor configurations of a swim spa system 600g, in accordance with some embodiments As shown in FIG. 6G, the functional difference between LiDAR and other type of ToF is that LiDAR uses pulsed lasers to build a point cloud, which is then used to construct a 3D map or image. ToF applications create "depth maps" based on light detection, usually through a standard RGB camera. The advantage of ToF over LiDAR is that ToF requires less specialized and sophisticated equipment so that it can be integrated in smaller and less expensive devices. The main advantage of LiDAR is that a computer can ease read a point cloud compared to a depth map. Both ToF and LiDAR can work together with other sensors (presented in FIG. 6A to FIG. 6F) on the swimming autonomous mode. LiDAR is faster and more accurate than Time of Flight and does not have difficulties understanding large, low-texture surfaces (i.e., large white surfaces).

Swim in Place Pool Tank

Figure 11A:
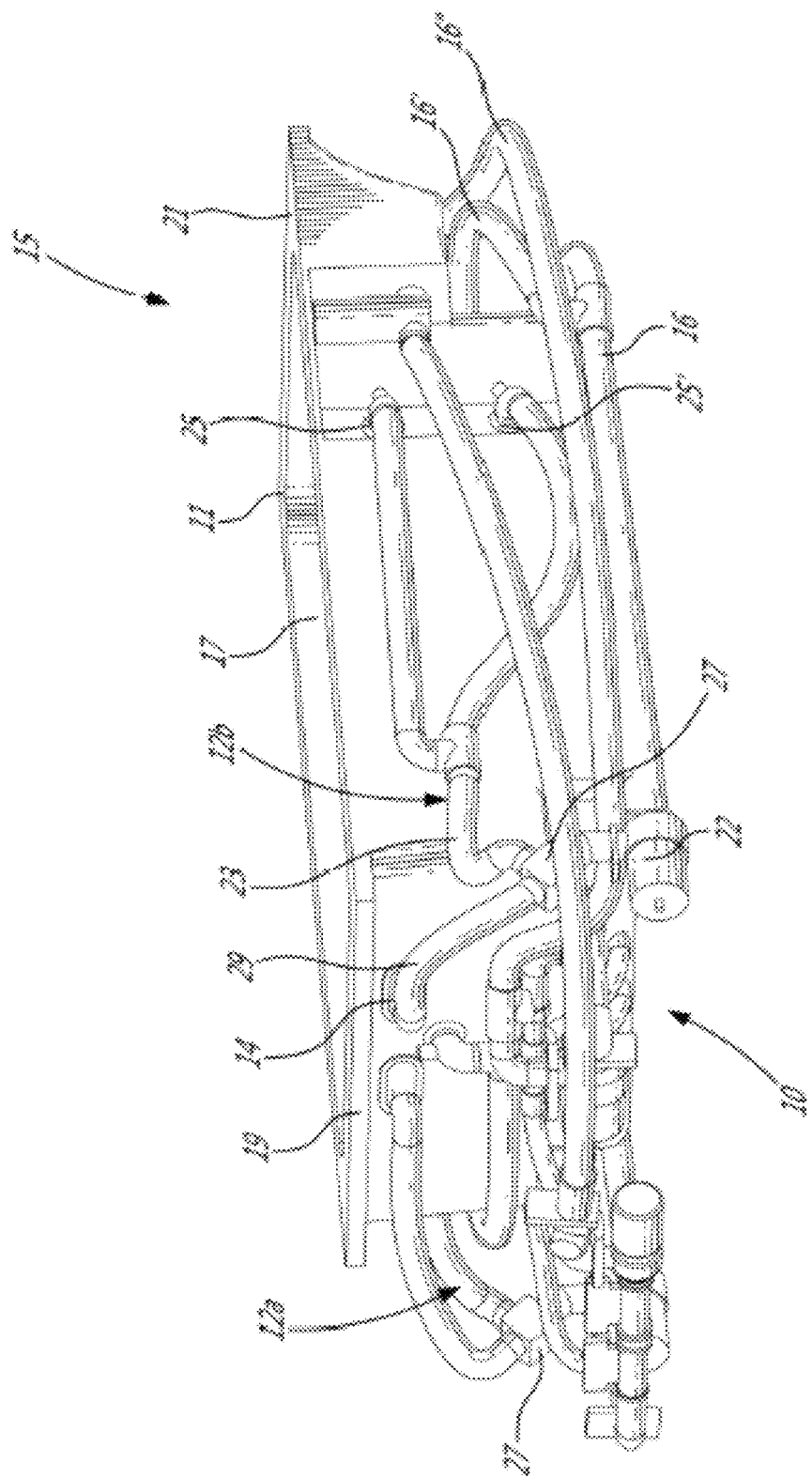
FIG. 11A is an oblique view of an example of a swim in place pool with an automatic water diversion system, in accordance with some embodiments.
Figure 11B:
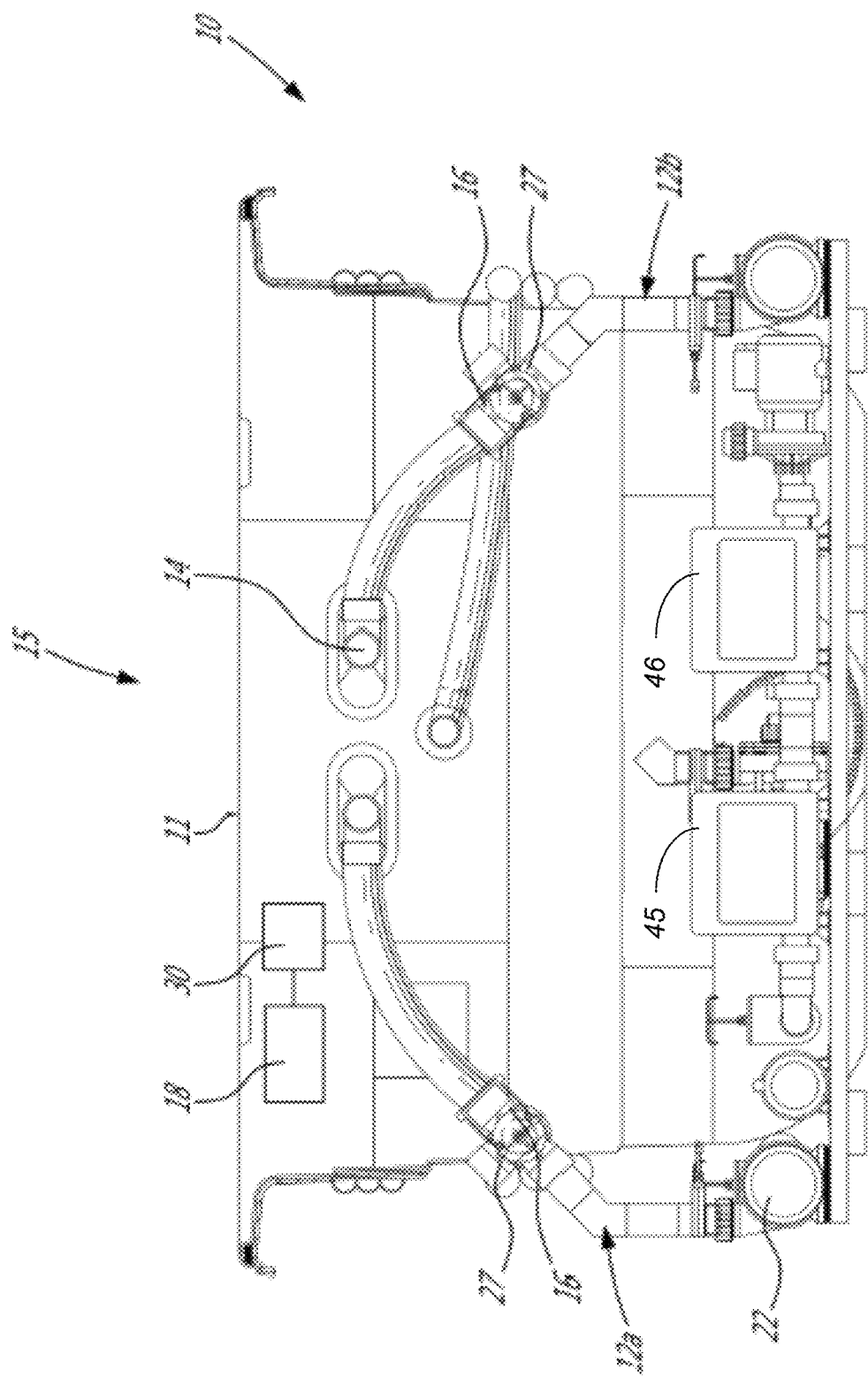
FIG. 11B is a front elevation view of the swim in place pool of FIG. 11A.

FIGS. 11A and 11B show an example embodiment of a swim in place pool 15 with an automatic water diversion system 10. The swim in place pool 15 has a basin 17 having a top surface 11. In this embodiment, the automatic water diversion system 10 includes a pair of water circulation subsystems 12a, 12b. One water circulation subsystem 12a, 12b is provided on each side of the swim in place pool. In this embodiment, the water circulation subsystem 12a, 12b both have the same elements, and so only one will be described in detail. The water circulation subsystem 12b has at least one circulation outlet 14 that opens into the swim in place pool 15, and more specifically at the front end 19 of the basin. The water circulation subsystem 12b has its own dedicated recirculation pump 22 adapted to pump water into the inlet (not shown) of a primary conduit 16 from the rear end 21 of the basin 17. In this embodiment, the primary conduit 16 has two branches 16', 16" manifolding two respective sub-inlets into a common conduit leading to the recirculation pump 22. The water circulation subsystem 12b further has a diverter conduit 23 leading to a bypass outlet 25, 25' in the basin. In this embodiment, the diverter conduit also branches off and has to two bypass sub-outlets 25, 25'. The water circulation subsystem 12b has a diverter valve 27 connecting the primary conduit 16 to both the diverter conduit 23 and a circulation conduit 29 leading to the circulation inlet 14.

Operation of the diverter valve 27 allows to adjust the relative flow rate of water which is diverted from the circulation conduit 29 to the diverter conduit 23, so as to adjust the speed of the water flow in the basin. The circulation outlets 14 at the front end 19, and the inlets at the rear end 21, are directed substantially towards one another in the longitudinal orientation to cooperate in imparting the speed of the water flow in the basin 17. Contrary to the circulation outlet 14 which is aimed longitudinally, the bypass outlet 25, 25' is aimed laterally and does not contribute significantly to the speed of the water flow in the basin 17. The diverter valves 27 have valve actuators 16 which are electronically controlled by a controller 18, such as shown in FIG. 11B. A user interface 30 is provided in a manner to be accessible by a swimming user in the basin 17, such as on a top portion 11 of the basin above the water line, for instance. Accordingly, the controller 18 can adjust the speed of the water in the basin, based on the swimming user's input received via the user interface 30, by controlling the valve actuators 16. In this embodiment, the pumps 22 are positioned outside and remotely from the top surface 11 of the swim in place pool 15. The pumps 22 are connected between the inlet and the outlets 14, 25 by the conduits 16, 29, 23, 25. The circulation outlets 14 can be wide stream jets and the bypass outlets 25, 25' can be located at an intermediary location along the side of the swim in place pool, on opposite lateral sides, and designed so as to engage the user's thigh. The valve actuators 16 are distant from the top surface 11 and are not directly accessible by the user. The controller 18, via the user interface 30 and valve actuators 16, allows for incremental adjustments of water diversion between the circulation conduit 29 and the diversion conduit 23. For instance, the user interface may include a keypad including a 'faster' key, or 'up' key 32, and a 'slower' key, or 'down' key 34, for instance, that may be engaged by the user to increase or decrease the speed of the water in the basin, respectively, such as shown in FIG. 11O.

Figure 12B:
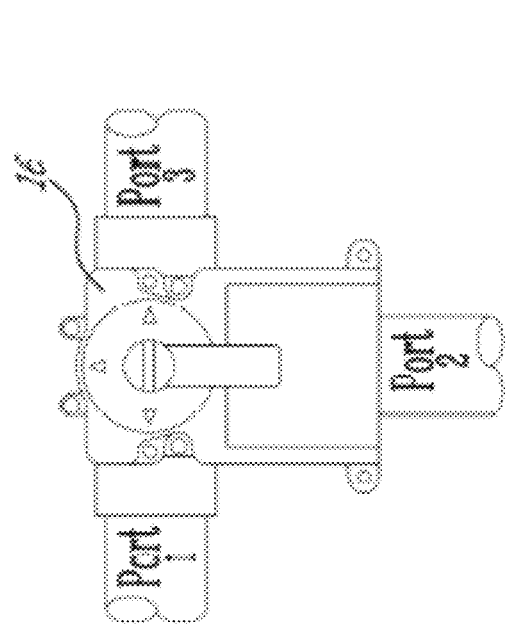
FIG. 12B is a side view of an actuator of the swim in place pool of FIG. 11A.
Figure 12C:
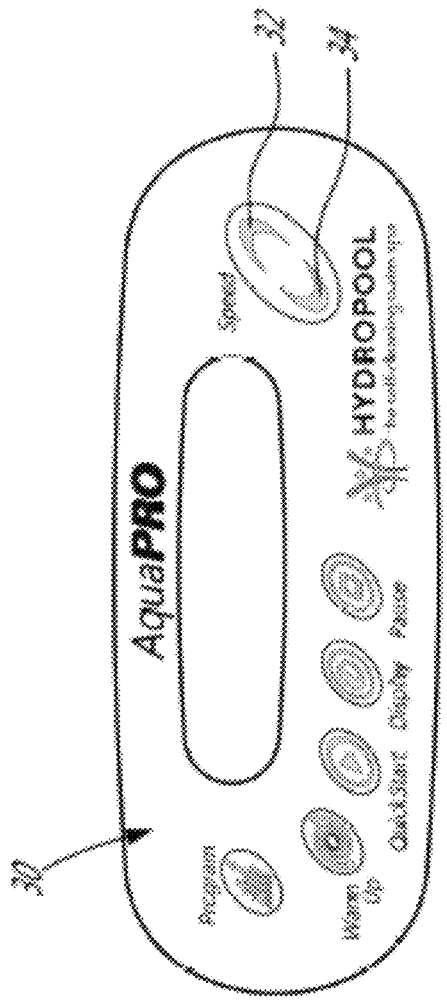
FIG. 12C illustrates an example of a user interface of the swim in place pool of FIG. 11A.
Figure 12A:
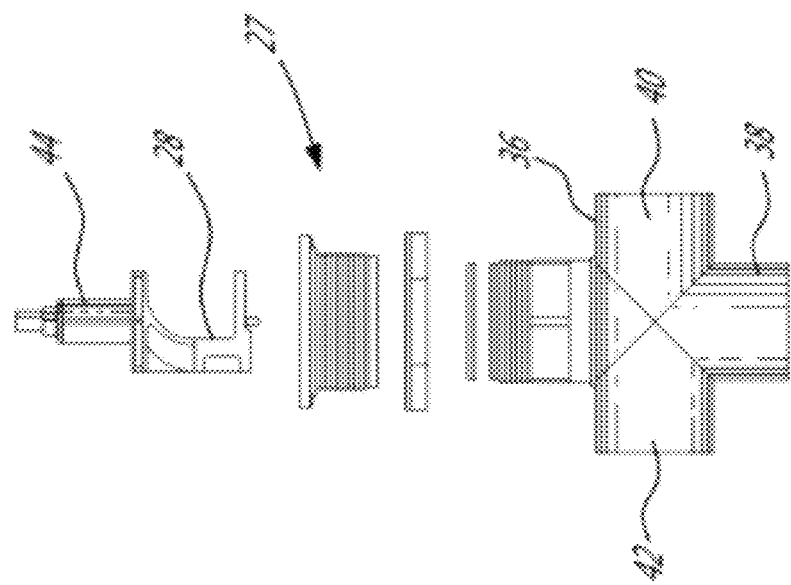
FIG. 12A is an exploded view of a diverter valve, without the actuator, of the swim in place pool of FIG. 11A.

An example of a diverter valve 27 is shown in FIG. 12A. The diverter valve 27 has a fixed diverter body 36 having an inlet 38 and two outlets 40, 42, and a valve member 28 rotatably mounted in the diverter body 36. The valve member 28 has an upper cam and a lower cam, and its rotation controls the relative amount of flow rate being directed to the two outlets 40, 42. A stem 44 protrudes from the valve member 28. The valve actuator 16 is mounted to the stem 44 to control the rotation.

An example of a valve actuator 16 is shown in FIG. 12B.

In the example embodiment, the operation of the automatic water diversion system 10 for a swim in place pool 15 includes activating the pumps 22 of the water circulating subsystems 12a, 12b in a synchronized manner using the controller 18. The user may then adjust the automatic water diversion system 10 and specifically the flow rate of water through the circulation outlets 14. This can be achieved by the user engaging a keypad forming part of the user interface 30 (see FIG. 12C), and located remotely from the electronic adjustable valve actuators 16, and pressing an up 32 or a down 34 arrow, for instance. Depressing the keypad results in the electronic adjustable valve actuators 16 rotating the valve members 28 in accordance with the user's input.

The user has the ability to remotely adjust the flow rate through the outlets 14 by just pressing a keypad, which can conveniently be done while he/she is engaged in the swimming activity. The user has to exert very little pressure in pushing the keypad button to overcome the significant force being exerted on the diverters 18 when the swim in place pool pumps 22 are engaged and the water is being pumped through the water circulating system 12. Furthermore the automatic water diversion system 10 for a swim in place pool 15 can allow for 100 percent diversion of the water from the midpoint jet outlet 25, 25' to the wide stream jet outlet 14. This may be conveniently accomplished without the user having to exert any significant effort or pressure. The ability to divert such dramatically large volumes of water allows for the water flow to be completely customized by the user to accommodate different levels and skills of swimmers.

Other variations and modifications of the invention are possible. For instance, in the embodiment illustrated, it was preferred to use two independent pumps and each associated to a corresponding one of two independent circulation subsystems. In alternate embodiments, it would be possible to use only a single circulation subsystem and only a single pump, for instance. Alternately, it would be possible to use more than two circulation subsystems. Each circulation subsystem could use more than one pump, could have more than one inlet, more than one circulation outlet, and/or more than one diversion outlet, for instance, especially in a context where it may be advantageous to merge and re-separate flow, such as to uniformize flow rate for instance.

Figure 11C:
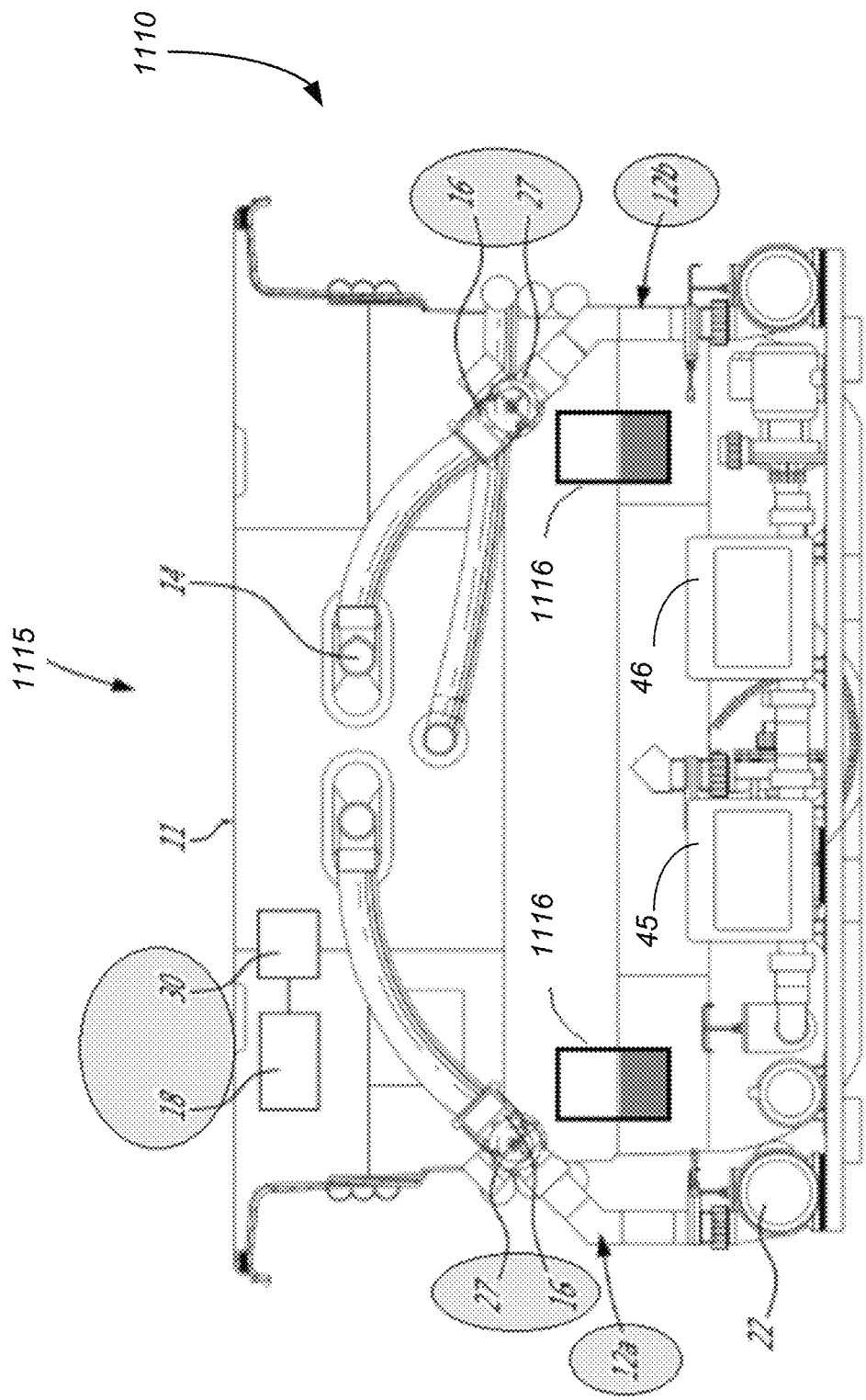
FIG. 11C is a front elevation view of another example of a swim in place pool with an automatic water diversion system, in accordance with some embodiments.

FIG. 11C illustrates, in a front elevation view, another example of a swim in place pool 1115 with an automatic water diversion system 1110, in accordance with some embodiments. This example shows a classic solution with a classic induction motor for centrifugal pumps classic closed loop control (with diverter/three-way valves 27 with actuator 16 controlled by an electronic controller interface 18. This electronic controller interface 18 is in communication with the master controller 45 (which is controlling the slave controller 46 as well). In the master controller 45 resides the software and the ANN algorithms (high level) that control all swim spa elements. FIG. 11C illustrates the transition from a classic solution to a new concept of variable speed solution using a smart motor drive and new generation of electronic controls, the elements 12a, 12b, 17, 18, 27 and 30 may be replaced by the motor drive.

A motor drive 1116 may be used to control the speed of the motor and may comprise hardware and the software that controls the motor. In some embodiments, the motor drive 1116 is a smart device capable of controlling the motor speed, varying the frequency, and also controlling the applied voltage to maintain the optimum flux (magnetic field). The magnetising current in the stator depends on the integral of the voltage over time if the frequency decreases then the period, or length of the sine wave increases, leading to excessive magnetising current in the motor. Therefore, as the frequency is reduced, the voltage applied to the motor is also reduced in proportion. The AC supply may be converted into DC using a rectifier and then converted back to variable frequency supply using an inverter (shown in detail in FIG. 14A and FIG. 14B). The inverter is part of the drive (power board). The drive 1116 has also a control board having a main processor that controls the entire motor drive 1116. In other words the motor drive 1116 may comprise elements shown in FIG. 11B to FIG. 11C, FIG. 27A to FIG. 27E, FIG. 29A to FIG. 29D or FIG. 30A to FIG. 30C. In some embodiments, the controller interface 18 is a small smart controller interface that accommodates the secondary keypad 30, the two valve actuators and it communicates with the master controller 45 and slave controller 46.

The controller, or electronic control system, may be contained or associated with a housing structure adjacent the swim in place pool. In alternate embodiments, the controller can be embodied in various forms. For instance, the controller can alternately be embodied as an application stored in the memory of a smart phone, for instance. In the illustrated embodiment, the controller is housed in a waterproof housing made integral to the basin. Accordingly, as can be understood, the examples described above and illustrated are intended to be exemplary only. The scope is indicated by the appended claims.

In some embodiments, the pumps can be variable speed pumps. The controller 18, can be connected to control and operate the valve actuators 16 in a wired or wireless manner. Similarly, the controller 18 can be connected to the user interface 30 in a wired or wireless manner. A waterproof secondary user interface may be placed conveniently closer to the user. The secondary user interface (30b in FIG. 11C; 902' in FIG. 13A) can be connected to the slave controller 46 (916 in FIG. 13A). The main user interface 18 (902 in FIG. 13A) is connected to the master controller 45 (914 in FIG. 13A) and typically a smart device more complex than 30b (902').

Figure 11D:
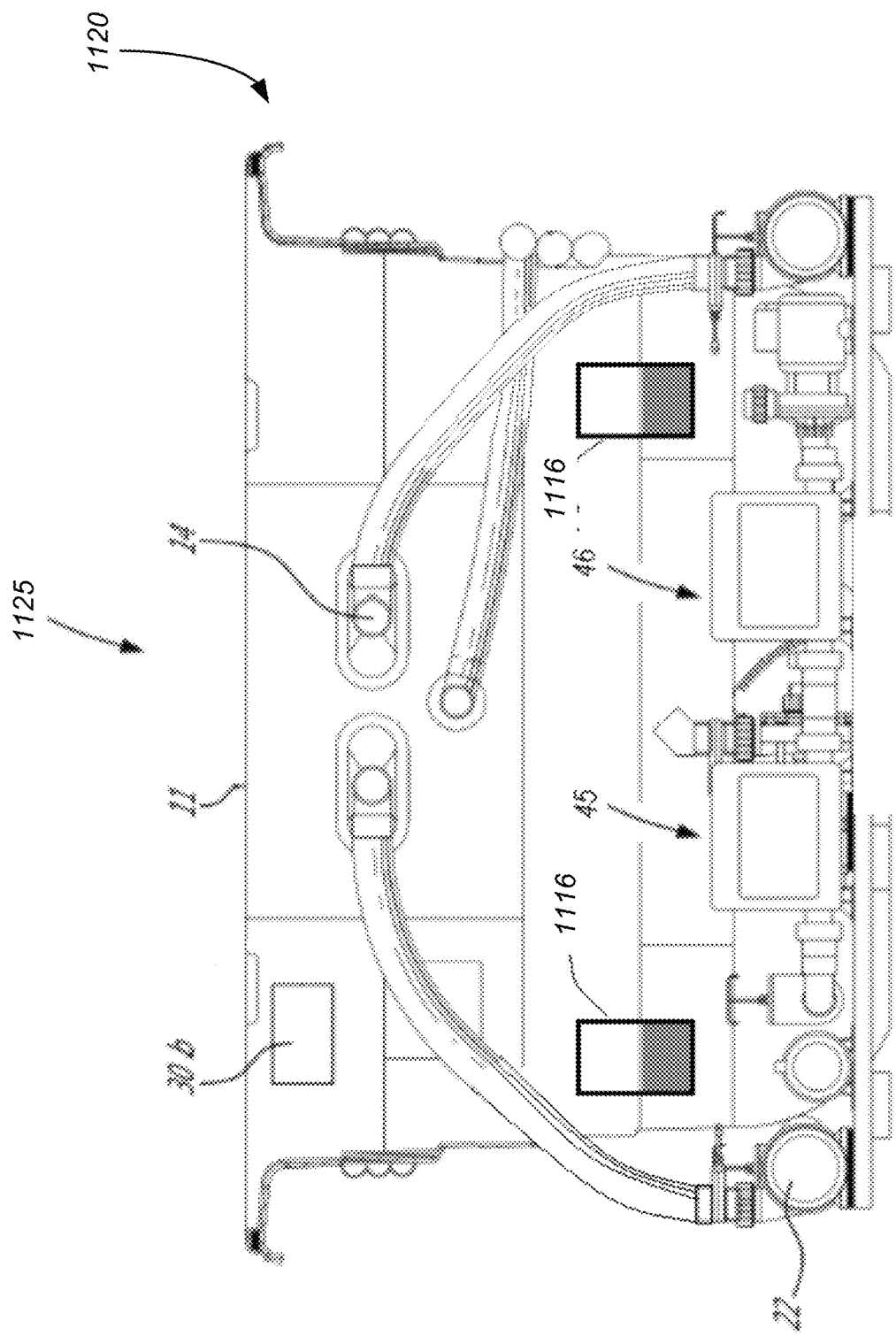
FIG. 11D is a front elevation view of another example of a swim in place pool with an automatic water diversion system, in accordance with some embodiments.

FIG. 11D illustrates, in a front elevation view, another example of a swim in place pool 1125 with a variable speed pump (VSP) subsystem 1120, in accordance with some embodiments. In this example, the user interface 30b may comprise the hardware slave controller 46 in FIG. 11D (916 in FIG. 13A) having more functions and alternative meanings of the keys (buttons). The VSP subsystem 1120 eliminates the three-way valves 27, the actuator 16, and the diverting plumbing and the bypass outlets 25, 25' (see FIGS. 11A and 11B). The user interface 30b may be a dedicated device or an alternative device such a smart phone, a tablet or other suitable device that will have a specific software (i.e., App) and it is waterproof (i.e., IP67 or NEMA6P). All the replaced elements 45, 25', 16, 18, 27 (from FIGS. 11A and 11B) are replaced by a motor drive 1116 having an internal schematic equivalent with the one presented below with reference to FIG. 11B and an adequate software based on Fuzzy/Artificial Neural Network algorithms. The motor drive will feed the pumps motors; the motors could be induction motor (IM), brushless DC motor (BLDC), electronically commuted motor (ECM), permanent magnet synchronous motor (PMSM), —both versions: surface mounted magnets and interior mounted magnets or other type of electric motors.

In some embodiments, the swim spa 15, 1115, 1115' may operate manually, using pre-set programming, and/or in an autonomous mode. Manually, an HMI may be used by a user to increase the speed of the water current in steps from zero to 10 (e.g., 100%), and the system may be overloaded at 12 (e.g., 120%) if necessary. A pre-set program may operate the swim spa in a treadmill style. In the autonomous mode, the system learns the position of the swimmer and emulates a virtual digital swimmer with the same behaviour as the real one. Based on the adaptive predictive algorithm may be based on an Artificial Neural Network (ANN), the system after training is capable to read and control the swimmer behaviour.

In some embodiments, the neural network predictive controller that is implemented in the Neural Network software uses a neural network model of a nonlinear plant to predict future plant performance. The controller then calculates the control input (base on the swimmer position detected by the sensors) that will optimize plant performance over a specified future time horizon. The first step in model predictive control is to determine the neural network plant model (system identification). Next, the plant model is used by the controller to predict future performance (swimmer velocity and duration).

VSP Subsystem 1120

In some embodiments, the VSP subsystem 1120 will work with any machine learning (ML) deep learning (DL) machine that is connected into the home network where the swim spa is connected and has a specific Application to access the swim spa ANN algorithm. Artificial neural networks (ANNs) were inspired by information processing and distributed communication nodes in biological systems. ANNs have various differences from biological brains. Specifically, neural networks tend to be static and symbolic, while the biological brain of most living organisms is dynamic (plastic) and analog. The adjective "deep" in deep learning comes from the use of multiple layers in the network. Early work showed that a linear perceptron cannot be a universal classifier, and then that a network with a no polynomial activation function with one hidden layer of unbounded width can on the other hand so be.

Figure 13A:
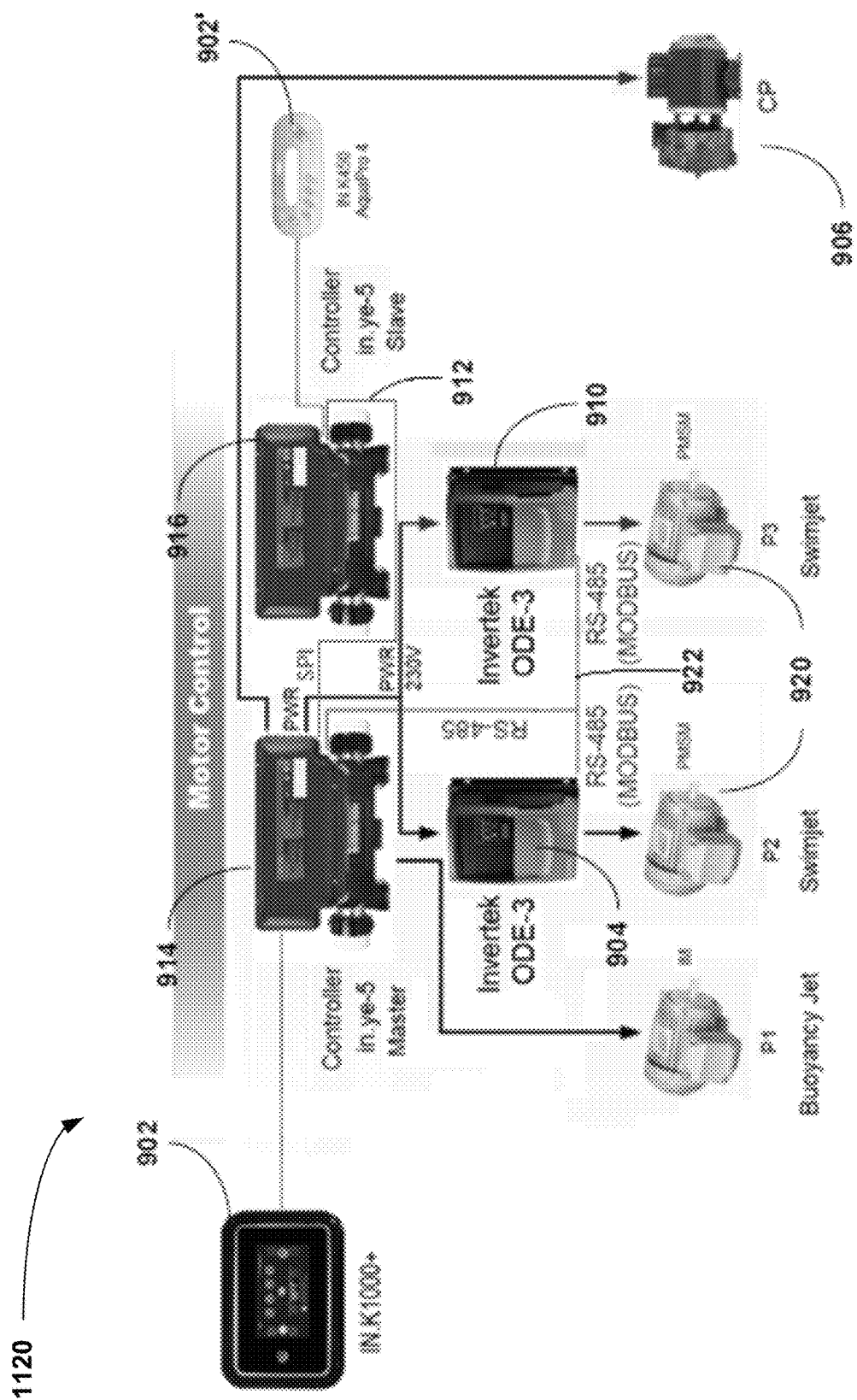
FIG. 13A illustrates, an example of a VSP subsystem, in accordance with some embodiments.

FIG. 13A illustrates, in a component diagram, an example of a VSP subsystem 1120, in accordance with some embodiments. In some embodiments, a swim spa controller has a better microcontroller (i.e. ARM Cortex-M family), more memory and a fast RS-485 serial bus, all this to support a main AI algorithm, a mathematical model, and a software and user-friendly end user interface (swimmer experience) developed using the assembly language of the microcontroller (and Macros).

In some embodiments, a VSP subsystem 1120 may comprise a secondary keypad controller 902', a second motor drive 904, a second PMSM pump 906, a third PMSM pump 908, a third motor drive 910, an SPI bus 912, a master electronic controller 914, a slave electronic controller 916, an inlet 918 with water flow set to approximately 400 GPM into a convergent divergent swim jet 920, a wired RS-485 922 from the master electronic controller 914 to the third motor drive 910, a wired phase power 924 from the master electronic controller 914 to the third motor drive 910, a three phase power wire 926 from the third motor drive 910 to the third PMSM pump 908, an inlet where suction causes water to flow into the third PMSM pump 908, an outlet where the water is discharged outwards to the swim jet 920, and a three-way valve, in accordance with some embodiments. It should be understood that similar connections are present for other PMSM pumps and motor drives.

Closed-Loop Vector Control

When an encoder is used in conjunction with a vector drive to provide shaft position feedback, the system is referred to as closed-loop. Information regarding the shaft position allows the controller to determine if the torque output is incorrect. That is, if the shaft overshoots the desired position, then too much torque is being applied, and vice-versa. Based on shaft position, the voltage can be adjusted to increase or decrease the torque, regardless of motor speed.

Open-Loop Vector Control

Vector control without an encoder, often referred to as open-loop vector control, avoids the need for a feedback device by using a mathematical model of the motor operating parameters. Rather than using a shaft encoder to monitor position, the controller monitors the current and voltage from the motor. It compares these values to the model, and then makes error corrections to the supplied current, which in turn, adjusts the torque. Thus, open-loop vector control requires a very accurate motor model.

It should be noted that in this context, "open-loop" is an inappropriate name. The system is actually closed-loop, but the feedback information comes from within the VFD (Variable Frequency Drive) module itself instead of from an external encoder (i.e., Position and speed estimator using the $i\alpha$, $i\beta$, $V\alpha$, $V\beta$ and Park-Clarke transformations). Therefore, open-loop vector drives are also referred to as "sensorless" vector drives.

Open-loop vector control provides tighter speed control, higher starting torque, and higher low-speed torque than simple V/Hz scalar control, it allows up to 200 percent of the motor's rated torque to be produced at 0 RPM (Revolutions Per Minute).

Permanent Magnet Synchronous Machine (PMSM)

The environmental demands and technological advancement continue to drive the need for advanced motor control techniques that produce energy efficient industrial products using electrical motors and generally electrical devices. The implementation of advanced, cost-effective motor control algorithms is now a reality thanks to the new generation of Digital Signal Controllers (DSCs) base on DSP (Digital Signal Processors).

The commercial products require fast response for speed changes in the motor for example an electrical car. Advanced motor control algorithms are needed to produce faster, secure and quieter units that are more energy efficient and environmentally friendly in all aspects. Field Oriented Control (FOC) has emerged as the leading method to achieve these demands.

DSCs are suitable for motor control devices because they incorporate peripherals that are ideally suited for motor control, such as:

Pulse-Width Modulation (PWM)

Analog-to-Digital Converters (ADCs)

Quadrature Encoder Interface (QEI)
Power Factor Correction (PFC)
Digital Filters (DF)
Over Voltage and Current protection (VIP)
Communication Interfaces (CI)

When performing controller routines and implementing digital filters, DSCs enable designers to optimize code because MAC instructions and fractional operation scan be executed in a single cycle. Also, for operations that require saturation capabilities, the DSCs help avoid overflows by offering hardware saturation protection. DSCs need fast and flexible analog-to-digital (A/D) conversion for current sensing—a crucial function in motor control. The DSCs feature ADCs that can convert input samples at Mega samples rates, and handle up to multiple inputs simultaneously. Multiple trigger options on the ADCs enable use of inexpensive current sense resistors to measure winding currents. For example, the ability to trigger A/D conversions with the PWM module allows inexpensive current sensing circuitry to sense inputs at specific times (switching transistors allow current to flow through sense resistors).

The DSCs Motor Control is specifically designed to control the most popular types of motors, including:
AC Induction Motors (ACIM)
Brushed DC Motors (BDC)
Brushless DC Motors (BLDC)
Permanent Magnet Synchronous Motors (PMSM)-SPM and IPM
Synchronous Reluctance Motors (SynRM)
Line Start PM Motor (LSPM)

Permanent Magnet (PM) motors have higher efficiency than induction motors because there are no copper losses of the rotor. But widespread use of the PM motors has been discouraged by price and requirement of a speed encoder. Low-cost high-performance CPUs and establishment of the speed sensor less control theory, demand for permanent magnet motors is increasing because of their high efficiency, wide driving range, high output torque per unit volume, lighter, compact, high power density, reliability, long life etc. The materials used for making permanent magnets are Alnico (AlNi), Samarium Cobalt, Neodymium Iron Boron (NdFeB), ferrites etc.

PMSM Modeling

The permanent magnet synchronous motor consists of three phase stator similar to that of an induction machine and a rotor with permanent magnets. The machine characteristics depend on the type of the magnets used and the way they are located in the rotor. According to the type of rotor construction PMSM are classified as:
1) Surface mounted PMSM (Projecting type and Inset type)
2) Interior magnet PMSM The surface mounted PMSM is the simplest and widely used configuration. As the relative permeability of the permanent magnet material is almost equal to air, the surface mount PMSM is almost similar to a uniform air gap machine. For interior PMSM the permanent magnets are kept inside the rotor structure and therefore the air gap is not uniform. The control is very similar to that of the vector control of induction machine. Only difference is that the position of rotating reference frame can be directly sensed unlike that of the induction machine. The main features of closed loop control can be summarized as follows:
1) Torque control requires to be controlled.
2) Field normally kept at zero for minimum stator current operation.
3) For rotor field orientation, the instantaneous position of rotor is required. This can be done by using speed sensor or position estimation technique in sensor less control.
4) Using the rotor position the sensed stator current can be transformed to d-q axis currents.

The assumptions made in the modeling of PMSM are:
1) Magnetic saturation is neglected
2) The induced EMF is sinusoidal
3) All the losses are negligible PMSM motor is a standard SM with replaced common rotor field windings and pole structure with permanent magnets put the motor into the category of brushless motors; it is possible to build brushless permanent magnet motors with any even number of magnet poles. The use of magnets enables an efficient use of the radial space and replaces the rotor windings, therefore suppressing the rotor copper losses. Advanced magnet materials (rare earth elements base) permit a considerable reduction in motor dimensions while maintaining a very high power density, lighter and small dimensions.

Permanent Magnet Synchronous Motors (PMSM) are similar to Brushless DC motors (BLDC). PMSM are rotating electrical machines that have a wound stator and permanent magnet rotors that provide sinusoidal flux distribution in the air gap, making the BEMF inform a sinusoidal shape. The construction of the stator and rotor can provide lower rotor inertia and high power efficiency and reduce the motor size.

Depending on how magnets are attached to the rotor, PMSM motors can be classified into two types: surface PMSM (SPMSM or SPM) and interior PMSM (IPMSM or IPM). SPMSM mounts all magnet pieces on the surface, and IPMSM places magnets inside the rotor. PMSMs are classified based on the wave shape of their induced electromotive force (EMF), that is, sinusoidal and trapezoidal. The sinusoidal type is known as PMSM while the trapezoidal type is known as permanent magnet brushless DC (BLDC) machine.

Using mathematical equations, detail modelling of Permanent Magnet Synchronous Motor is discussed in this section. This section will discuss how field oriented control is achieved using D-Q transformation. This section will elaborate Park and Clarke transformation and will show how voltages and currents are converted from one reference frame to another. At the end PMSM an equivalent circuit is derived from Mathematical expressions.

PMSMs are rotating electrical machines that have stator phase windings and rotor permanent magnets; the air gap magnetic field is provided by these permanent magnets and hence they remain constant. While a conventional direct current (DC) motor commutates itself with the use of mechanical commutation, a PMSM needs an electronic commutation for the direction control of current through its windings. PMSM motors have the armature coils at the stator and they need to be commutated externally with the help of an external switching circuit and a three-phase inverter.

Figure 13B:
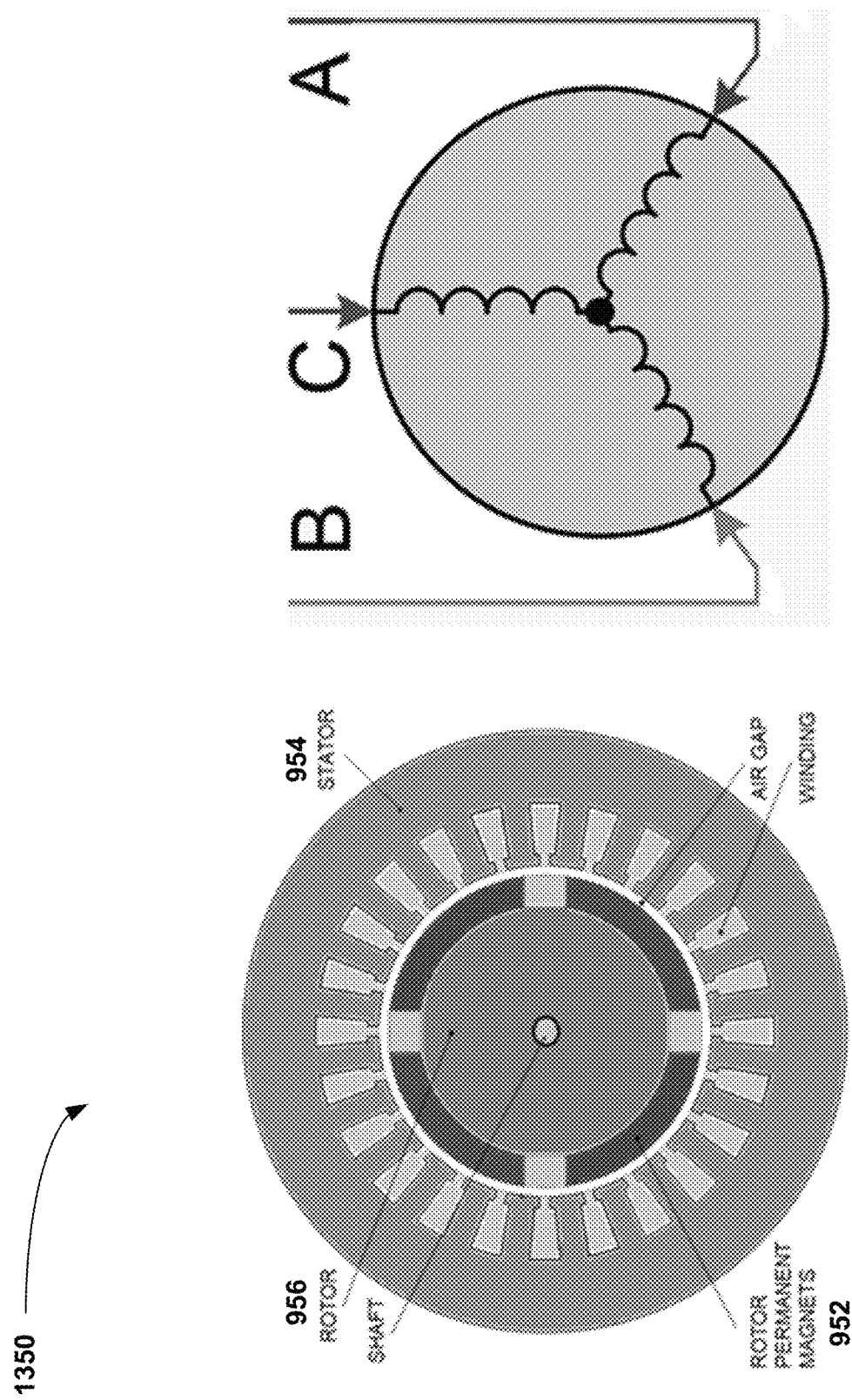
FIG. 13B shows an example of the PMSM in an axial view, in accordance with some embodiments.

FIG. 13B shows an example of the PMSM 1350 in an axial view, in accordance with some embodiments.

The torque is produced due to the interaction of the two magnetic fields, which causes the motor to rotate, in permanent magnet motors, one of the magnetic fields is created by the permanent magnets 952 and the other is created by the stator 954 coils. The maximum torque is produced when the magnetic vector of the rotor 956 is at 90° to the magnetic vector of the stator 954.

PMSMs are controlled by using the rotor position information to synchronize the machine line currents and their sinusoidal back electromotive force (back EMF). Using resolvers, encoders, or hall sensors depending on the level of accuracy and precision required by the application it can be obtained the rotor position. These position transducers have inherent disadvantages such as reduced reliability due to their sensitivity to vibration, high temperature, electromagnetic noise, increased costs, space, labour and weight. For these reasons, the sensorless control of PMSM has become increasingly attractive.

In sensorless control of a PMSM, the rotor position can be estimated by the back EMF of the motor. The advantage of such an approach is the greater flexibility attained to tune the estimator and the PMSM speed control system.

In some embodiments, sensors to measure the temperature and humidity of the air and water may be included. Such measurements can affect the viscosity of the water or air that affects the swimmer's performance. Different temperature and humidity settings may require the water to be pumped at different RPMs in order to maintain a swimmer's location at a particular speed of the swimmer.

Figure 14A:
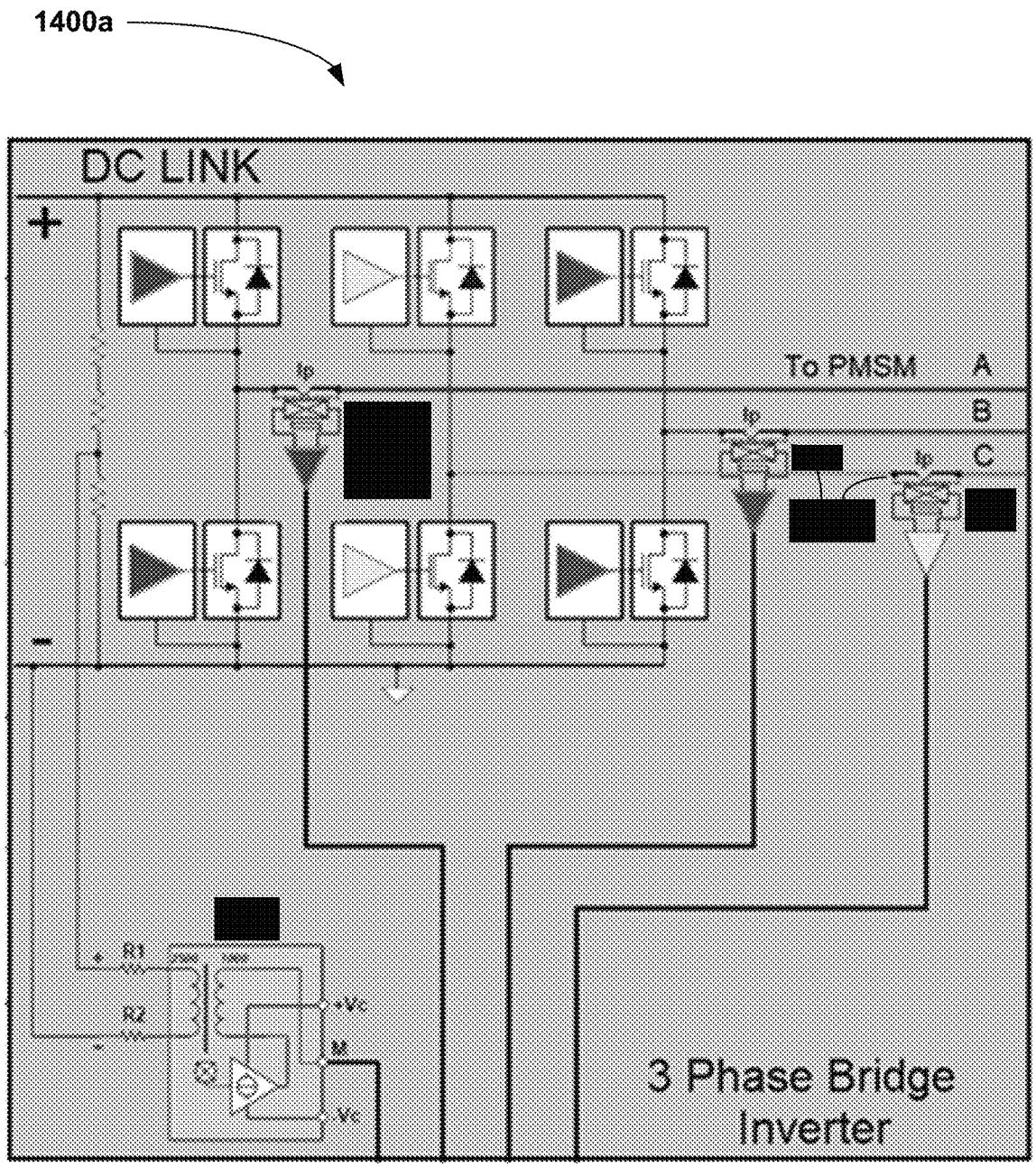
FIG. 14A shows an example of a three phase bridge inverter, in accordance with some embodiments.

FIG. 14A shows an example of a three phase bridge inverter 1400a, in accordance with some embodiments.

Figure 14B:
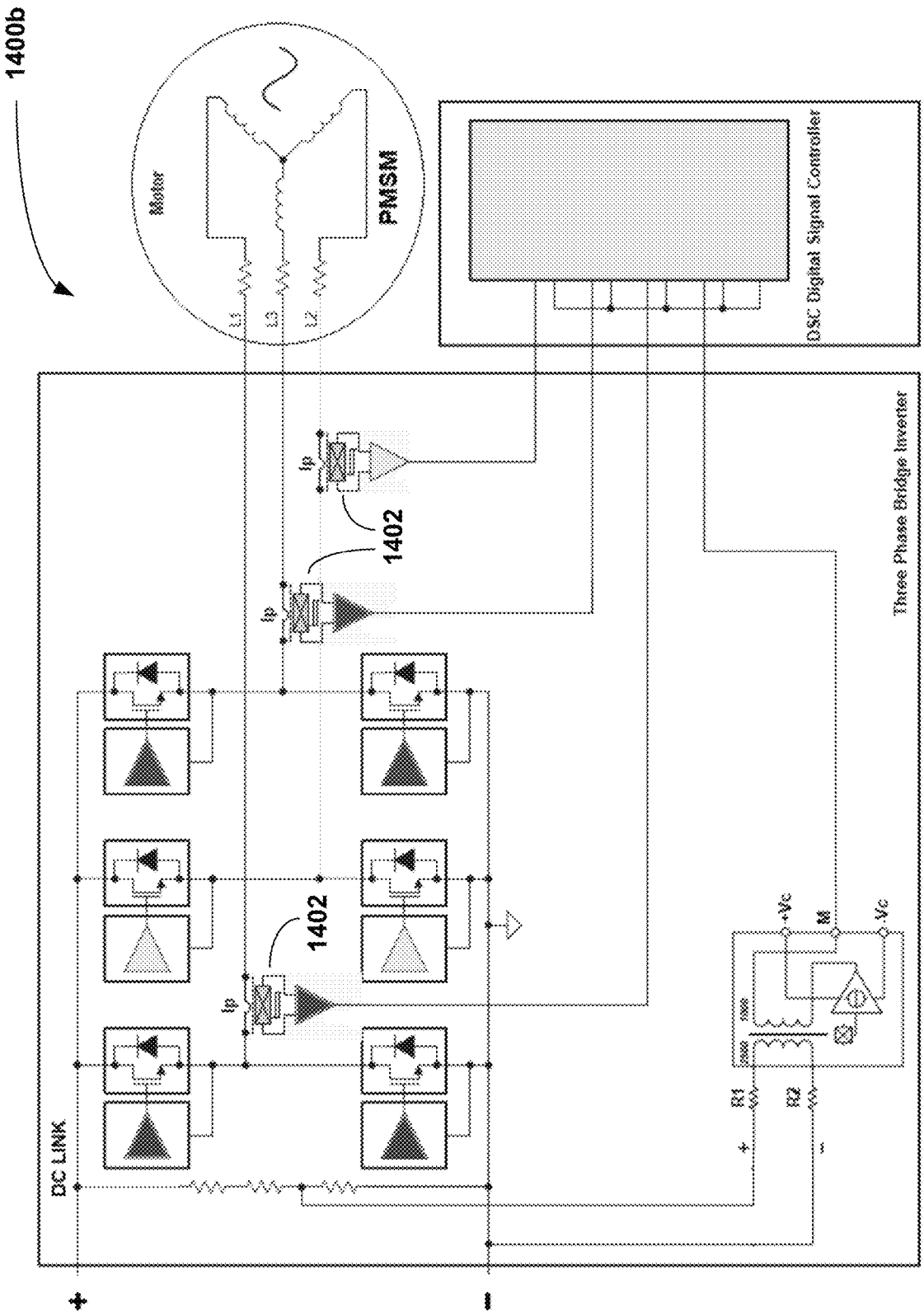
FIG. 14B shows an example of an isolated phase current sense reference design with LEM Hall sensors, in accordance with some embodiments.

FIG. 14B shows an example of an isolated phase current sense reference design with Hall effect sensors 1400b, in accordance with some embodiments.

In some embodiments, a hall effect sensor 1402 may be included to measure the currents used in a three phase transformation (e.g., Clark transformation, Park transformation) to determine a current amperage and current voltage used by a motor. These values may be used to determine if a change in motor RPM is required based on a current position of the object (or swimmer).

Sensorless Field Oriented Control (FOC)

Figure 15A:
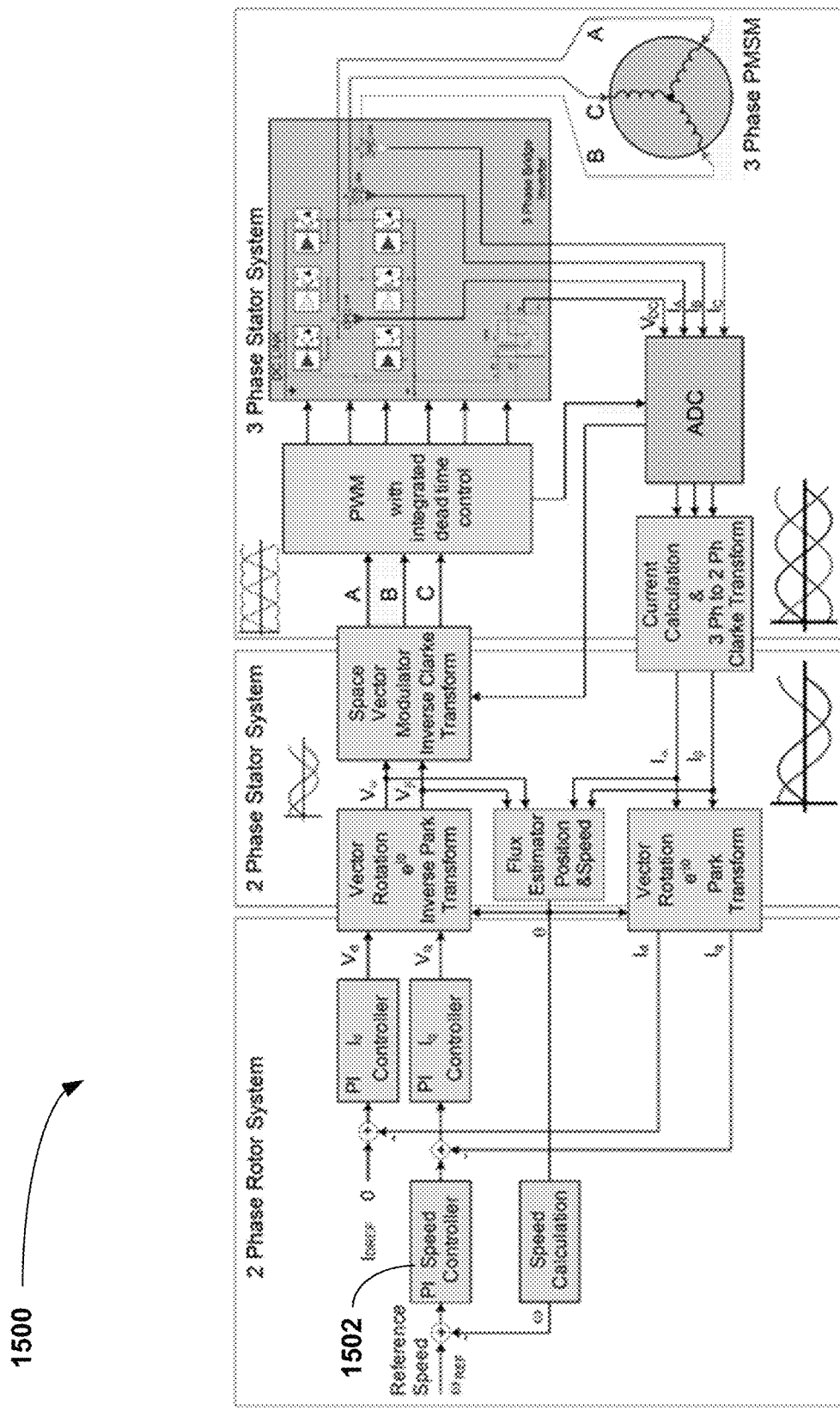
FIG. 15A illustrates, in a block diagram, an example of a sensorless FOC algorithm, in accordance with some embodiments.

FIG. 15A illustrates, in a block diagram, an example of a sensorless FOC algorithm 1100, in accordance with some embodiments. The sensorless FOC algorithm 1500A includes the following FOC blocks: Current Measurement, Clarke Transformation, Inverse Clarke Transformation, Park Transformation, Inverse Park Transformation, Space Vector Pulse Width Modulation, PWM Generation, Angle Calculation, Speed Calculation, Open Loop Mode, and Ramp Function.

The model used for vector control design can be understood by using space vector theory. The 3-phase motor quantities (such as voltages, currents, magnetic flux, etc.) are expressed in terms of complex space vectors. Such a model is valid for any instantaneous variation of voltage and current and adequately describes the performance of the machine under both steady-state and transient operation. The complex space vectors can be described using only two orthogonal axes. The motor can be considered a 2-phase machine. Using a 2-phase motor model reduces the number of equations and simplifies the control design.

Three phase motors have three windings distributed 120 degrees phase apart. In the stationary reference frame three phases a, b, c are at fixed angles however they have a time varying amplitude. Differential coefficient associated with these vectors is time varying when the system is rotating. Since fluxes, currents induced voltages and flux linkages are always changing it becomes challenging to model the system mathematically. For simplification of this complex analysis, a mathematical transformation is carried out to solve equations involving variables with respect to a common reference frame. In this thesis, Park and Clarke transformation is discussed.

In a permanent magnet synchronous motor vector control scheme, Clarke and Park transformation are mainly used. This section will discuss Clarke, Inverse Clarke, Park and Inverse Park transformation. Table 1 shows three phase reference quantities for Park and Clarke transformation:

TABLE 1

Phase Reference Quantities for Park and Clarke Transformation

| | |
|---|---|
| Va, Vb, Vc, Ia, Ib, Ic | Three phase values |
| Vα, Vβ, Iα, Iβ | Orthogonal stationary reference frame values |
| Vq, Vd, Iq, Id | Rotating reference frame values |
| θ | Rotor flux position |

Figure 15B:
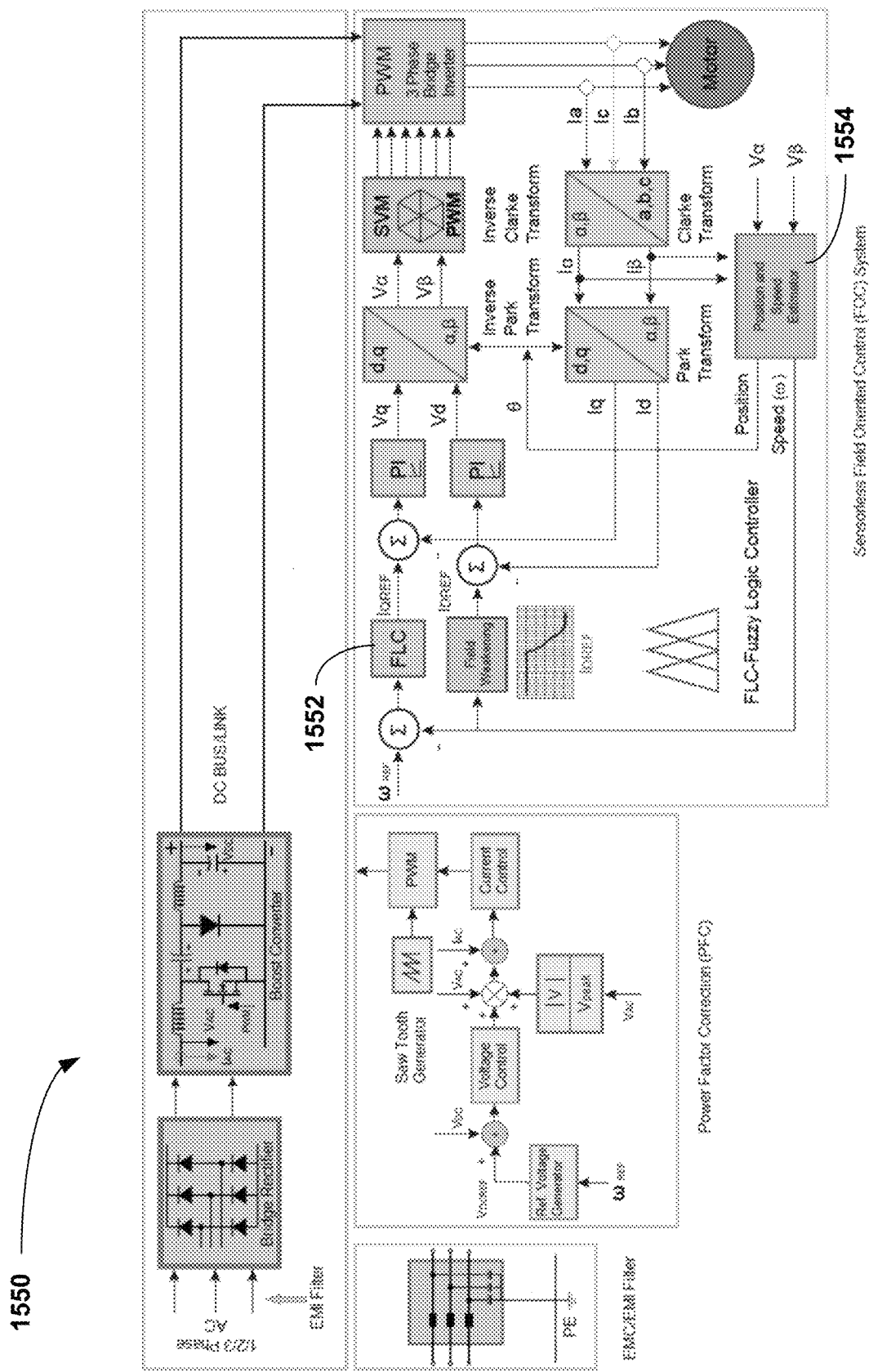
FIG. 15B illustrates, in a schematic diagram, an example of a sensorless FOC with fuzzy $I_{Q\_REF}$ controller and position speed estimator for one motor, in accordance with some embodiments.

FIG. 15B illustrates, in a schematic diagram, an example of a sensorless FOC with fuzzy $I_{Q\_REF}$ controller and position speed estimator for one motor 1550, in accordance with some embodiments. In some embodiments, an FLC 1552 may be used in place of PI speed controller 1502.

Figure 16A:
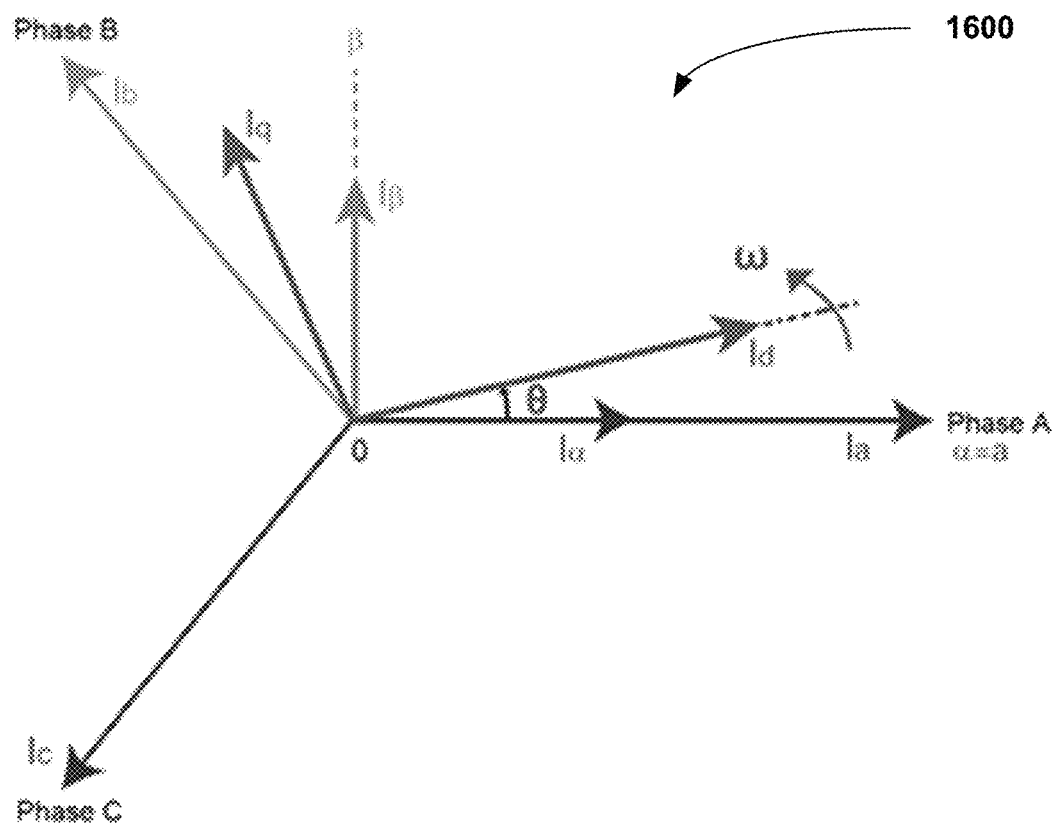
FIG. 16A illustrates, a vector representation of different reference frames, in accordance with some embodiments.

FIG. 16A illustrates, a vector representation 1600 of different reference frames, in accordance with some embodiments. Three phase values include Va, Vb, Vc, Ia, Ib, Ic. Orthogonal stationary reference frame values include Vα, Vβ, Iα, Iβ. Rotating reference frame values include Vq, Vd, Iq, Id. θ is the rotor flux position.

Figure 16B:
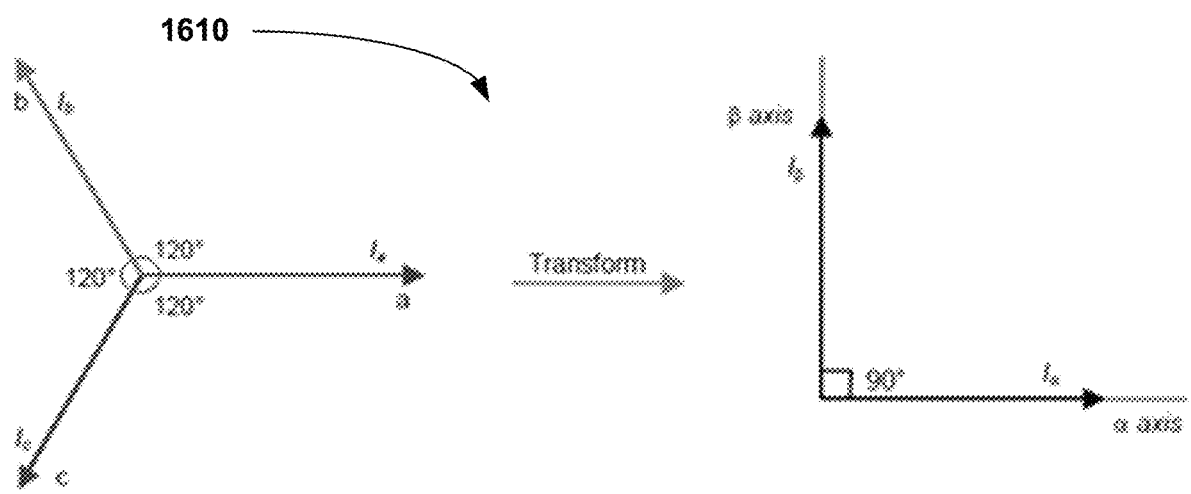
FIG. 16B illustrates an example of a Clarke transformation, in accordance with some embodiments.

FIG. 16B illustrates an example of a Clarke transformation 1610, in accordance with some embodiments. In this transformation, three phase quantities in a three phase reference frames are transformed into the two-phase quantities of an orthogonal stationary reference frame:

$$I\alpha = 2/3(Ia) - 1/3(Ib - Ic) \quad (1)$$

$$I\beta = 2/\sqrt{3}(Ib - Ic) \quad (2)$$

Figure 16C:
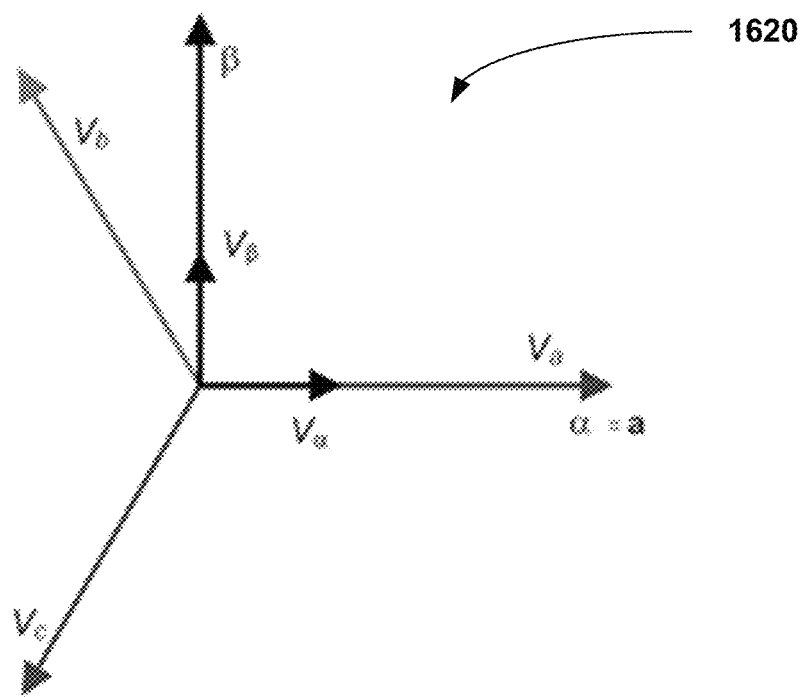
FIG. 16C illustrates an example of an inverse Clarke transformation, in accordance with some embodiments.

FIG. 16C illustrates an example of an inverse Clarke transformation 1620, in accordance with some embodiments. In this transformation, two-axis quantities of an orthogonal reference frame are transformed into three-phase quantities of a stationary reference frame:

$$Va = V\alpha \quad (3)$$

$$Vb = (-V\alpha + \sqrt{3} * V\beta)/2 \quad (4)$$

$$Vc = (-V\alpha - \sqrt{3} * V\beta)/2 \quad (5)$$

Figure 16D:
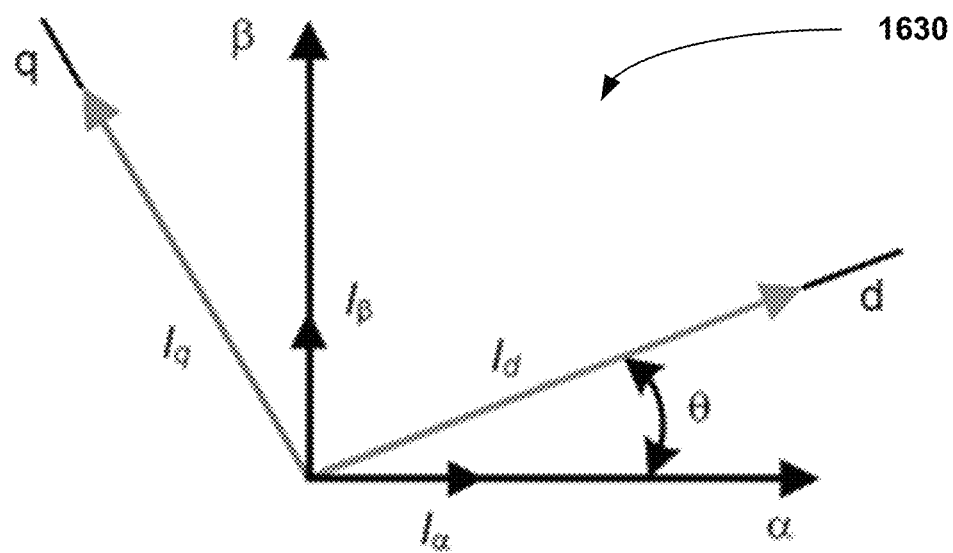
FIG. 16D illustrates an example of a Park transformation, in accordance with some embodiments.

FIG. 16D illustrates an example of a Park transformation 1630, in accordance with some embodiments. In this transformation, two axis quantities of an orthogonal reference frame are transformed into two-axis quantities of a rotating frame quantities:

$$Id = I\alpha * \cos\theta + I\beta * \sin\theta \quad (6)$$

$$Iq = I\beta * \cos\theta - I\alpha * \sin\theta \quad (6)$$

Figure 16E:
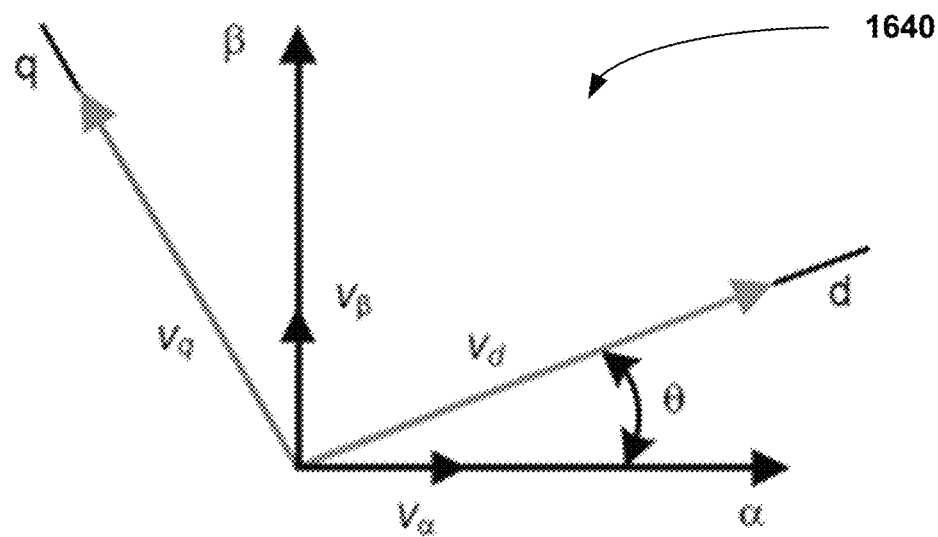
FIG. 16E illustrates an example of an inverse Park transformation, in accordance with some embodiments.

FIG. 16E illustrates an example of an inverse Park transformation 1640, in accordance with some embodiments. In this transformation, two-axis quantities in a rotating reference frame are transformed into two-axis quantities of an orthogonal stationary reference frame:

$$V\alpha = Vd * \cos\theta - Vq * \sin\theta \quad (8)$$

$$V\beta = Vq * \cos\theta + Vd * \sin\theta \quad (9)$$

For modelling of PMSM drive systems, d-q to a-b-c block is used in case of FOC controlled scheme. And in case of PWM control scheme both a-b-c to d-q and d-q to a-b-c blocks are used. d-q to a-b-c transformation is achieved by reverse Park transformation and a-b-c to d-q is achieved by Park Transformation.

The following three equations are used to convert d-q to a-b-c:

$$Va = Vq^*\cos\theta - Vd^*\sin\theta \quad (10)$$

$$Vb = Va^*\cos(\theta - 2\pi/3) - Vd^*\sin(\theta - 2\pi/3) \quad (11)$$

$$Vc = Vq^*\cos(\theta + 2\pi/3) - Vd^*\sin(\theta + 2\pi/3) \quad (12)$$

To convert a-b-c to d-q following equations are used:

$$Vq = \tfrac{2}{3}[Va^*\cos\theta + Vb^*\cos(\theta - 2\pi/3) + Vc^*\cos(\theta + 2\pi/3)] \quad (13)$$

$$Vd = -\tfrac{2}{3}[Va^*\sin\theta + Vb^*\sin(\theta - 2\pi/3) + Vc^*\sin(\theta + 2\pi/3)] \quad (14)$$

Figure 16F:
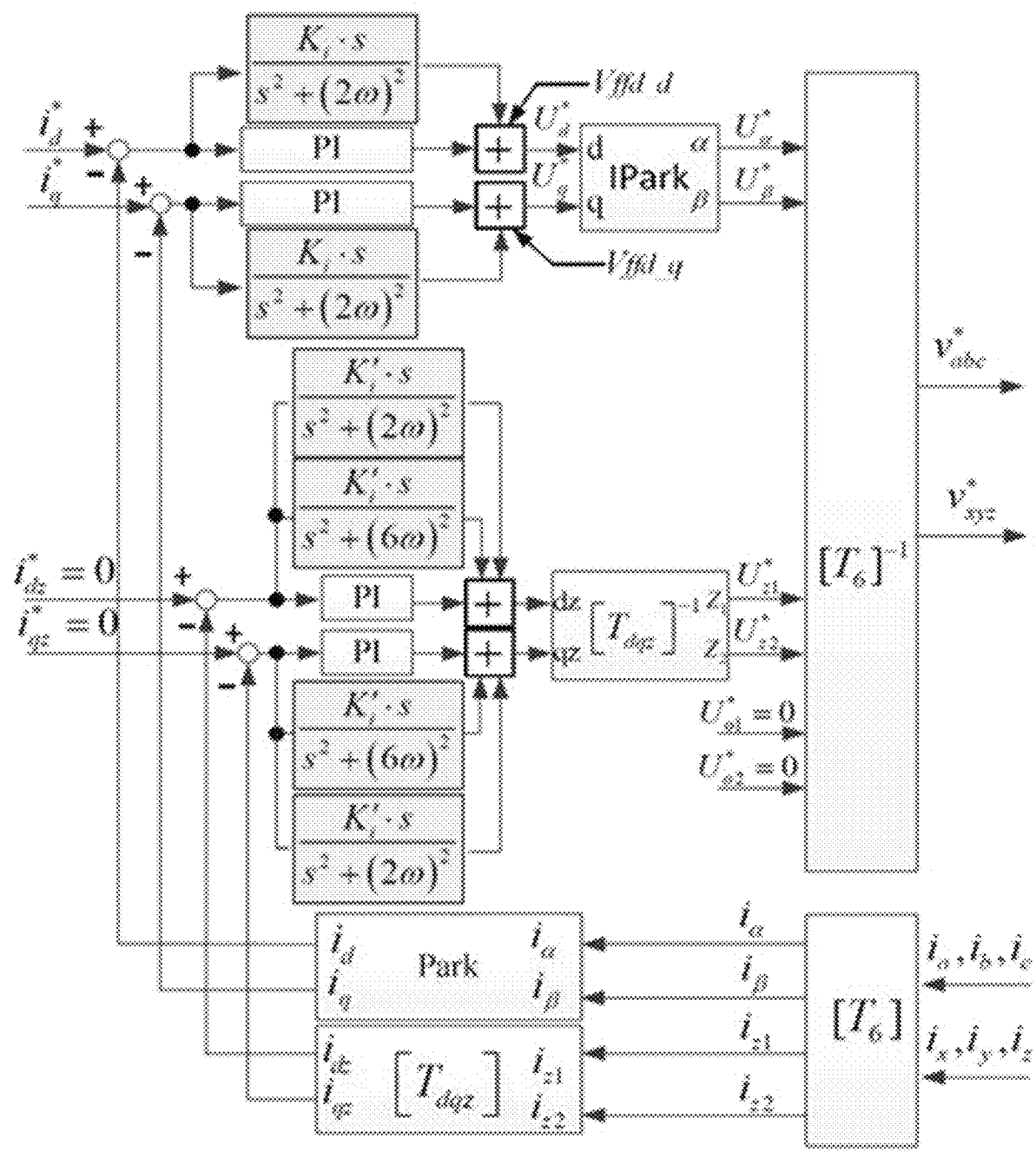
FIG. 16F illustrates, in a schematic diagram, an example of a method of controlling a VSP, in accordance with some embodiments.

FIG. 16F illustrates, in a schematic diagram, an example of a method of controlling a VSP 1650, in accordance with some embodiments.

Figure 17:
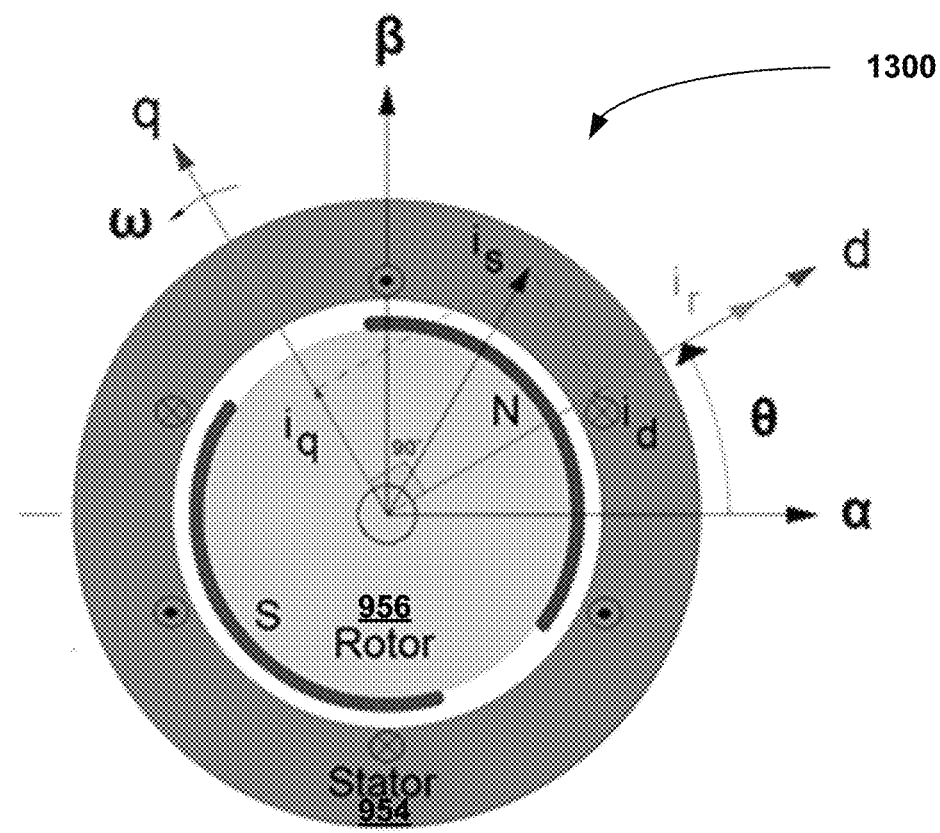
FIG. 17 illustrates an example of a PMSM motor axis, in accordance with some embodiments.

Synchronous motors is called so because the speed of the rotor of this motor is the same as the rotating magnetic field. It is a fixed speed motor because it has only one speed, which is synchronous speed, or in other words, it is in synchronism with the supply frequency. Synchronous speed (Ns) is given by Ns=120 f/$n_P$=60 f/P, P=$n_p$/2, where f=frequency, P=Pair of poles, $n_p$=Number of poles For simulation of a PMSM drive system detailed modelling of the system is performed. FIG. 17 illustrates an example of a PMSM motor axis 1700, in accordance with some embodiments. The "q" axis is the axis of motor torque along which the stator flux must be developed. The "d" axis is the "direct" axis of the rotor flux. Theta is the electrical rotor angle. Alpha axis is aligned with the stator phase A. α-β are stator coordinates, d-q are motor coordinates, and θ is the rotor flux position. FIG. 17 shows d-q model of a PM drive system developed on a rotor reference frame. The rotating d-axis is inclined at an angle of θr with a stator axis. The magnetomotive force (mmf) of stator is inclined at an angle α with respect to rotor axis. Also the rotor and stator mmf rotates at the equal speed.

The rotor 956 of the synchronous motor can be built using an electrically excited winding or alternatively a Permanent Magnet (PM). In the second case, the resulting motor is called Permanent Magnet Synchronous Motor (PMSM). A surface mounted (SM) Permanent Magnet Synchronous Motor with multiple-pole and 3-phase (possible single phase) has considered for applications. The flux in the machine is mainly set up by the permanent magnets in the rotor 956, which ideally produce a sinusoidal distributed flux in the air gap. The rotor iron in cross section is approximately circular and the stator 954 inductance is low, as well as independent from the rotor position. For the SMPMSM (or SPM) the stator phase voltages and currents are ideally sinusoidal. The control becomes simple and the reluctance effect can be neglected. Field weakening is difficult due to the low stator inductance, and thus the operation above nominal speed becomes difficult.

To develop motor model, 3 different reference frames are defined, as follows: 3-phase stator frame (a-b-c), 2-phase stationary frame (α-β) and a 2-phase rotational frame (d-q). In order to have constant reference values for the currents, the control is performed in the rotor oriented coordinate system—(d-q), which is rotating synchronously with the rotor, while the coordinate system (α-β) is stationary. With quadrature current control, the current vector is always aligned with the q-axis. Only the fundamental of the flux and current distribution in the machine is considered. The equations of SMPMSM model in the rotational (d-q) reference frame are described by the following relations:

In some embodiments, the following assumptions may be made for the modelling of a PMSM on the rotor reference frame.

Figure 18:
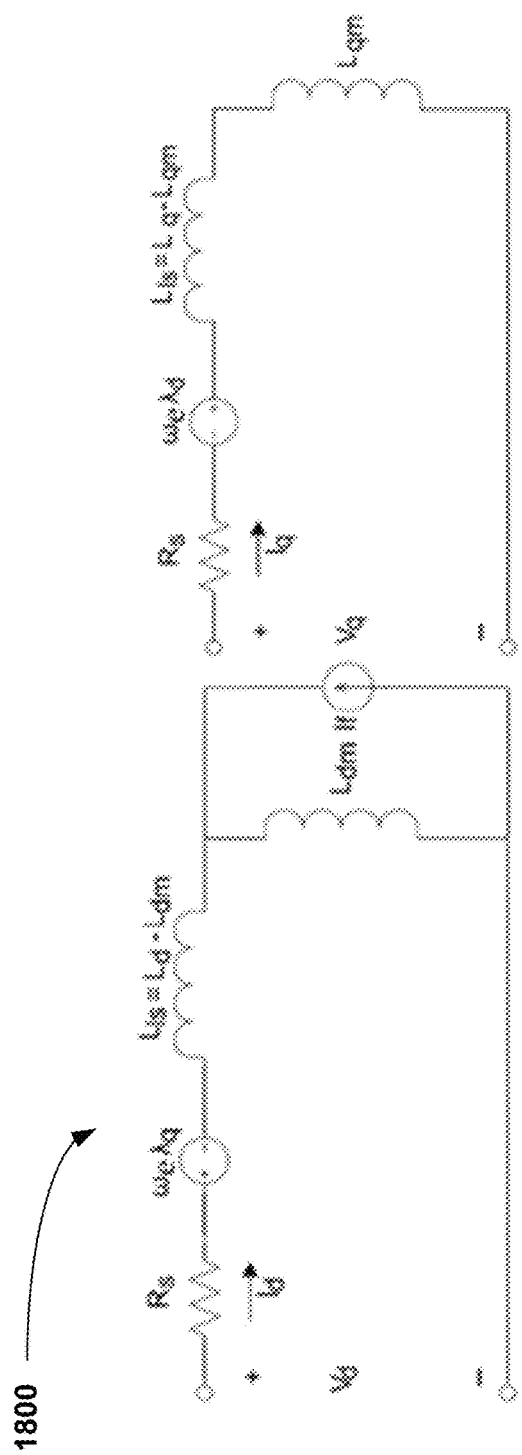
FIG. 18 illustrates, in a circuit diagram, an example of an equivalent circuit of PMSM, in accordance with some embodiments.

1. Induced EMF is sinusoidal in nature
2. Saturation is not considered
3. Field current dynamics is none
4. Eddy currents and the hysteresis losses are negligible FIG. 18 illustrates, in a circuit diagram, an example of an equivalent circuit 1800 of PMSM, in accordance with some embodiments.

Figure 19:
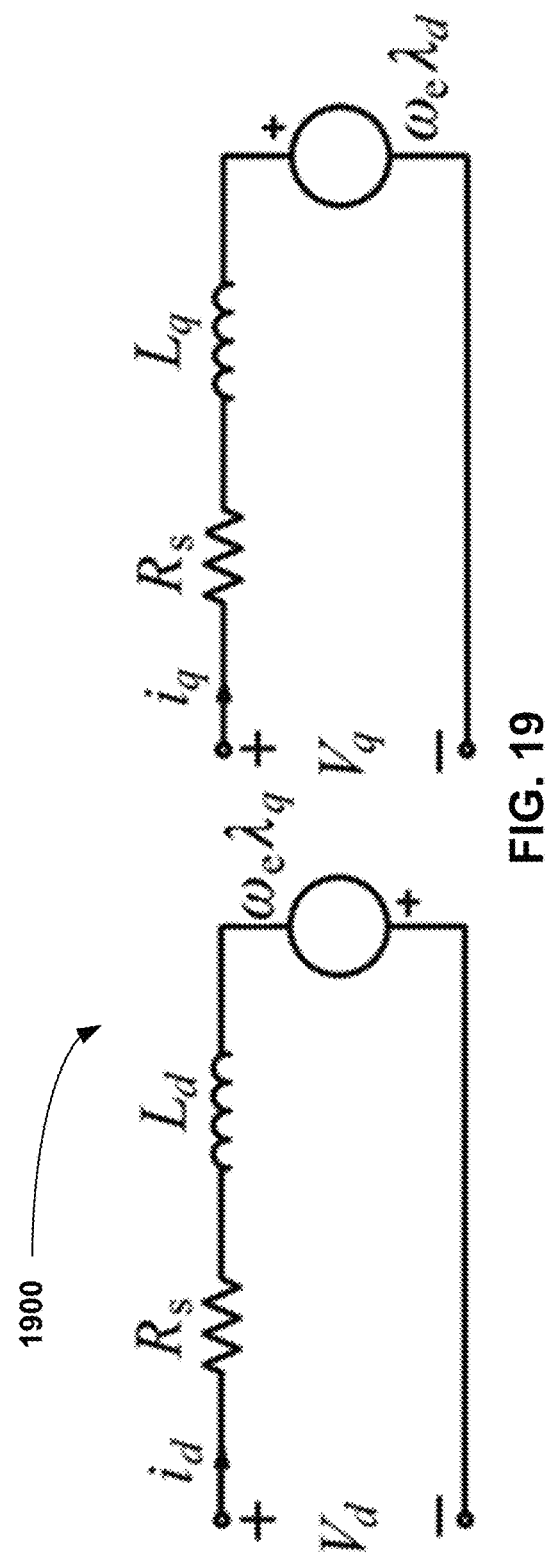
FIG. 19 illustrates, in a circuit diagram, an example of a PMSM d-q-axis dynamic equivalent circuit, in accordance with some embodiments.

FIG. 19 illustrates, in a circuit diagram, an example of a PMSM d-q-axis dynamic equivalent circuit 1900, in accordance with some embodiments. The circuit 1900 in this example is simplified. The voltage equations in d-q form are:

$$Vq = Rsiq + \omega_e \lambda d + \rho\lambda q \quad (15)$$

$$Vd = Rsid - \omega_e \lambda q + \rho\lambda d \quad (16)$$

Flux linkages of PMSM are:

$$\lambda_q = L_q i_q \quad (17)$$

$$\lambda_d = L_d i_d \quad (18)$$

Introducing equations (17) and (18) equations into equations (15) and (16)

$$Vq = Rsiq + \omega e(Ldid + \lambda f) + \rho Lqiq \quad (19)$$

$$Vd = Rsid - \omega eLqiq + (Ldid + \lambda f) \quad (20)$$

Arranging in above equations in the form of matrix:

$$\begin{pmatrix} V_q \\ V_d \end{pmatrix} = \begin{pmatrix} R_s + \rho L_q & \omega_e L_d \\ -\omega_e L_q & R_s + \rho L_d \end{pmatrix} \begin{pmatrix} i_q \\ i_d \end{pmatrix} + \begin{pmatrix} \omega_e \lambda_f \\ \rho \lambda_f \end{pmatrix} \quad (21)$$

The torque developed is:

$$Te = 3/2 P(\lambda diq - \lambda qid) \quad (22)$$

where λd, λq, Vd, Vq, id and iq are the motor fluxes, voltages and currents in d-q coordinates; ωe is the electrical angular speed and Te is the electromagnetic torque. Regarding the motor parameters, λf is the flux of the permanent magnet, P is the number of pole pairs, Rs is the stator resistance and the stator inductance can be divided into two different components Ld and Lq due to the particularities of the PMSM.

The model is completed with the mechanical equation:

$$Te = TL + B\omega + J(d\omega/dt) \quad (23)$$

The mechanical rotor speed from equation (23) is:

$$\omega f = ((Te - TL - B\omega)/J)dt \quad (24)$$

$$\omega = \omega_e/P \text{ or } \omega_e = \omega P \quad (25)$$

where J is the inertia of the motor and coupled load, TL is the load torque, B is the friction coefficient and ω is the mechanical angular speed (rotor speed). The torque relation Te becomes:

$$Te = 3/2 P(\lambda_f iq - (Lq - Ld)iqid) \quad (26)$$

if the equations (3.17) and (3.18) are introduced in (3.22). Since the motor is with Surface Mounted PM (SMPMSM) the rotor has no saliency and the inductances can be considered to be equal Lq=Ld (except field weakening). The expression of torque under this circumstance is:

$$Te = 3/2 P(\lambda_f iq) = K_T iq, \; (K_{Tb} = 3/2 P \lambda_f) \quad (27)$$

Torque depends only by iq and $\lambda_f$. $K_T$ represents the torque constant and iq=$i_{rms}$ is the root mean square value of the stator line current.

Analysis and Control of PMSM Drive

In the control of SMPMSM the decoupling of the torque and flux magnitudes can be achieved, emulating a DC motor, by means of the FOC strategy. This is achieved by using the (d-q) transformation that separates the components $i_d$ and $i_q$ of the stator current responsible for flux and torque production, respectively. Due to the presence of the constant flux of the permanent magnet—$\lambda_f$, there is no need to generate flux by the $i_d$ current. This component current must be kept at zero value, which in turns decreases the stator current and increases the efficiency of the motor drive ($i_d$=0).

The iq quadrature current control gives the maximum torque per unit stator current. Since $K_T$ is proportional to the magnet flux-linkage—$\lambda_f$, a change in the magnets remanence directly affects $K_T$. The motor torque is directly proportional to iq current component and it is used to produce the required torque. The PMSM has the fastest dynamic response and also operates in the most efficient state.

Due to the nature of the dynamics of the swim spa system 400, several control algorithms could be applied. Each control scheme has its advantages and disadvantages. The control schemes used could be categorized as linear and non-linear control schemes.

Proportional-Integral-Derivative (PID)

Figure 20:
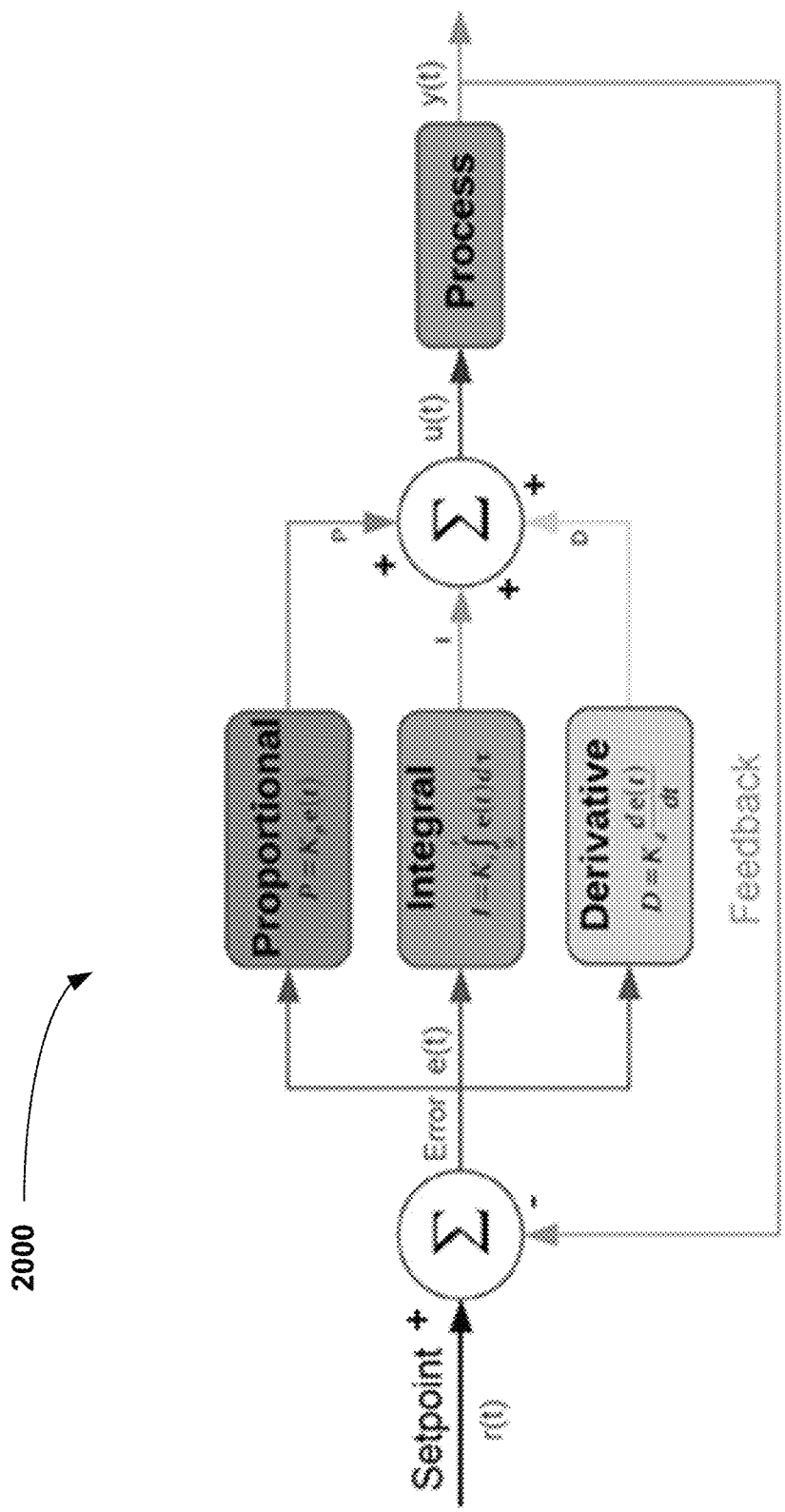
FIG. 20 illustrates, in a block diagram, an example of a proportional-integral-derivative (PID) controller, in accordance with some embodiments.

FIG. 20 illustrates, in a block diagram, an example of a proportional-integral-derivative (PID) controller 2000, in accordance with some embodiments. The PID controller 2000 may be used in variable speed motors. The PID linear controller 2000 has the advantage that parameter gains are easy to adjust, is simple to design and has good robustness. However, some of the major challenges with the swim spa includes the non-linearity associated with the nature of mathematical model. Therefore, applying PID controller 2000 to the swim spa system 400 may limit the performance.

Proportional Integral (PI)

Figure 21:
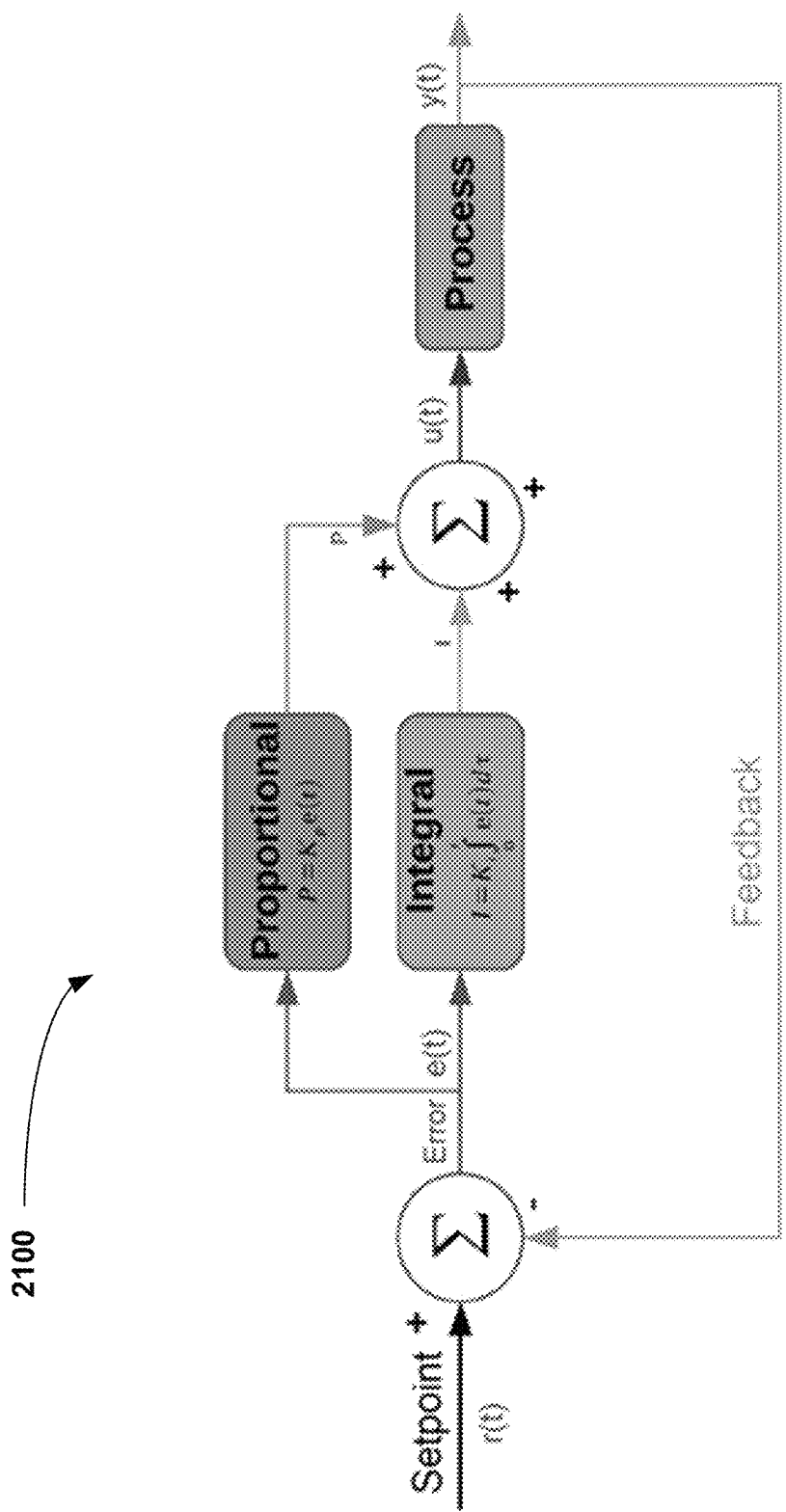
FIG. 21 illustrates, in a block diagram, an example of a proportional integral (PI) controller, in accordance with some embodiments.

FIG. 21 illustrates, in a block diagram, an example of a proportional integral (PI) controller 2100, in accordance with some embodiments. In proportional integral mode, the controller 2100 may perform the following: Multiply the Error by the Proportional Gain (Kp) and Added to the Integral error multiplied by Ki, to get the controller output.

Linear Quadratic Regulator/Gaussian LQR/G

Figure 22:
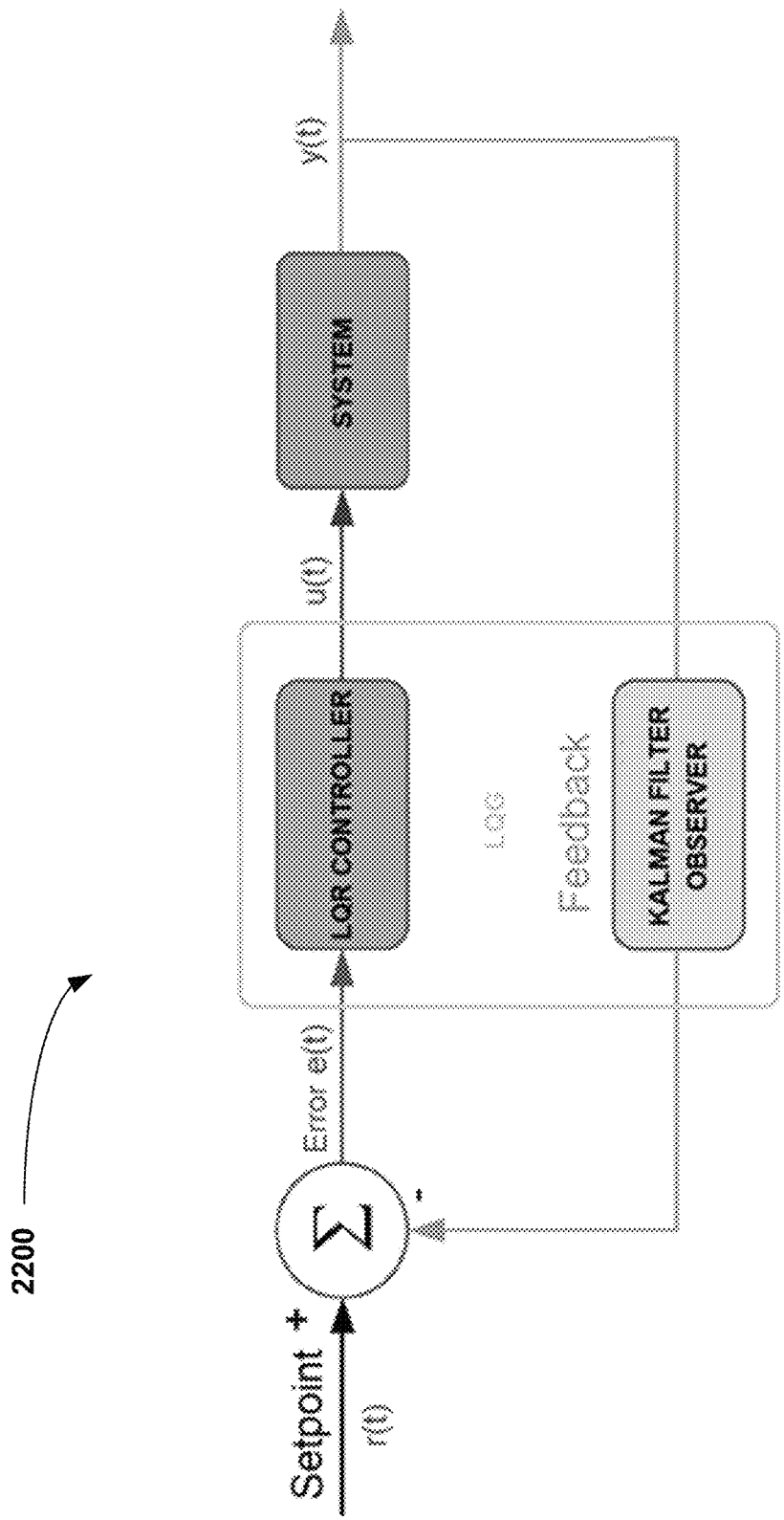
FIG. 22 illustrates, in a block diagram, an example of a linear quadratic regulator (LQR) controller, in accordance with some embodiments.

FIG. 22 illustrates, in a block diagram, an example of a linear quadratic regulator (LQR) controller 2200, in accordance with some embodiments. LQR is a control technique that can find the state feedback gain for a closed loop system. In LQR control the open-loop poles can be relocated to get a stable system with optimal control and minimum cost for given weighting matrices of the cost function. It is the optimal theory of pole placement method. To get the optimal gains, one may describe the optimal performance index and then solve algebraic Riccati equation:

$$A^T P + + P A - P B R^{-1} B^T P + Q = 0 \quad (28)$$

where P is the symmetric positive-definite matrix. The regulator gain K is given by, $$K = T^{-1}(T)^{-1} R P = R^{-1} B^T P \quad (29)$$

The cost function is, $$J = \int x(t)^T Q x(t) + u(t)^T R u(t) dt \quad (30)$$

where Q and R are the matrices, they are commonly tuned by trial and error method. The choice of the values of Q and R, the cost function is minimised.

The LQR optimal control algorithm operates a dynamic system by minimizing a suitable cost function.

In combination with a Linear Quadratic Estimator (LQE) and Kalman

Filter, the LQR algorithm transforms into the Linear Quadratic Gaussian (LQG). This algorithm is for systems with Gaussian noise and incomplete state information.

Sliding Mode Control (SMC)

Figure 23:
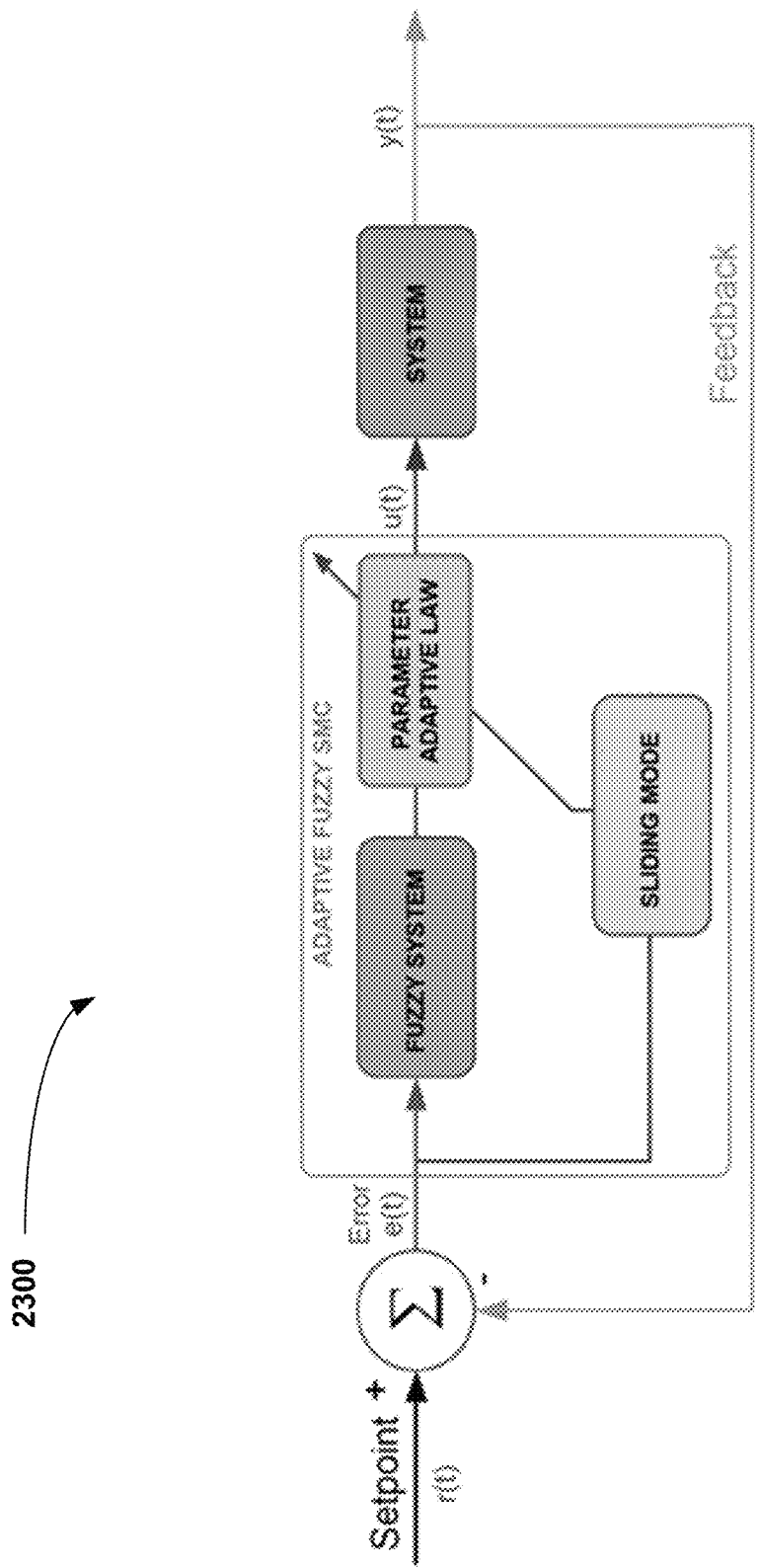
FIG. 23 illustrates, in a block diagram, an example of an adaptive fuzzy sliding mode control (SMC) controller, in accordance with some embodiments.

FIG. 23 illustrates, in a block diagram, an example of an adaptive fuzzy sliding mode control (SMC) controller 2300, in accordance with some embodiments.

Sliding mode control (SMC) is a nonlinear control algorithm that works by applying a discontinuous control signal to the system to command it to slide along a prescribed path. Its main advantage is that it does not simplify the dynamics through linearization and has good tracking.

Adaptive fuzzy sliding mode control combines the advantages between adaptive fuzzy control and sliding mode control, which can not only adjust the adaptation law on line when uncertain function exists but also ensure the robustness of the considered nonlinear system.

Back Stepping Control (Integrator)

Back stepping control is a recursive algorithm that breaks down the controller into steps and progressively stabilizes each subsystem. Its advantage is that the algorithm converges fast leading to less computational resources and it can handle disturbances well. The main limitation with the algorithm is that the robustness is not that good. Using Lyapunov stability theory could increase the stability of the system.

To increase robustness (to external disturbances) of the general back stepping algorithm, an integrator is added and the algorithm and it becomes Integrator back stepping control.

The integral approach was shown to eliminate the steady-state errors of the system, reduce response time and restrain overshoot of the control parameters.

Adaptive Control Algorithms

Figure 24:
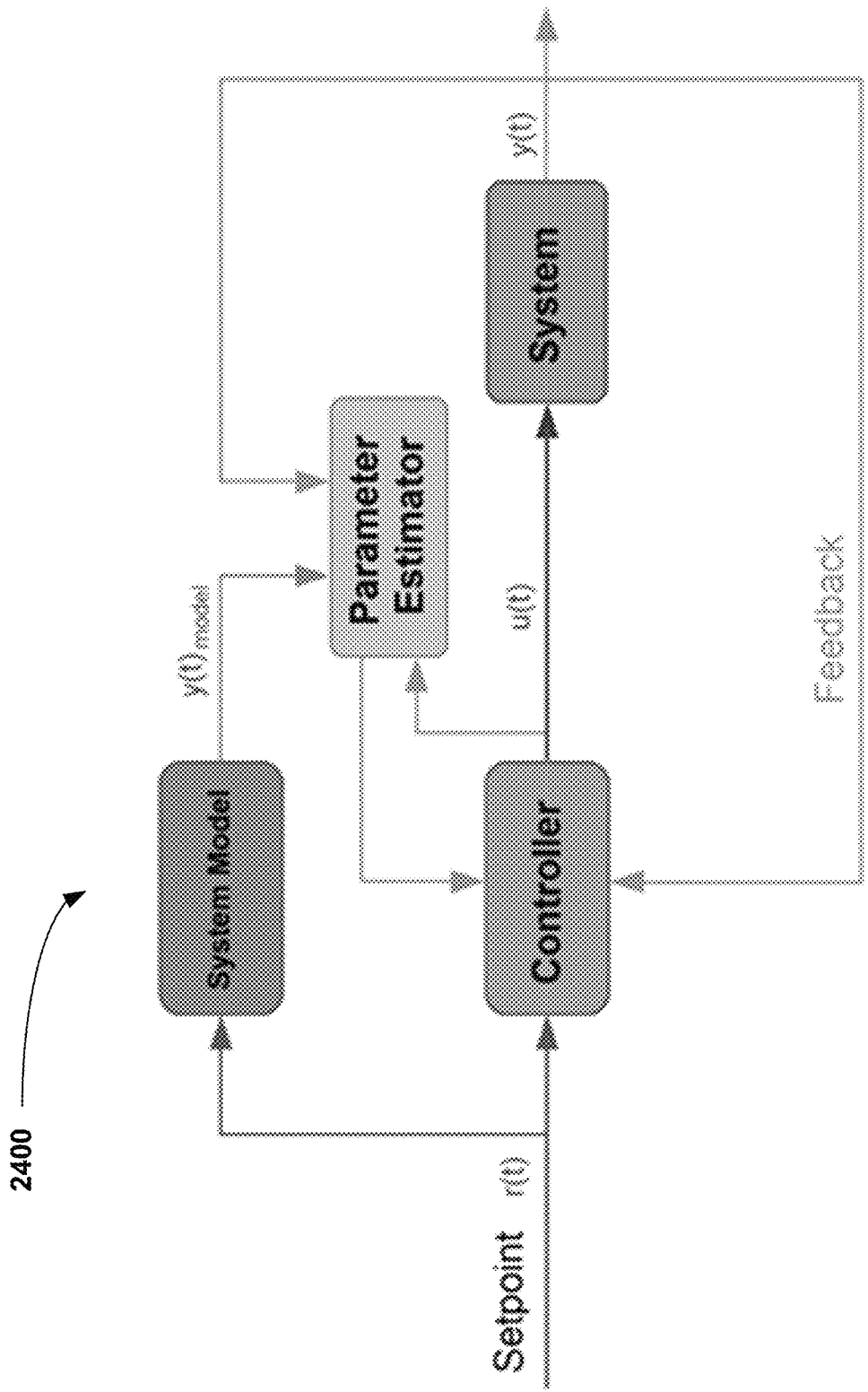
FIG. 24 illustrates, in a block diagram, an example of an adaptive controller for motor drive, in accordance with some embodiments.

FIG. 24 illustrates, in a block diagram, an example of an adaptive controller 2400 for motor drive, in accordance with some embodiments. Adaptive control algorithms are aimed at adapting to parameter changes in the system. The parameters are either uncertain or varying with time. In some embodiments, the adaptive controller 2400 may be an FLC or an ANN-based controller. Each are further described below.

Robust Control Algorithms

Robust control algorithms are designed to deal with uncertainty in the system parameters or disturbances. This guarantees controller performance within acceptable disturbance ranges or unmodeled system parameters. A major limitation normally observed with robust controllers is poor tracking ability.

Optimal Control Algorithms

Optimization algorithms are designed to minimize a variable and get the best cost function from a set of alternatives. A specialized case of optimization is known as convex optimization. This is a mathematical optimization technique that deals with minimizing a convex variable in a convex set. The common optimal algorithms include LQR, $L_1$, $H_1$ and Kalman filter. A limitation of optimization algorithms is generally their poor robustness.

Feedback Linearization

Figure 25:
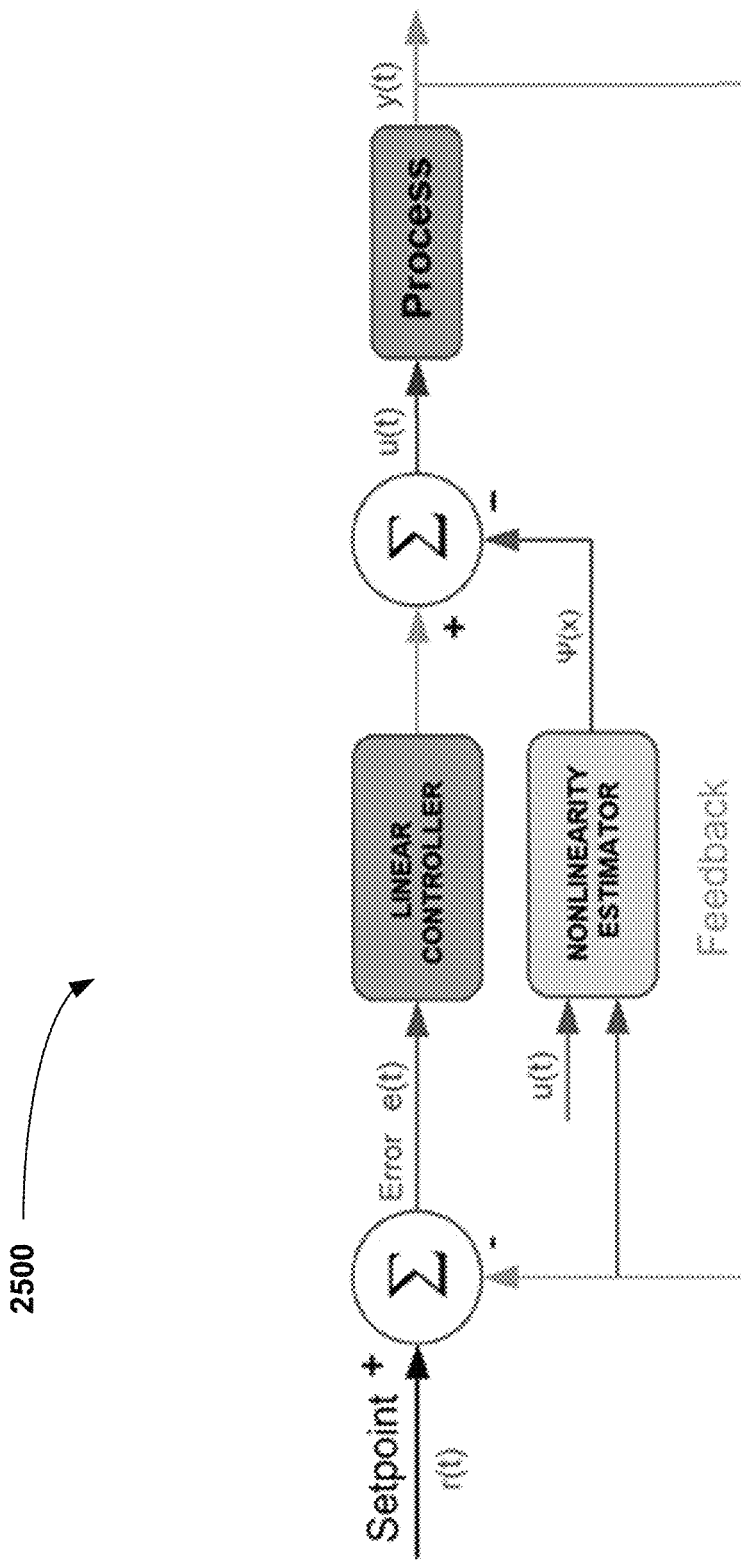
FIG. 25 illustrates, in a schematic diagram, an example of the disturbance observer based control method, in accordance with some embodiments.

FIG. 25 illustrates, in a schematic diagram, an example of the disturbance observer based control method 2500, in accordance with some embodiments. Feedback linearization control algorithms transform a nonlinear system model into an equivalent linear system through a change of variables. Some limitation of feedback linearization is the loss of precision due to linearization and requiring an exact model for implementation. The feedback linearization method helps to convert many intractable nonlinear problems into simpler linear problems. The feedback linearization nonlinear control shows good tracking but poor disturbance rejection. If feedback linearization applied with another algorithm with less sensitivity to noise gives good performance.

Intelligent Control (Fuzzy Logic and Artificial Neural Networks)

Intelligent control algorithms are biologically inspired and are used to control complex and nonlinear systems, examples include fuzzy logic, fuzzy PI logic, artificial neural networks, machine learning, genetic algorithm etc. This algorithm involves considerable uncertainties and mathematical complexity that requires high computational resources which creates limitations in the use of intelligent systems.

Fuzzy Logic Controller (FLC)

Figure 26A:
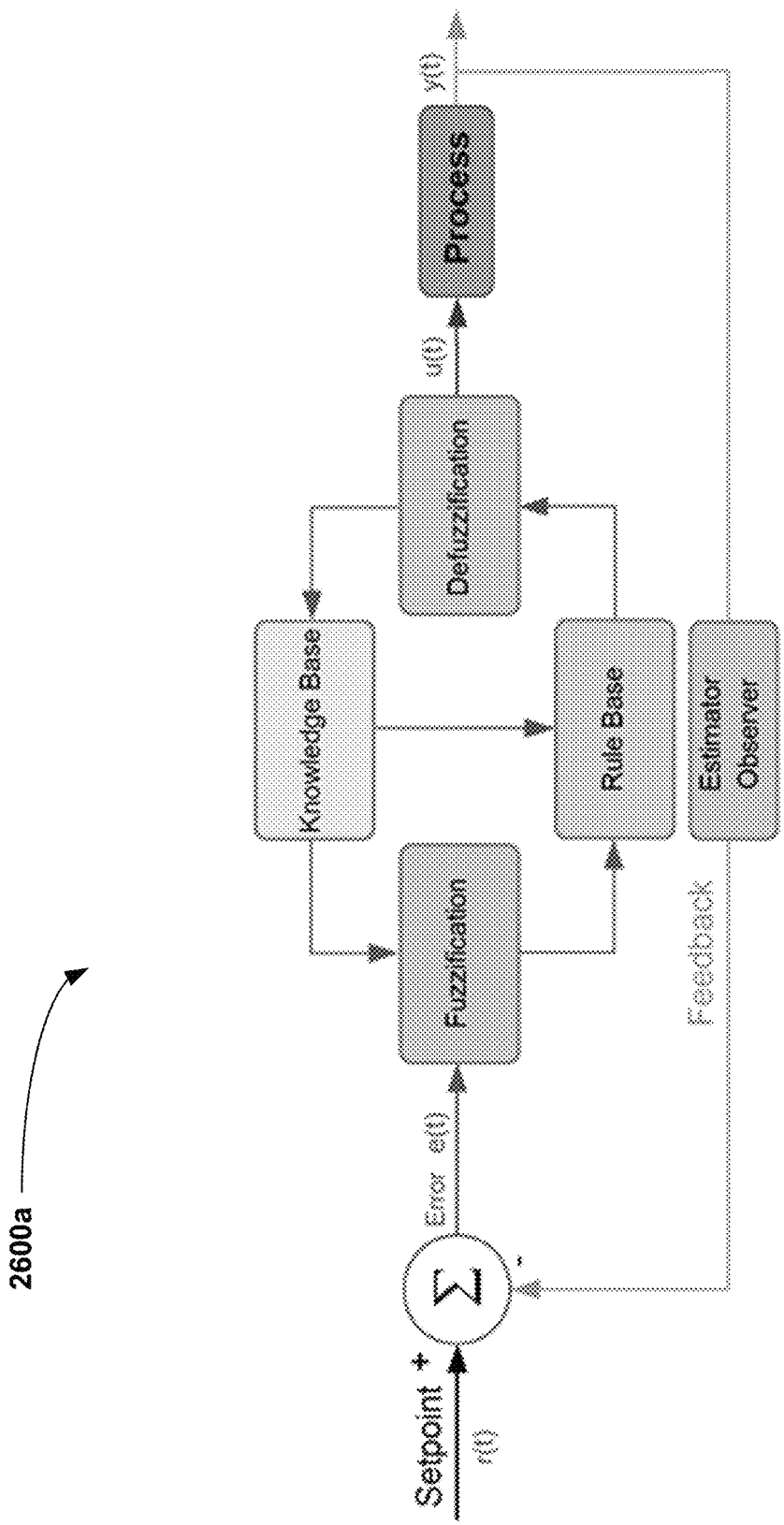
FIG. 26A illustrates, in a block diagram, an example of an application of an FLC, in accordance with some embodiments.

FIG. 26A illustrates, in a block diagram, an example of an application of an FLC 2600, in accordance with some embodiments. An FLC 2600 may replace the PI controller 2100 used for error minimization in the conventional PI speed controller. The structure of the FL controller is shown in FIGS. 26A and 26B.

Figure 26B:
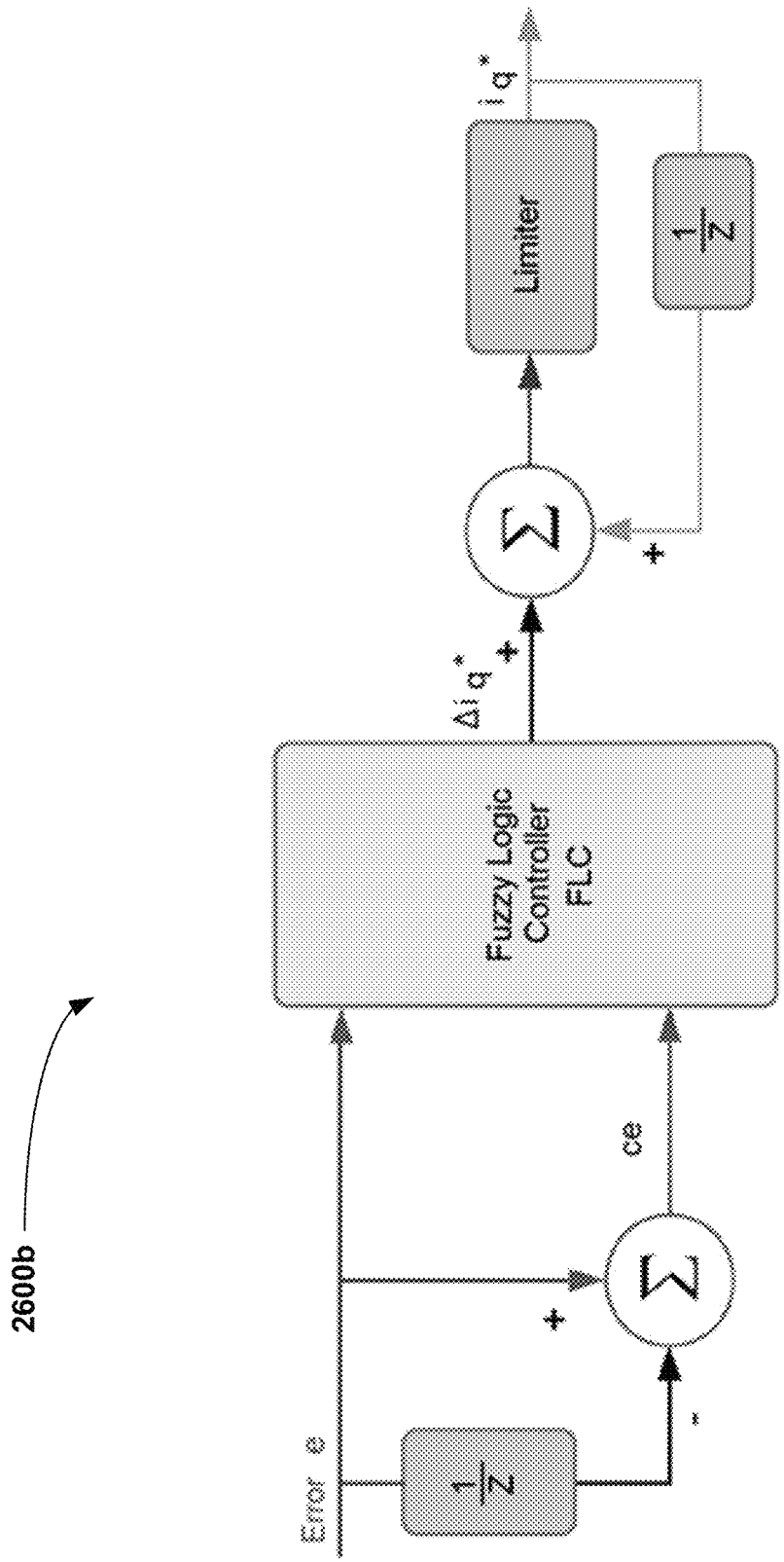
FIG. 26B illustrates, in a block diagram, an example of the FLC in more detail.

FIG. 26B illustrates, in a block diagram, an example of the FLC 2600 in more detail. The controller has two input variables namely the speed error e and the change of speed error ce. The controller output is the increment of current torque command ($\Delta i_q^*$) which is integrated to generate the current command ($i_q^*$)=$I_{QREF}$. The error is given by the difference between the speed command ($\omega^*$)=$\omega_{REF}$ and the actual rotor speed ($\omega$), while the change of error is given by the difference between the present error and the previous error. The input variables (e and ce) are normalised to derive normalised error ($e_n$) and normalised change of error ($ce_n$) signals. A fuzzifier (e.g., a singleton fuzzifier) is used at the front of the system to convert the crisp data values to fuzzy data. The corresponding control rules are evaluated, from membership functions and rule table, composed and finally defuzzified to derive the change of the current torque command ($\Delta i_q^*$).

e and ce were then calculated as in equation (31) and (32) for every sampling time:

$$e(k)=\omega^*(k)-\omega(k) \tag{31}$$

$$c(k)=e(k)-e(k-1) \tag{32}$$

Figure 26C:
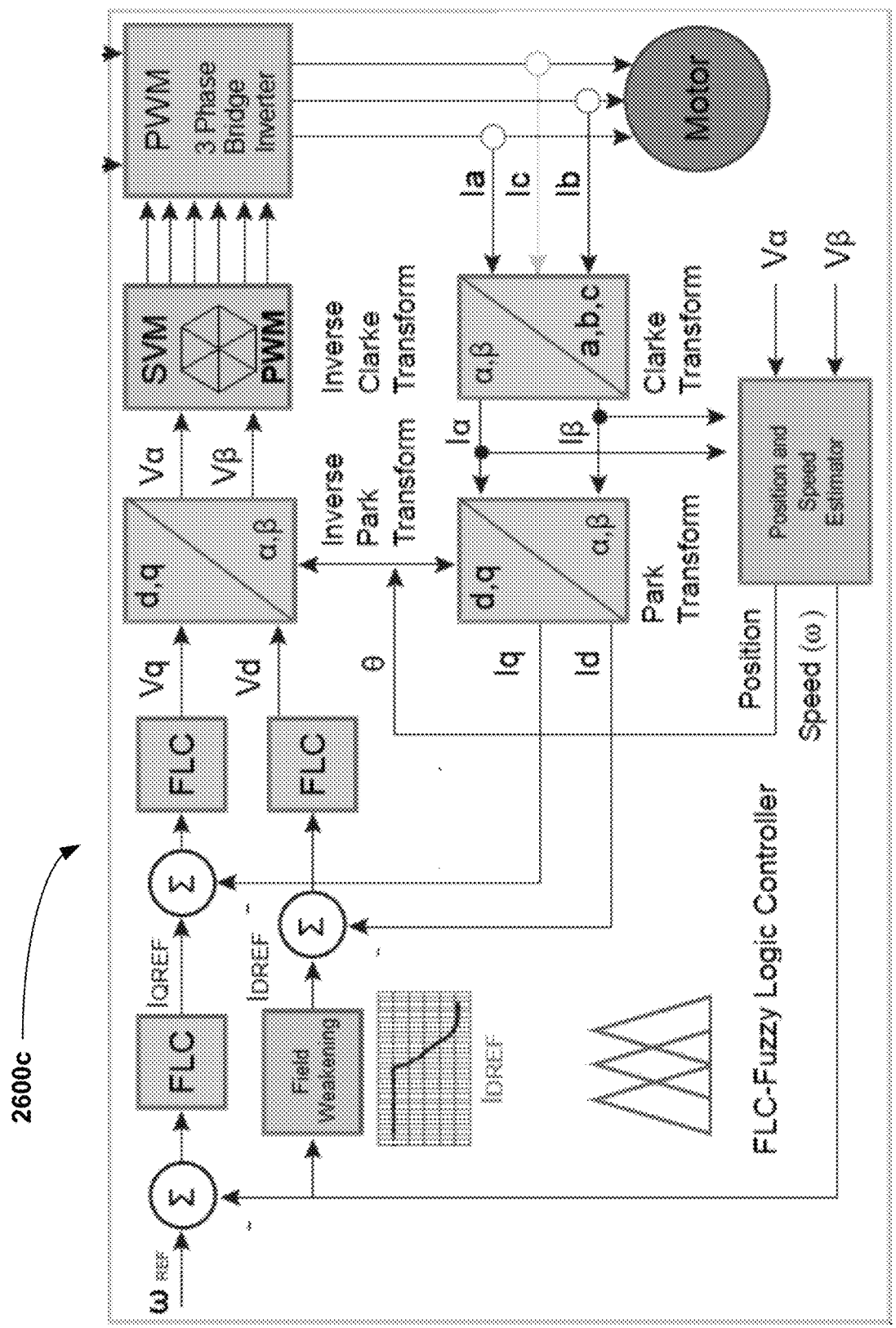
FIG. 26C illustrates, in a block diagram, an example of sensorless field oriented control using FLC, in accordance with some embodiments.

FIG. 26C illustrates, in a block diagram, an example of sensorless field oriented control 2600c using FLC, in accordance with some embodiments. In this example, three FLCs are used instead of three PIs. This allows for the generation of 3D prediction with more parameters, faster and better, with the capability to learn (rather than simply repeating static algorithm steps).

ANN Controller (ANNC)

Artificial Neural Network (ANN) includes distributed parallel computing made up of a number of processing units, which have a natural tendency to store knowledge and making it available as and when required. The simplest such processing unit is called a neuron. The inspiration for ANN is drawn from the human brain; a highly complicated structure made up of neurons and can perform or is trained to perform certain computations many times faster than most computers in existence today, examples: power generation control, pattern recognition including face recognition, motor control, etc.

Artificial Neural Network (ANN) has been applied to a wide range of dynamic system applications in recent years. Advantages of ANN controllers over the conventional ones presented in robustness, parallel distributed structure, and ability to learn as well as capability of handle nonlinear situations. These advantages support the ANN in playing a major role in solving uncertainty problems in motor drive systems, like stator resistance variation and dc voltage measuring operations in existence of high switching surges, leads to uncertainty in torque and flux estimation which in turn leads to torque ripple and in worst case it may lead to generation of breaking torque.

Neural networks are machines that can be modeled to perform a particular task mimicking the human brain. The network can be modeled by electronic components or simulated on computer software. In the following figures is presented the PMSM control using two versions of ANN Controller (speed controller and motor position estimator).

Figure 27A:
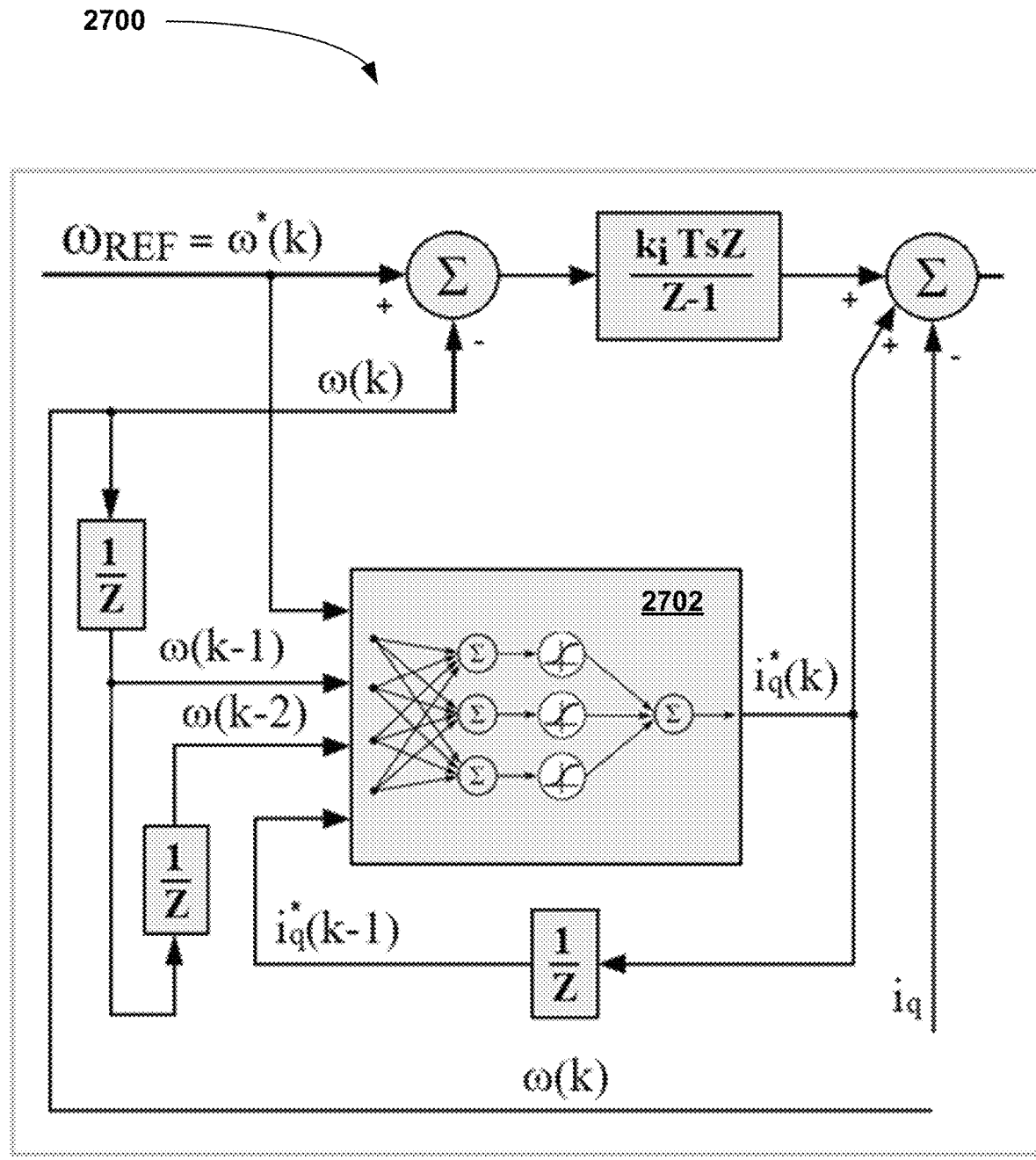
FIG. 27A illustrates, in a block diagram, a detailed example of an ANN speed controller which can be used in a FOC, in accordance with some embodiments.

FIG. 27A illustrates, in a block diagram, a detailed example of an ANN speed controller which can be used in a FOC, in accordance with some embodiments. Block 2702 determines Iq(k) (see FIGS. 16A to 16F).

Figure 27B:
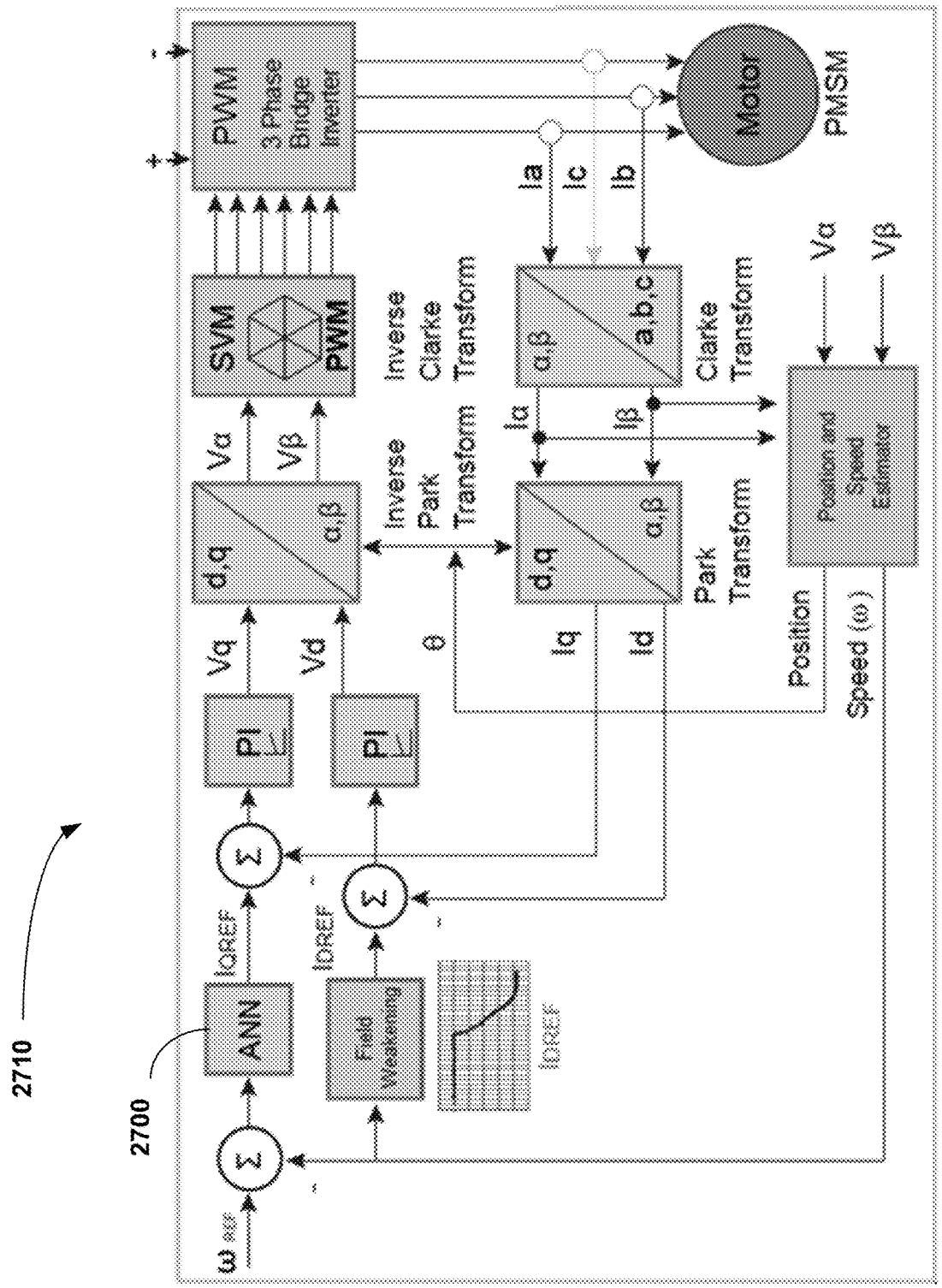
FIG. 27B illustrates, in a block diagram, an example of PMSM Sensorless Field Oriented Control using the ANN speed controller illustrated in FIG. 27A applied to the swim spa system, in accordance with some embodiments.

FIG. 27B illustrates, in a block diagram, an example of PMSM Sensorless Field Oriented Control using the ANN speed controller illustrated in FIG. 27A applied to the swim spa system, in accordance with some embodiments. An ANN controller 2700 is used in the place of an FLC (see FIG. 15B) or PI (see FIG. 15A).

Figure 27C:
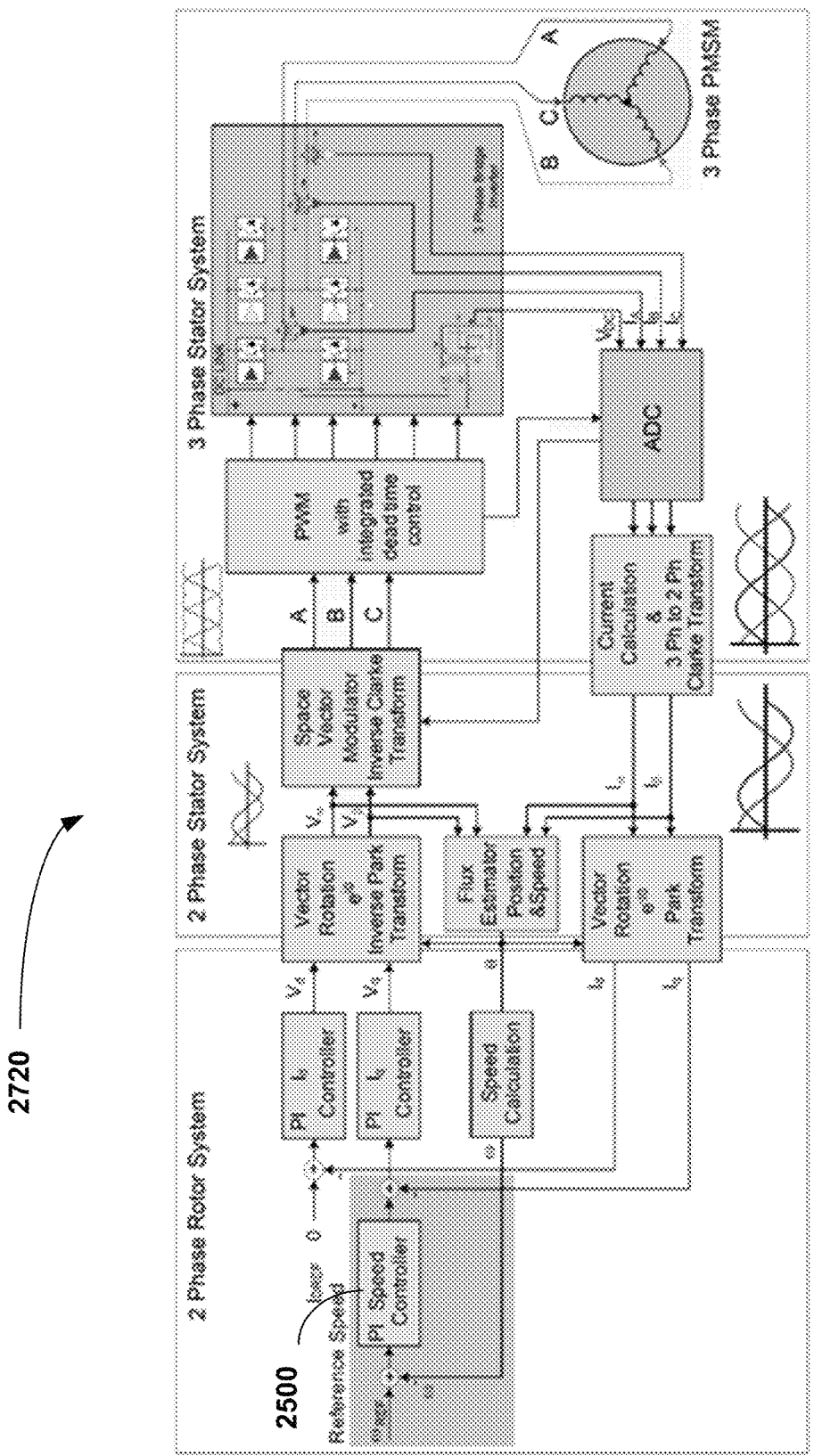
FIG. 27C illustrates, in a block diagram, an example of common PMSM Sensorless Field Oriented Control using PI speed controller applied to the swim spa system, in accordance with some embodiments.

FIG. 27C illustrates, in a block diagram, an example of common PMSM Sensorless Field Oriented Control 2720 using proportional integral derivative (PID) 2500 applied to the swim spa system 400, in accordance with some embodiments.

The PI controller 2500 first comes from the continuous system:

$$C(s)=K_p+K_i/s \tag{33}$$

where $K_p$ and $K_i$ are the parameters of the PI controller 2500. Equation (33) is digitalized by the backward difference method:

$$s=(1-Z^{-1})/T_s(b); s=(Z-1)/(ZT_s) \tag{34}$$

where $T_s$ is the sampling time. To substitute Equation (34) into Equation (33), the resulting digital PI controller 2100 is:

$$C(z)=K_p+(K_iT_sZ)/(Z-1) \tag{35}$$

The Equation (35) term (KiTsZ)/(Z−1) is the I (integrator) of the function added to the end of ANN controller 2700 to correct the ANN dynamics.

Figure 27D:
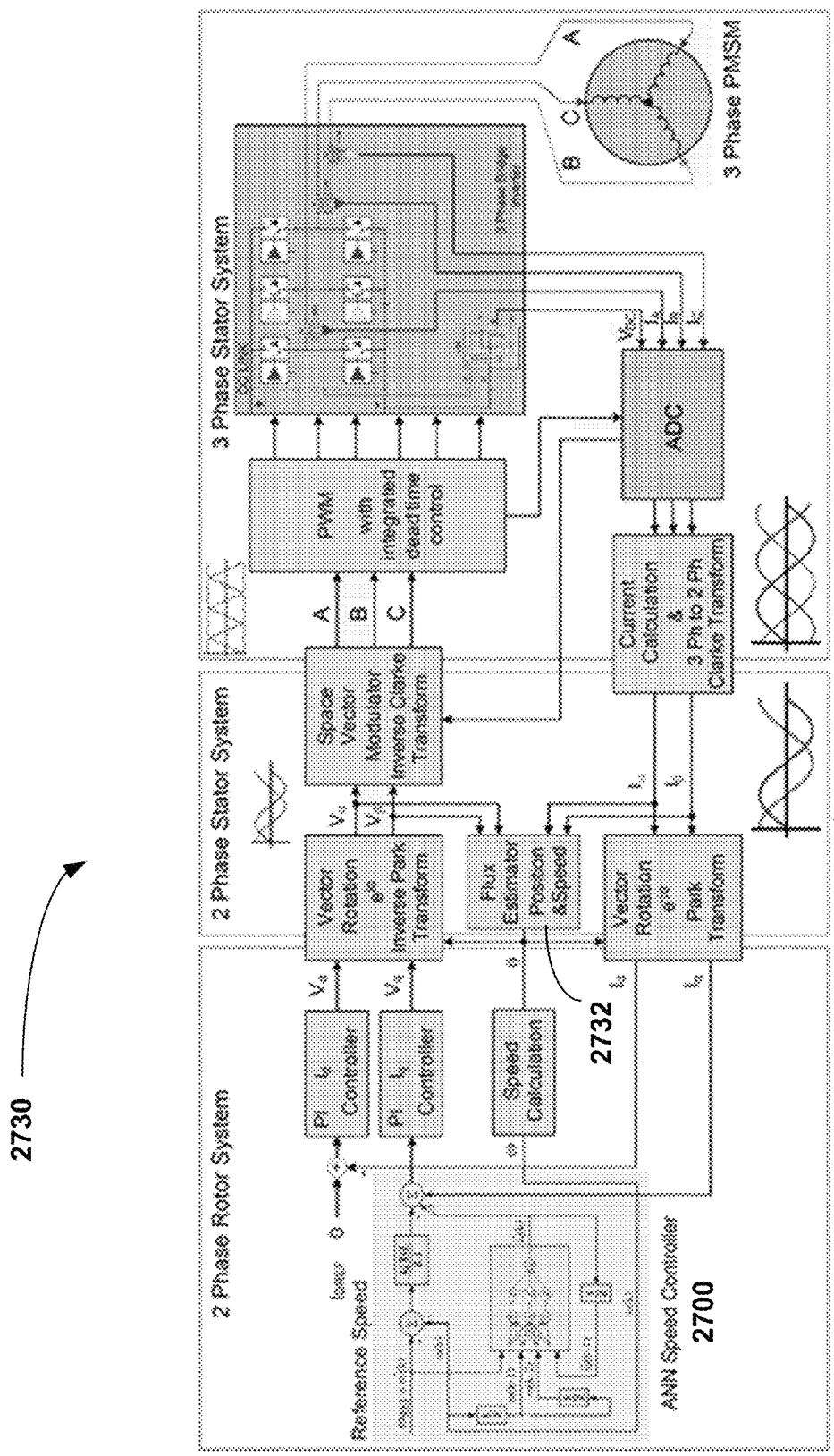
FIG. 27D illustrates, in a block diagram, an example of PMSM sensorless field oriented control using ANN speed controller applied to the swim spa system, in accordance with some embodiments.

FIG. 27D illustrates, in a block diagram, an example of PMSM sensorless field oriented control 2730 using ANN speed controller 2700 applied to the swim spa system 400, in accordance with some embodiments. In this example, the first PI controller 2500 (see FIG. 27C) is replaced with the ANN controller 2700.

Figure 27E:
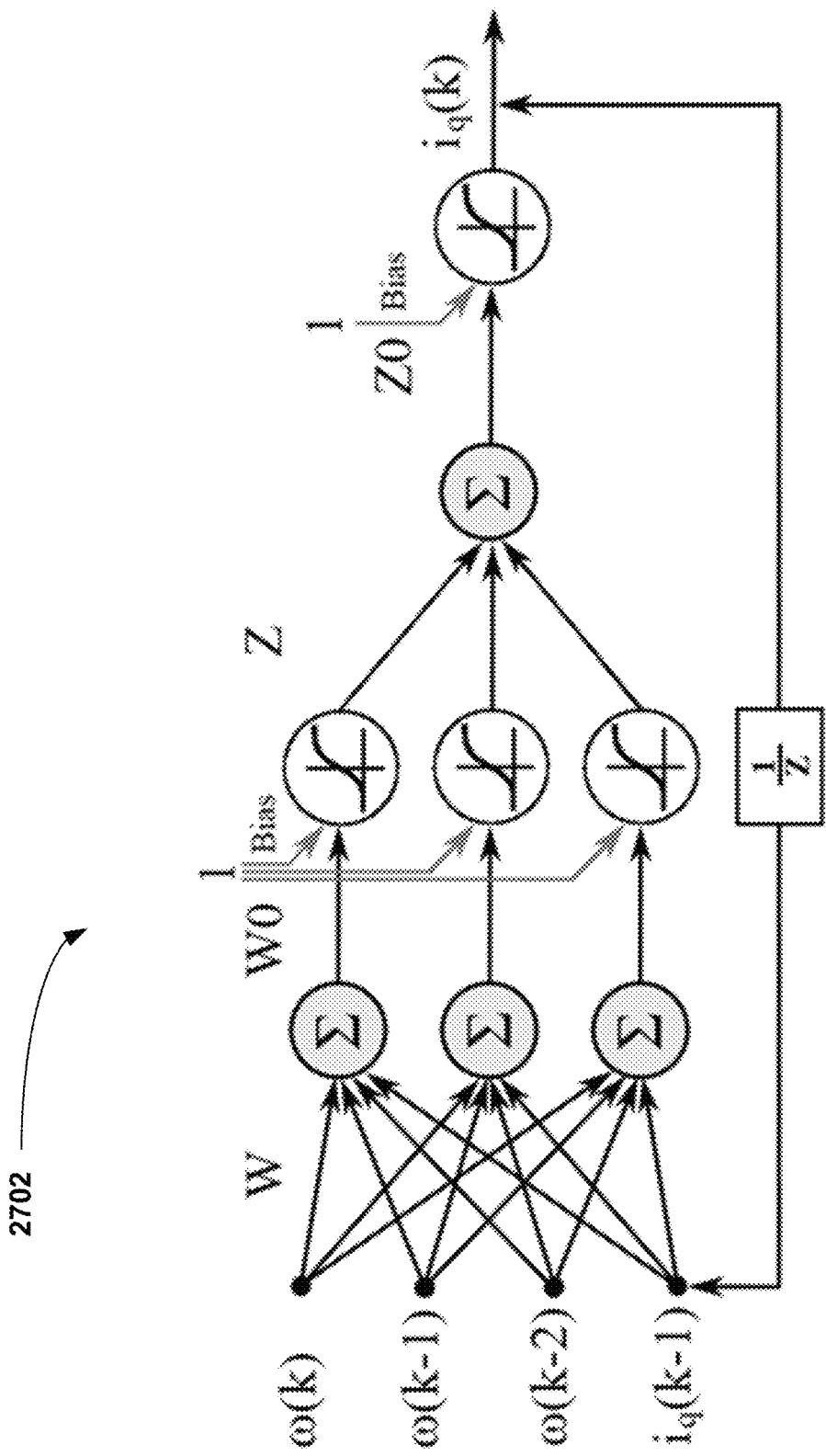
FIG. 27E illustrates, in a block diagram, an example of an ANN speed controller with input/output configuration, in accordance with some embodiments.

FIG. 27E illustrates, in a block diagram, an example of an ANN speed controller block 2702 with input/output configuration, in accordance with some embodiments.

Figure 28:
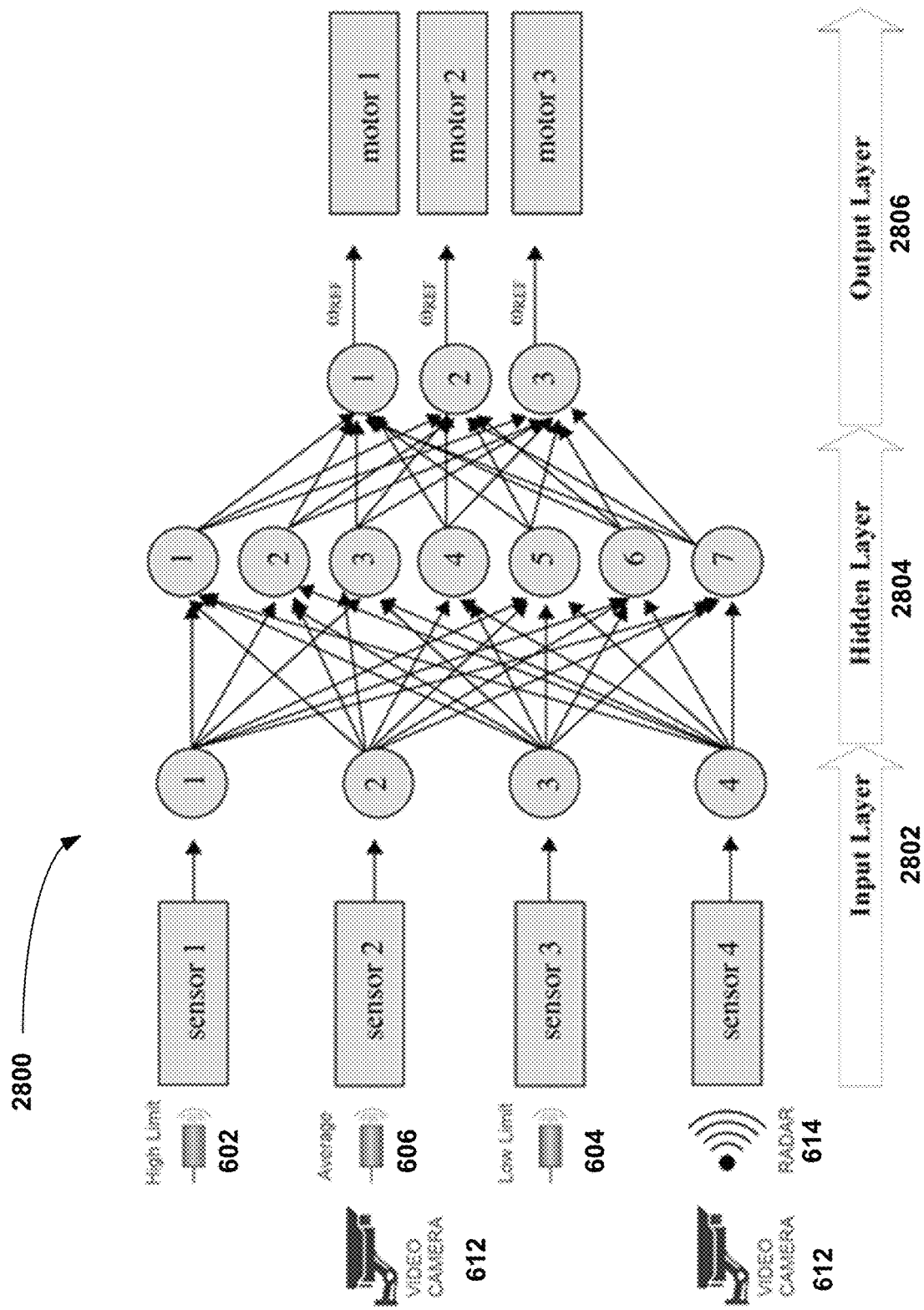
FIG. 28 illustrates, in a schematic diagram, an example of an ANN algorithm configuration for a swim spa system, in accordance with some embodiments.

FIG. 28 illustrates, in a schematic diagram, an example of an ANN algorithm configuration 2800 for a swim spa system 400, in accordance with some embodiments. FIG. 28 illustrates how sensor data (see FIGS. 6A to 6G) is input into the ANN controller 2700.

To design artificial neural network based speed controller and observer for PMSM motor drive, PMSM is modeled. The PMSM model is described above. It is possible to obtain the analytically inverse dynamic of the PMSM after some calculations starting from the differential equations of the mathematical model.

The classic PI (Proportional and Integral) regulator is well suited to regulating the torque and flux feedback to the desired values as it is able to reach constant references, by correctly setting both the P (proportional) term (Kpi) and the I (Integral) term (Ki) which are respectively responsible for the error sensibility and for the steady state error. The control equation which the PI controller involves is:

$$i_q = K_p \Delta\omega + K_i \int \Delta\omega dt \tag{36}$$

Traditional PI controller will produce satisfactory results for fixed parameter system but it cannot achieve high results for the high precision PMSM drive. Artificial neural network has the ability of self-learning and self-regulatory. One of the important aspects of applying an ANN to any particular problem is to formulate the inputs and outputs of the ANN structure.

In FIG. 28, an example of the structure of the ANN controller 2800 is presented which comprises three layers: input layer 2802, hidden layer 2804 and output layer 2806, the inputs of the ANN controller are the speed error of the motor. The corresponding output target is the torque (direct proportional with iq):

$$T_e = K_T i_q \tag{37}$$

where $K_T = 3/2 \, P \, \lambda_f$ $$i_q(k) = A i_q(k-1) + (B/e)(\omega(k+1) - (a - eC/B)\omega(k)) - (B/e)(b(\omega(k-1) + c\omega^2(k) + d\omega^2(k-1) + f) \tag{38}$$

where A, B, C, a, b, c, d, f are constants and depends by motor parameters, structure of controller and sample time.

After the inputs and output are formulated 2802, the next step is to incorporate the hidden layers 2804. Number of hidden layers 2804 and number of neurons in the hidden layer are chosen by trial and error, smaller numbers are better (less computational time in terms of necessary memory and algorithm time calculation).

In this example, the structure of ANN controller with 7 neurons (one hidden layer 2802 having three neurons) produces very good results in comparison with the equivalent PI controller. After the design of the ANN structure, the next step is to train the neural network using the Levenberg-Marquardt back propagation algorithm, which quickly converge to the prescribed error. In some embodiments, an integral component may be added to the output of the ANN to correct the ANN dynamics.

ANN Position and Speed Estimator

Figure 29A:
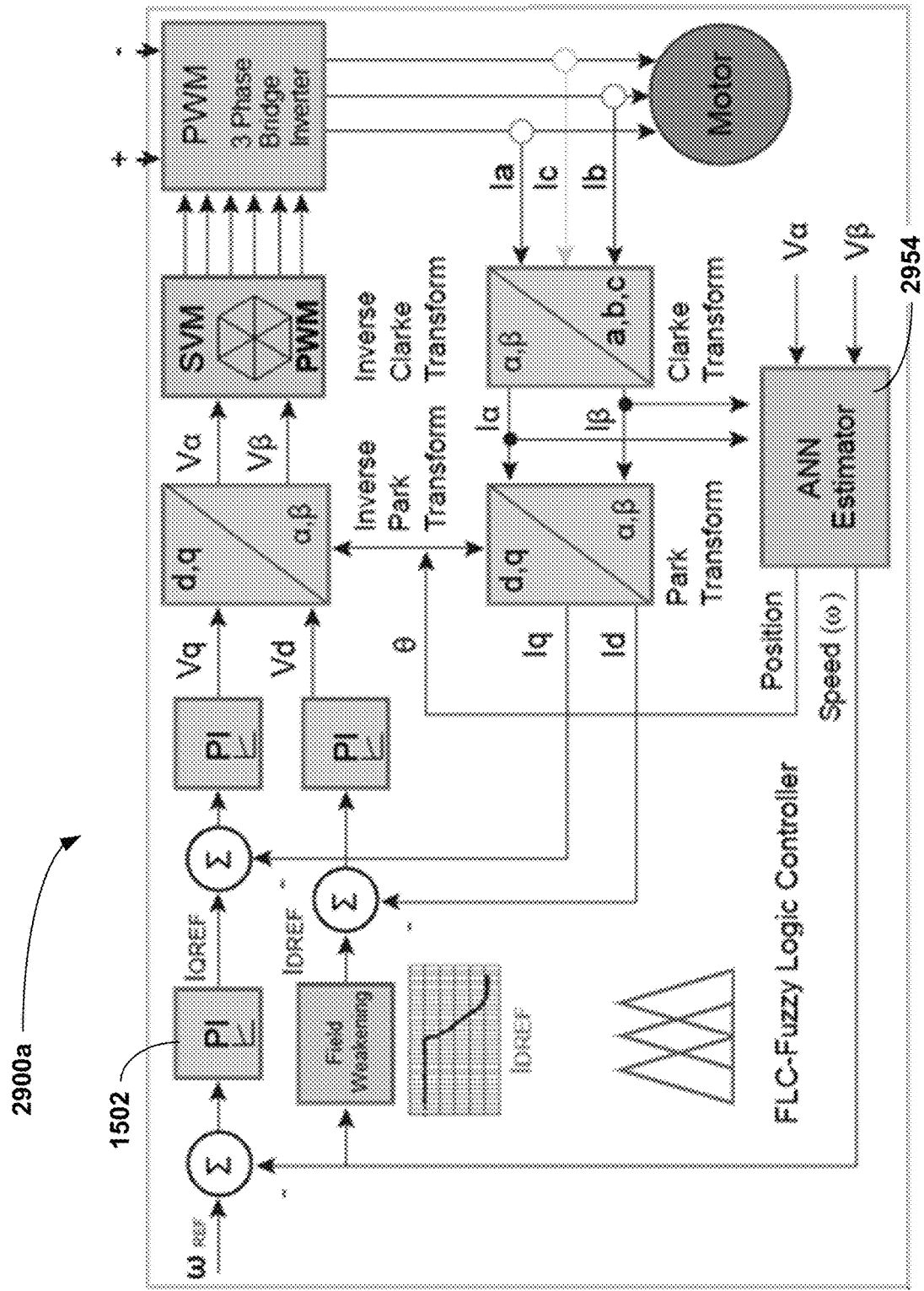
FIG. 29A illustrates, in a block diagram, an example of sensorless FOC using ANN position and speed estimator, in accordance with some embodiments.

FIG. 29A illustrates, in a block diagram, an example of sensorless FOC using an ANN position and speed estimator 2900a, in accordance with some embodiments. In this example, the estimator 1554 (see FIG. 15B) is replaced with an ANN estimator 2954.

Figure 29B:
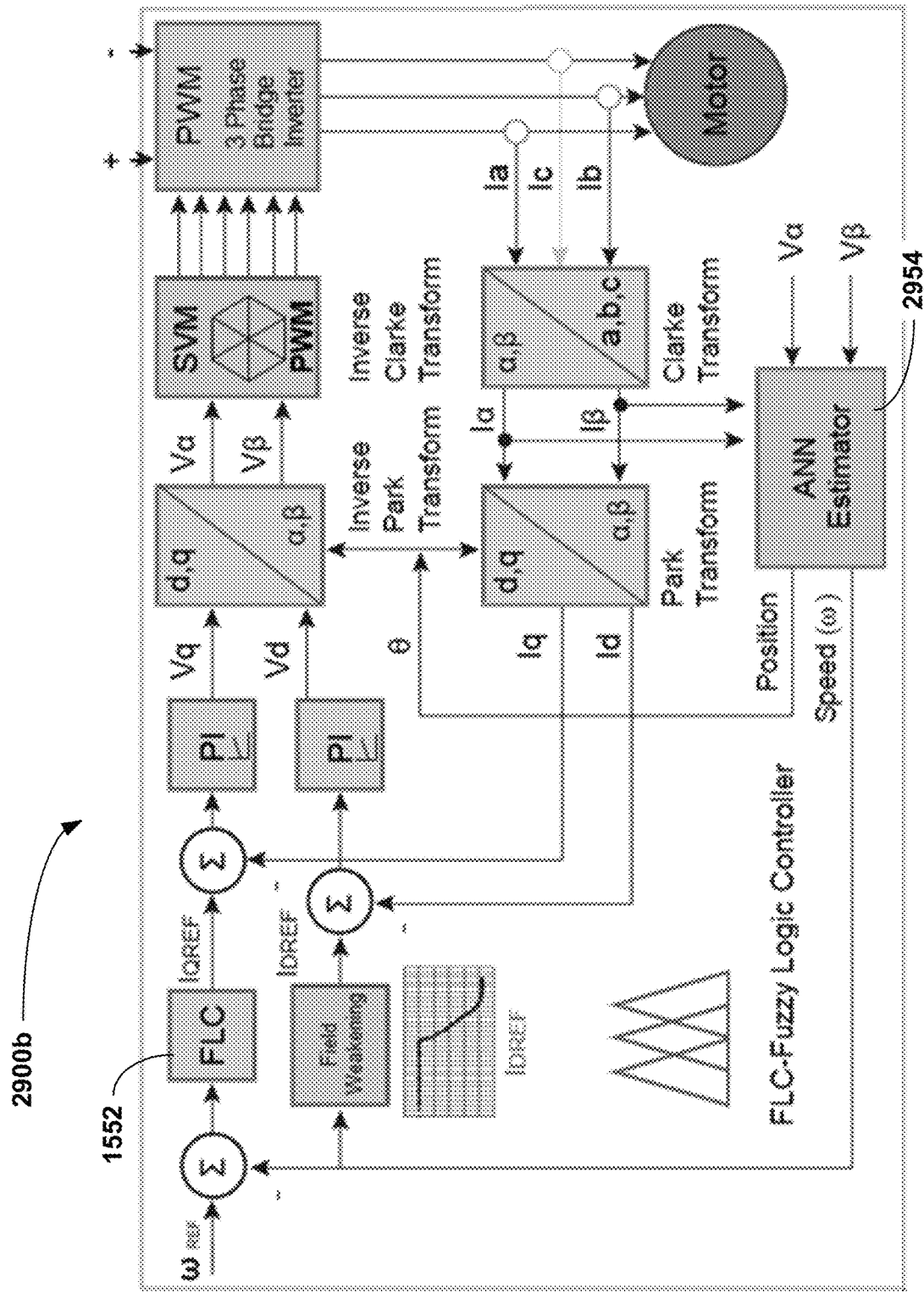
FIG. 29B illustrates, in a block diagram, another example of sensorless FOC using ANN position and speed estimator, and FLC speed controller, in accordance with some embodiments.

FIG. 29B illustrates, in a block diagram, another example of sensorless FOC using a position and speed estimator having ANN logic 2900b, and a FLC, and FLC speed controller 1552 instead of the PI 1502 for $I_{QREF}$ in accordance with some embodiments.

Figure 29C:
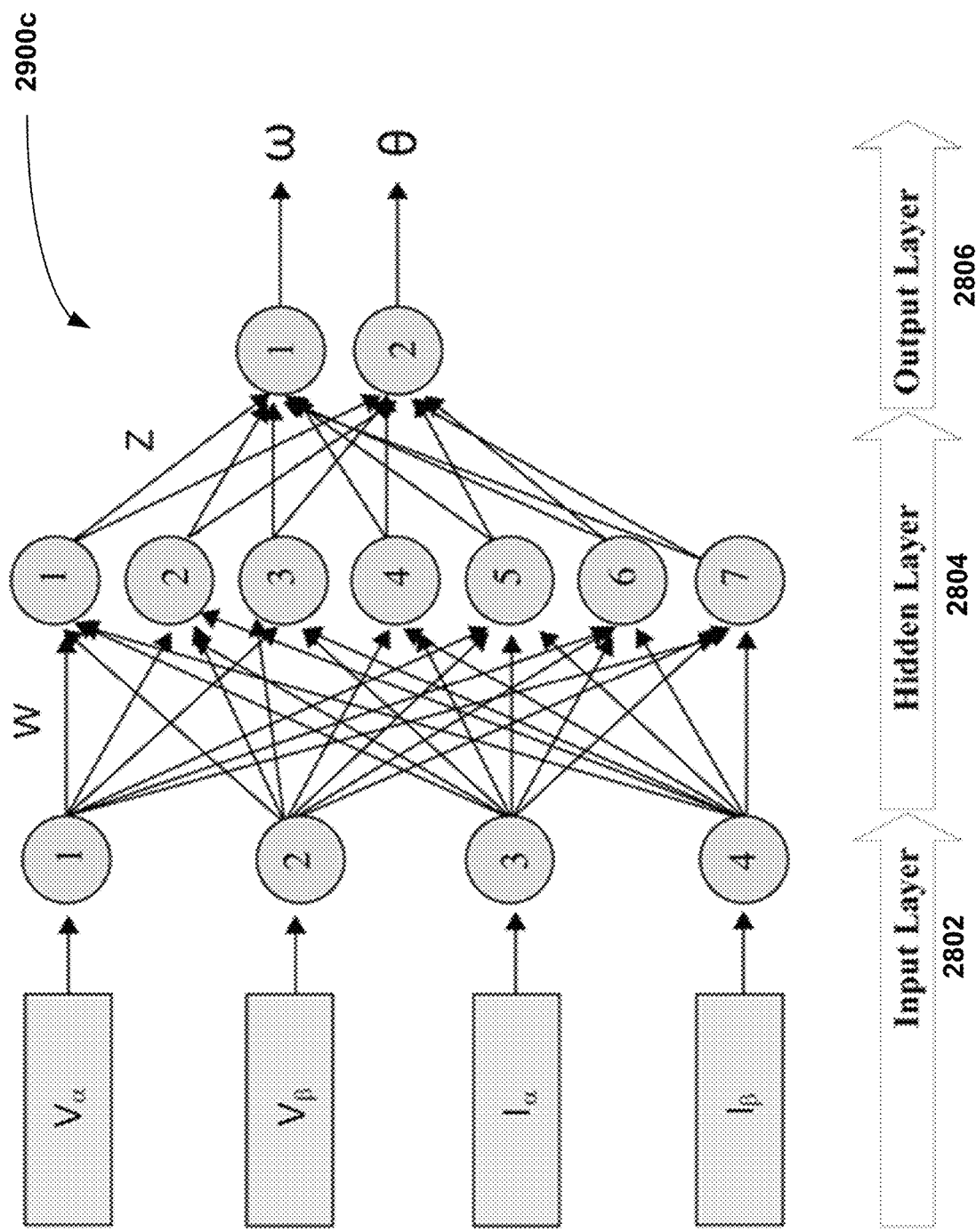
FIG. 29C illustrates, in a block diagram, an example of an ANN position and speed estimator with input/output configuration, in accordance with some embodiments.

FIG. 29C illustrates, in a block diagram, an example of an ANN position and speed estimator with input/output configuration 2900c, in accordance with some embodiments. In this example, one ω and one θ determined for one motor using the ANN estimator 2952 is shown.

Figure 29D:
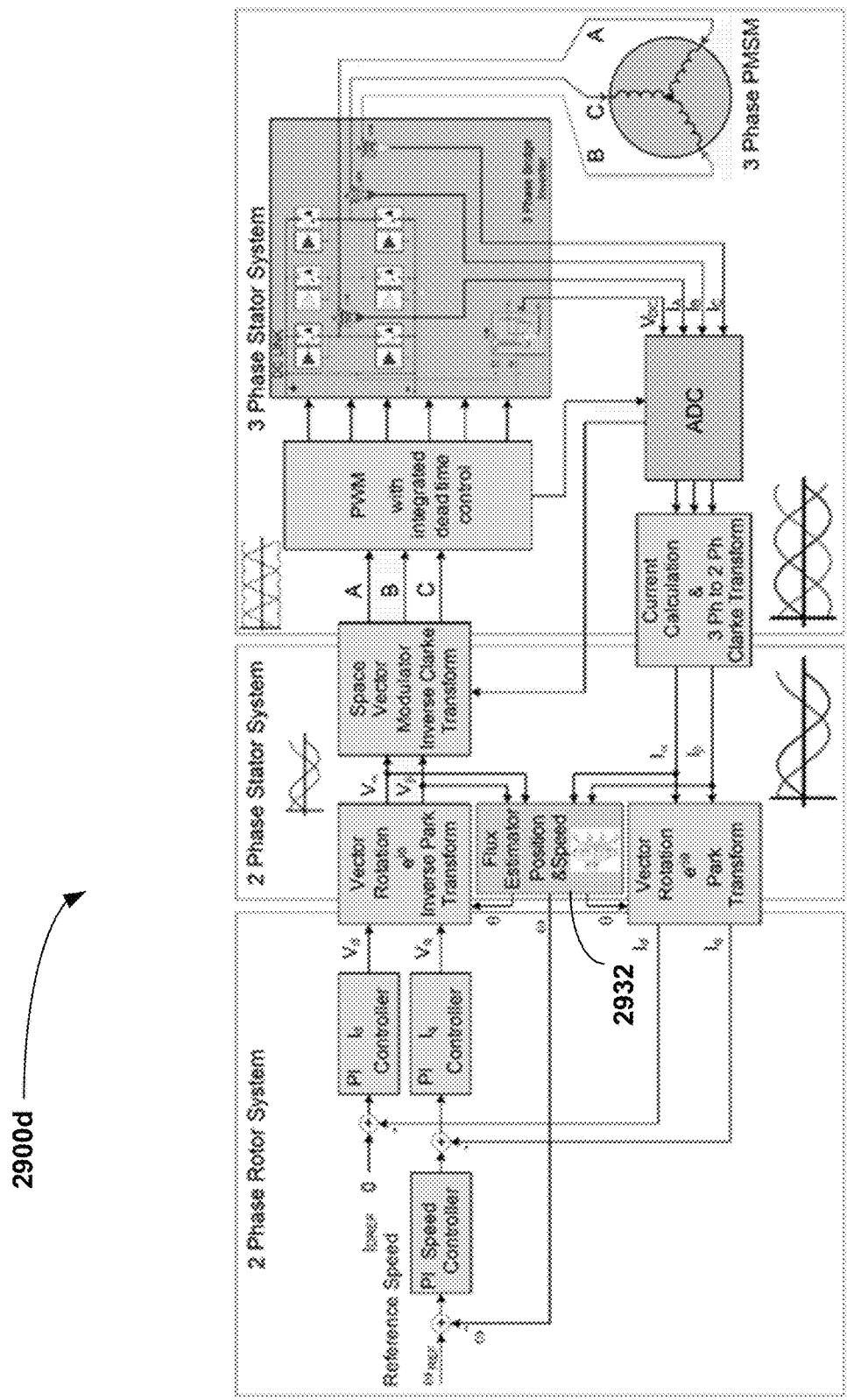
FIG. 29D illustrates, in a block diagram, another example of sensorless FOC using ANN position and speed estimator, in accordance with some embodiments.

FIG. 29D illustrates, in a block diagram, another example of sensorless FOC using ANN position and speed estimator 2900d showing how the ANN position and speed estimator 2900c presented in FIG. 29C is integrated into a sensorless FOC diagram, in accordance with some embodiments. I.e., the flux estimator 1532 (magnetic field of rotor) of FIG. 27D is replaced with the ANN position and speed estimator 2900c.

The neural networks algorithm will assure the accuracy of the rotor position estimation to achieve the stability and robustness of the system. The updating of neural network parameters is based on the steepest descent method to find the best solutions of weightings.

The calculation of rotor position estimating and velocity control of the sensorless neural velocity observer for the permanent magnet synchronous motor (PMSM) is based on the PMSM mathematical model.

From the stationary a-b-c frame to the α-β frame and the rotating d-q frame, the voltage equations of PMSM are given as [1-12]:

$$\begin{bmatrix} v_\alpha \\ v_\beta \end{bmatrix} = \begin{bmatrix} R_s + \frac{d}{dt}L_s & 0 \\ 0 & R_s + \frac{d}{dt}L_s \end{bmatrix} \begin{bmatrix} i_\alpha \\ i_\beta \end{bmatrix} + \begin{bmatrix} e_\alpha \\ e_\beta \end{bmatrix} \tag{39}$$

$$\begin{bmatrix} v_d \\ v_q \end{bmatrix} = \begin{bmatrix} R_s + \frac{d}{dt}L_s & -\omega_e L_s \\ \omega L_s & R_s + \frac{d}{dt}L_s \end{bmatrix} \begin{bmatrix} i_d \\ i_q \end{bmatrix} + \begin{bmatrix} 0 \\ \omega_e \lambda_f \end{bmatrix} \tag{40}$$

where $v_d$, $v_q$, $i_d$, $i_q$ are d- and q-axis voltages and currents, respectively; $R_s$ and $L_s$ are the resistance and inductance; $\lambda_f$ is flux linkage due to the permanent magnets; and $\omega_e$ is the electric speed. The α- and β-axis back EMFs are:

$$e_\alpha = -\lambda_f \omega_e \sin \theta_e \tag{41}$$

$$e_\beta = -\lambda_f \omega_e \cos \theta_e \tag{4421}$$

The block diagram of a sensorless PMSM control system is shown in FIG. 29D. In order to compensate the rotor position estimation error due to the process of motor speed tracking and noise, a neural network (NN) structure is shown in FIG. 29C. The estimated rotor angle is:

$$\theta_e = \arctan(e_\alpha/e_\beta) \tag{43}$$

$$\omega_e = (1/\lambda_f)\sqrt{(e\alpha^2 + e\beta^2)} \tag{44}$$

$$I_m = \sqrt{(i_d^2 + i_q^2)} \tag{45}$$

where $I_m$ = the supply current $$\begin{pmatrix} i_q \\ i_d \end{pmatrix} = I_m \begin{pmatrix} \sin \alpha \\ \cos \alpha \end{pmatrix} \tag{46}$$

$$T_e = K_T \, i_q \tag{47}$$

$$T_L = T_{e \, rated}(\omega_{rated}/\omega) \tag{48}$$

Rotor speed is calculated by differentiating the rotor position angle as follows:

$$\omega_e = (\theta_e(n) - \theta_e(n-1))/T_s \tag{49}$$

where $T_s$ is the speed sampling period.

$$\omega_e = d\theta_e/dt \tag{50}$$

Hybrid Control Algorithms

Analyzing the above algorithms it leads to the idea that even the best linear or nonlinear algorithms had limitations and no single controller has it all. Here are few examples, which are not in any way exhaustive of what is in literature.

A hybrid fuzzy controller with back stepping and sliding mode control could successfully eliminate chattering effect of the sliding mode control algorithm. A feedback linearization controller parallel with a high-order sliding mode controller: the sliding mode controller used as an observer and estimator of external disturbances showed good disturbance rejection and robustness.

Adaptive control via back stepping combined with neural networks, the back stepping used to achieve good tracking of rotor position and maintaining stability. Neural networks were used to compensate for un modeled dynamics.

Figure 30A:
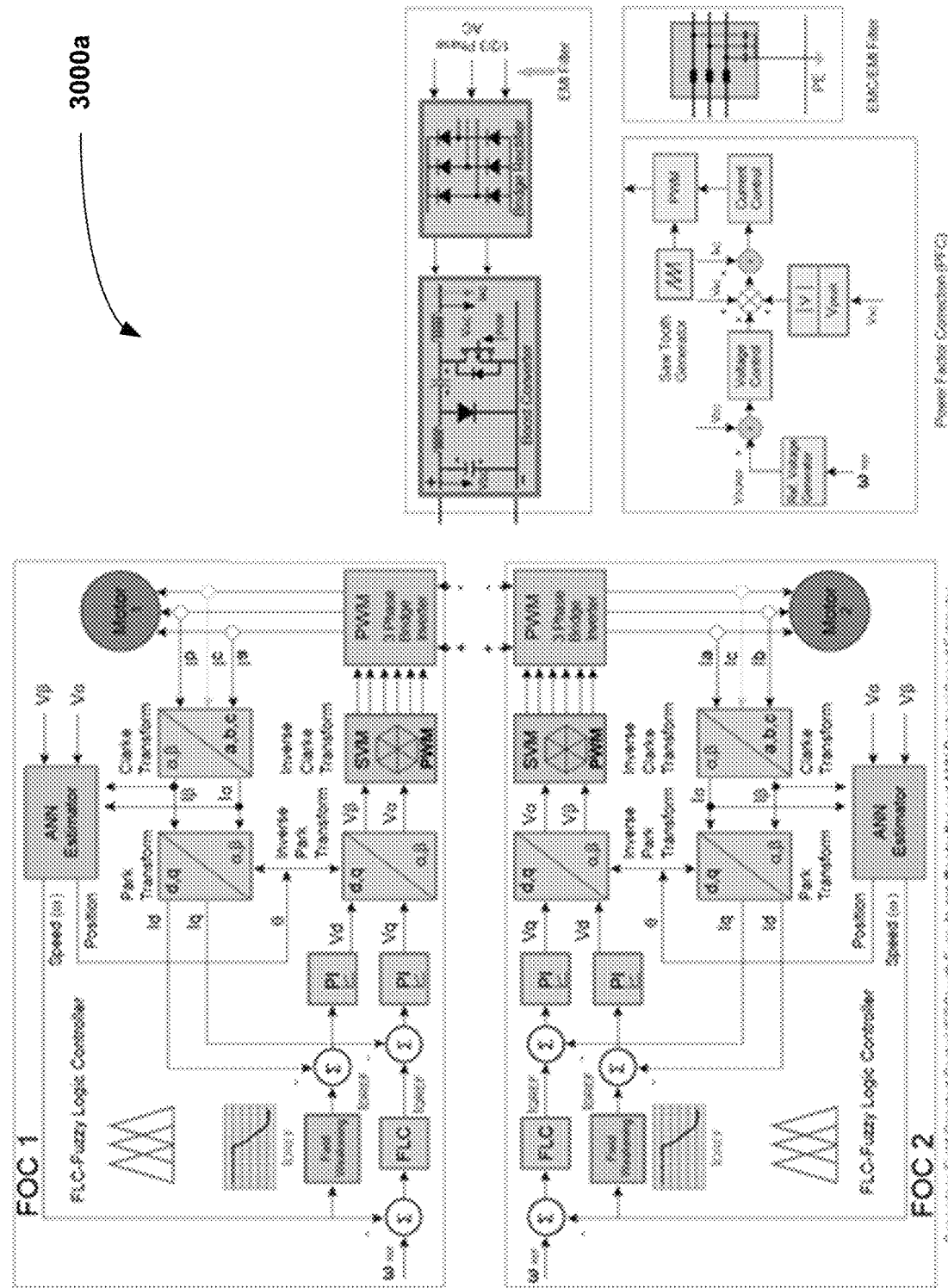
FIG. 30A illustrates, in a schematic diagram, an example of a sensorless FOC with fuzzy $I_{Q\_REF}$ controller and ANN position speed estimator for two motors, in accordance with some embodiments.

FIG. 30A illustrates, in a schematic diagram, an example of a sensorless FOC with fuzzy $I_{Q\;REF}$ controller and ANN position speed estimator for two motors 3000a, in accordance with some embodiments. In this example, the pumps are powered by two PMSM having two intelligent variable speed drives (VSD)—FOC with/without field weakening reference (this is used for high motor speed or if the motor needs to be overloaded and the cooling system allows the heat excess). In this example, one filter and one PFC are used for both drives rather than two filters and PFCs in parallel.

Figure 30B:
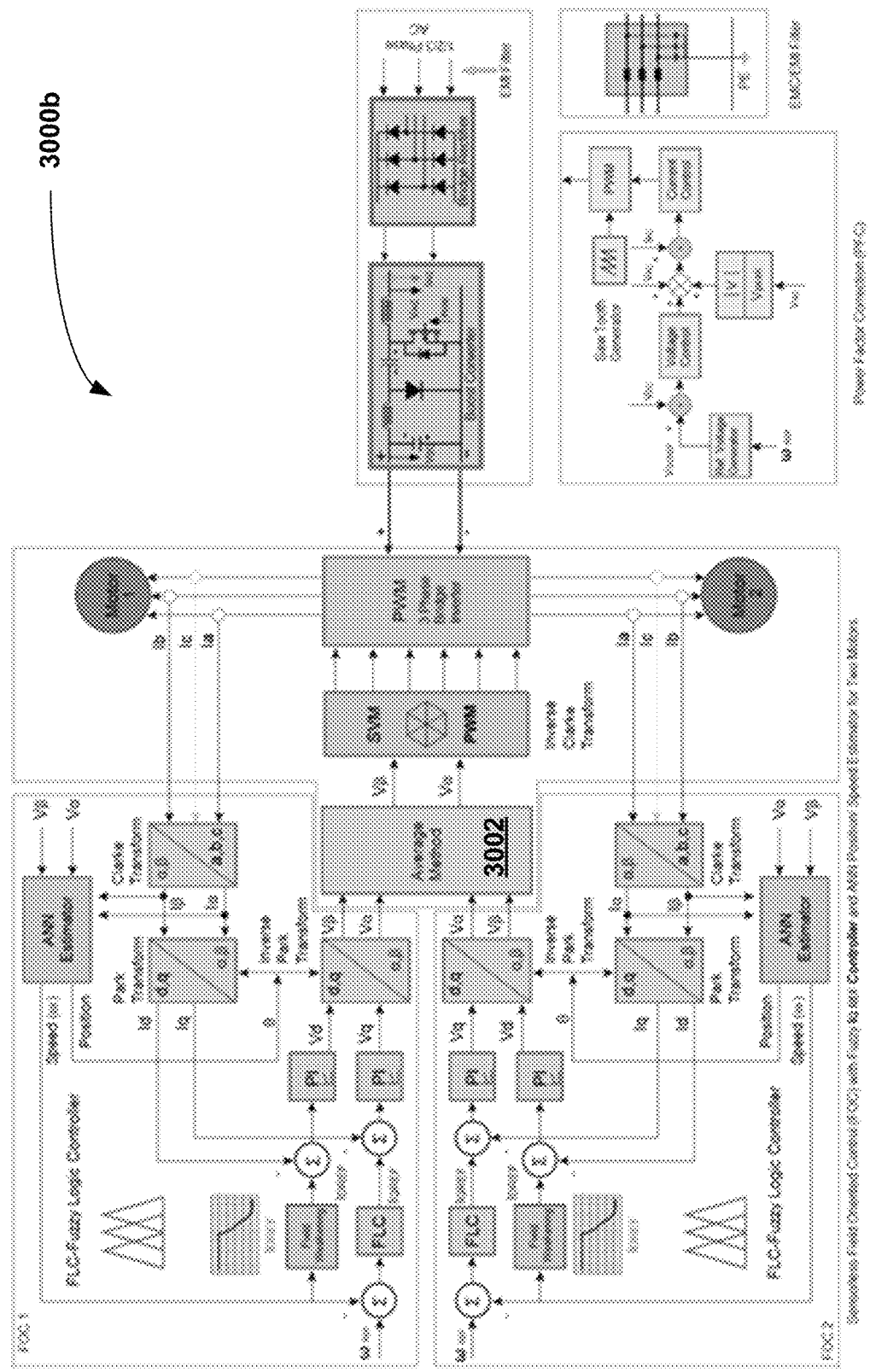
FIG. 30B illustrates, in a schematic diagram, another example of a single SVM/PWM bridge sensorless FOC with fuzzy $I_{Q\_REF}$ controller and ANN position speed estimator for two motors, in accordance with some embodiments.

FIG. 30B illustrates, in a schematic diagram, another example of a single SVM/PWM bridge sensorless FOC with fuzzy $I_{Q\;REF}$ controller and ANN position speed estimator for two motors 3000b, in accordance with some embodiments. In this example, the pumps are powered by two PMSM having a single intelligent variable speed drives (VSD)—FOC with/without field weakening reference (this is used for high motor speed or if the motor needs to be overloaded and the cooling system allows the heat excess). Thus, an "averaging" method 3002 is applied such that only one SWM and one PWM are used (i.e., one bridge instead of two). This has the effect of combining the results of two ANN estimators.

Figure 30C:
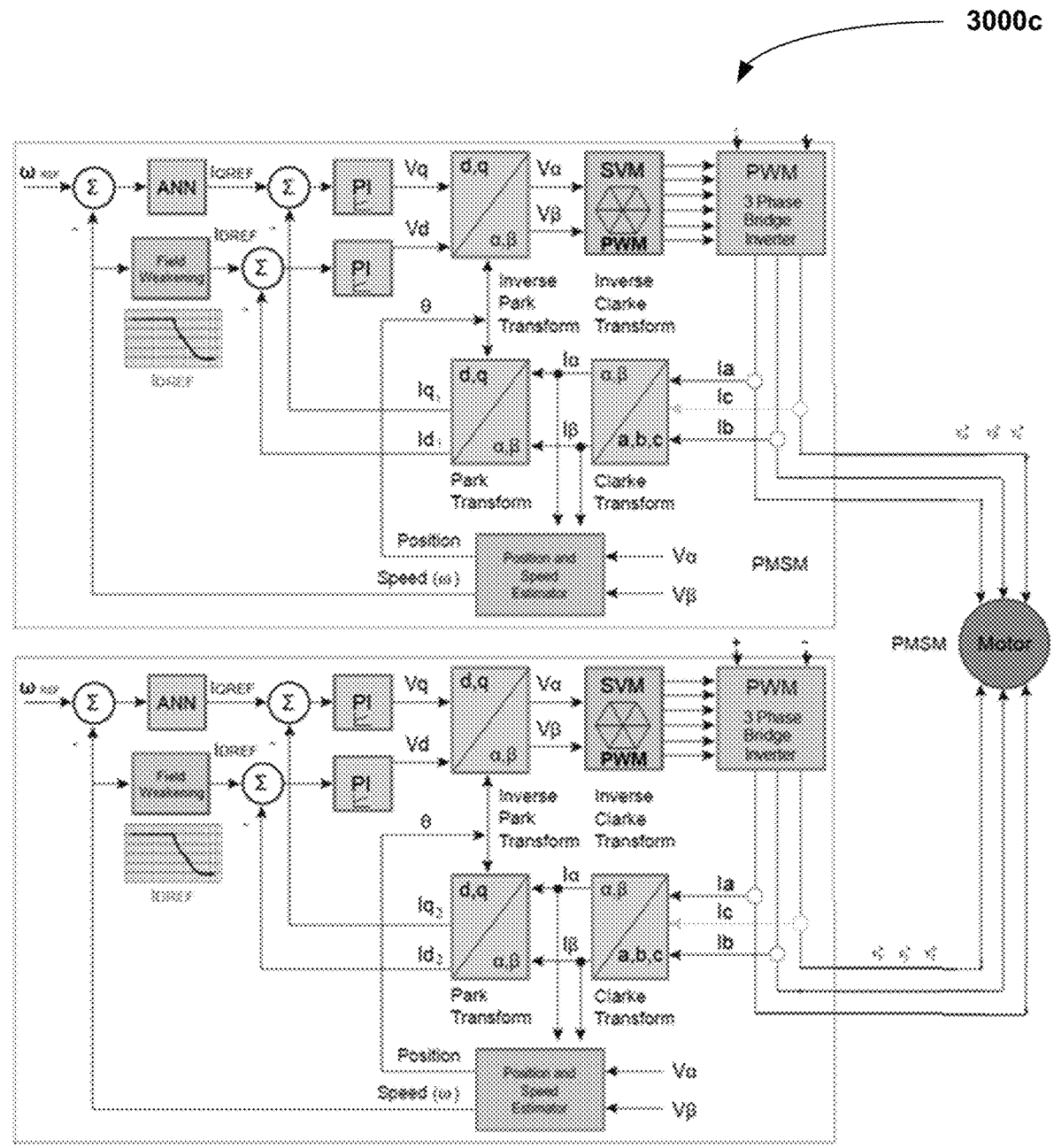
FIG. 30C illustrates, in a schematic diagram, an example of a sensorless FOC with fuzzy $I_{Q\_REF}$ controller and ANN position speed estimator for a six-phase motor, in accordance with some embodiments.

FIG. 30C illustrates, in a schematic diagram, an example of a sensorless FOC with fuzzy $I_{Q\;REF}$ controller and ANN position speed estimator for a six phase motor 3000c, a motor with six phase has less volume for the same power and better speed accuracy, in accordance with some embodiments.

Figure 30D:
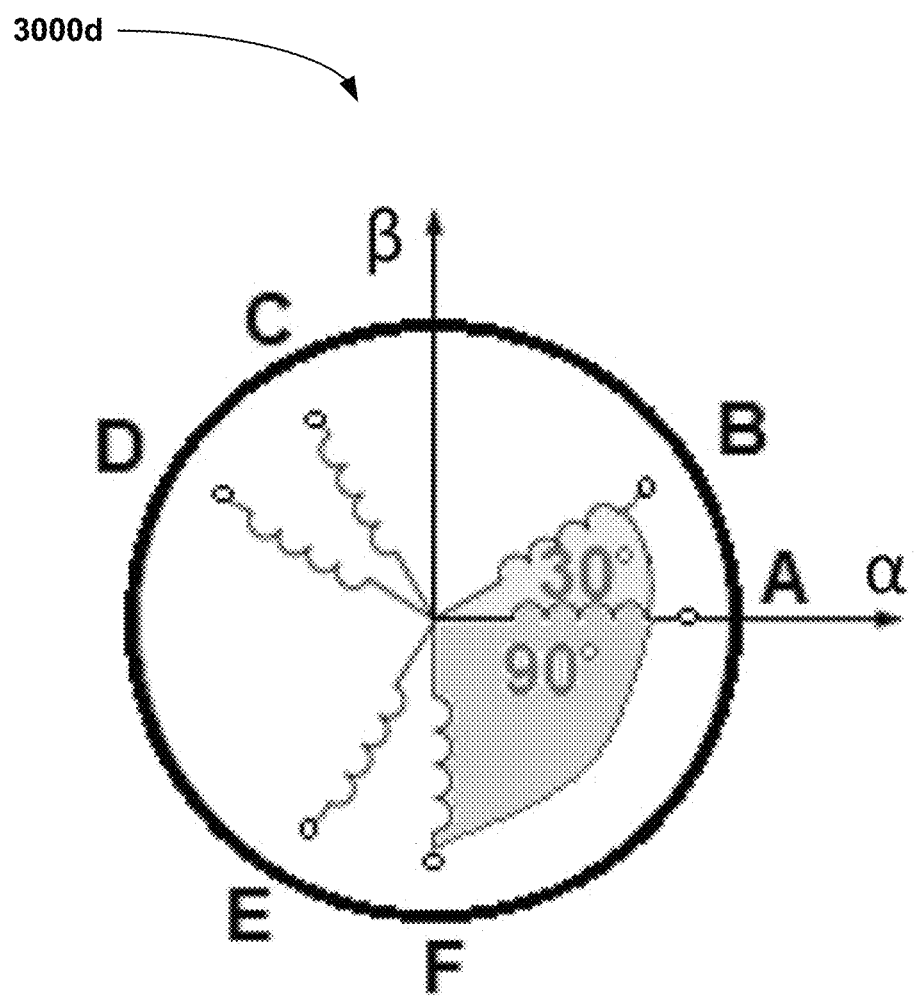
FIG. 30D illustrates, an example of a winding arrangement of a six-phase PMSM, in accordance with some embodiments.

FIG. 30D illustrates, an example of a winding arrangement of a six-phase PMSM 3000d, in accordance with some embodiments. The six-phase motor can be assimilated to dual 3-phase magnet (PM) synchronous motors having two sets of 3-phase windings spatially shifted by 30 electrical degrees.

Comparison of Control Algorithms

As described above, there are various algorithms as applied to swim spa flow control system with all motor (pumps) equal action (flow). The performance of a particular algorithm depends on many factors that may not even be modeled.

In some embodiments, the swim in place pool (swim spa) with VSP may provide energy efficiency, ANN methods/algorithms and versatility with respect to future software changes with minimal, if any, hardware changes. Variable speed pumps provide energy efficiency (see Table 2 and Table 3 below) and are adjustable. The variable speed pumps can cut the energy cost by 75% when compared to traditional single-speed pump designs that use more energy than is necessary to circulate the desired flow (wasting energy in the diverted flow). When running the water jets at any flow, variable speed pumps will use the amount of energy required to get the job done in an efficient manner possible (e.g., PMSM efficiency is 92.4% at maximum power). Artificial Neural Network (ANN) algorithms are inspired by the human brain; the artificial neurons are interconnected and communicate with each other, each connection is weighted by previous learning events and with each new input of data more learning takes place. They face any situation and chose the right action on time, any time, and every time. In some embodiments, the software based on ANN algorithms may not need maintenance, is self-learning and may improve itself.

TABLE 2

Energy Efficiency

| Pump Type | Max Flow (GPM) | Max Head (PSI) | Power Consumption (kW) | Amperage (A) | Motor Efficiency (%) | Frequency (Hz) | Comments |
|---|---|---|---|---|---|---|---|
| XP3-NA | 400 | 12 | 4.0 | 19 | 75 | 60 3450 RPM | 1.0 kW extra power 17.4% less efficient |
| XP3-EU | 290 | 9 | 3.0 | 13 | 78 | 50 2850 RPM | 15.4% less efficient |
| VSP AX | 417 | 13 | 3.0 | 13 | 92.4 | 240 3600 RPM | Max. efficiency |

The Affinity Laws state the following:
Law #1: "The flow varies directly with the speed or impeller size.
Law #2: "The head varies by the square of the speed or impeller size.
Law #3: The power varies by the cube of the speed or impeller size.
Law #4: The torque varies by the square of the speed or impeller size.

The pump Affinity Laws work two ways: the speed or the size of the pump impeller may be varied. However, with one impeller size, lays the benefit of varying the speed of the motor arises. Because of Affinity Laws the VSP pump (max. 3600 RPM) gain 17 GPM and 1 PSI vs. North American XP3 without any extra consumption (it is the effect of the plus 150 RPM).

TABLE 3

Power/Amperage

| Pump Type | Power (kW)/Amperage (A) | | | | | | | | | |
|---|---|---|---|---|---|---|---|---|---|---|
| Aqua Pro | 1 | 2 | 3 | 4 | 5 | 6 | 7 | 8 | 9 | 10 |
| XP3-NA | 4.0/19 | 4.0/19 | 4.0/19 | 4.0/19 | 4.0/19 | 4.0/19 | 4.0/19 | 4.0/19 | 4.0/19 | 4.0/19 |
| XP3-EU | 3.0/13 | 3.0/13 | 3.0/13 | 3.0/13 | 3.0/13 | 3.0/13 | 3.0/13 | 3.0/13 | 3.0/13 | 3.0/13 |
| VSP AX | 0.115/0.5 | 0.253/1.1 | 0.322/1.4 | 0.483/2.1 | 0.667/2.9 | 0.943/4.1 | 1.52/6.6 | 2.047/8.9 | 2.714/11.8 | 3.0/13 |

The variable speed motor is a permanent magnet synchronous motor (PMSM) and it is the highest efficiency AC motor—see above tables; in particular the motor used in an experimental prototype is a 3 phase motor capable to work in 50/60 Hz delivering the same performance (the swim spa NA and EU will be identical, except the pack—still need 50 Hz or 60 Hz). Note: the VFD (variable frequency drive) is capable to work in single phase or three phase covering all European country in terms of power. With a single-speed mode of operation, long time periods that would normally use full power can be replaced by long periods of substantially less power with short periods when full power may be needed. Above, Table 2 shows that the current solution requires 4 kW respective 3 kW even if the swimmer is using the speed level 5 or 6 (Aqua Pro) and in reality that could be covered with 0.667 kW or 0.943 kW, approximately 4-6 times less than current solution.

In some embodiments, the swim spa has the capability to be completely and remotely controlled from anywhere on the world using IoT (Internet of Things) technology, Internet access and a proprietary AI Application (e.g., for iOS, Android, and other operating systems).

Figure 31:
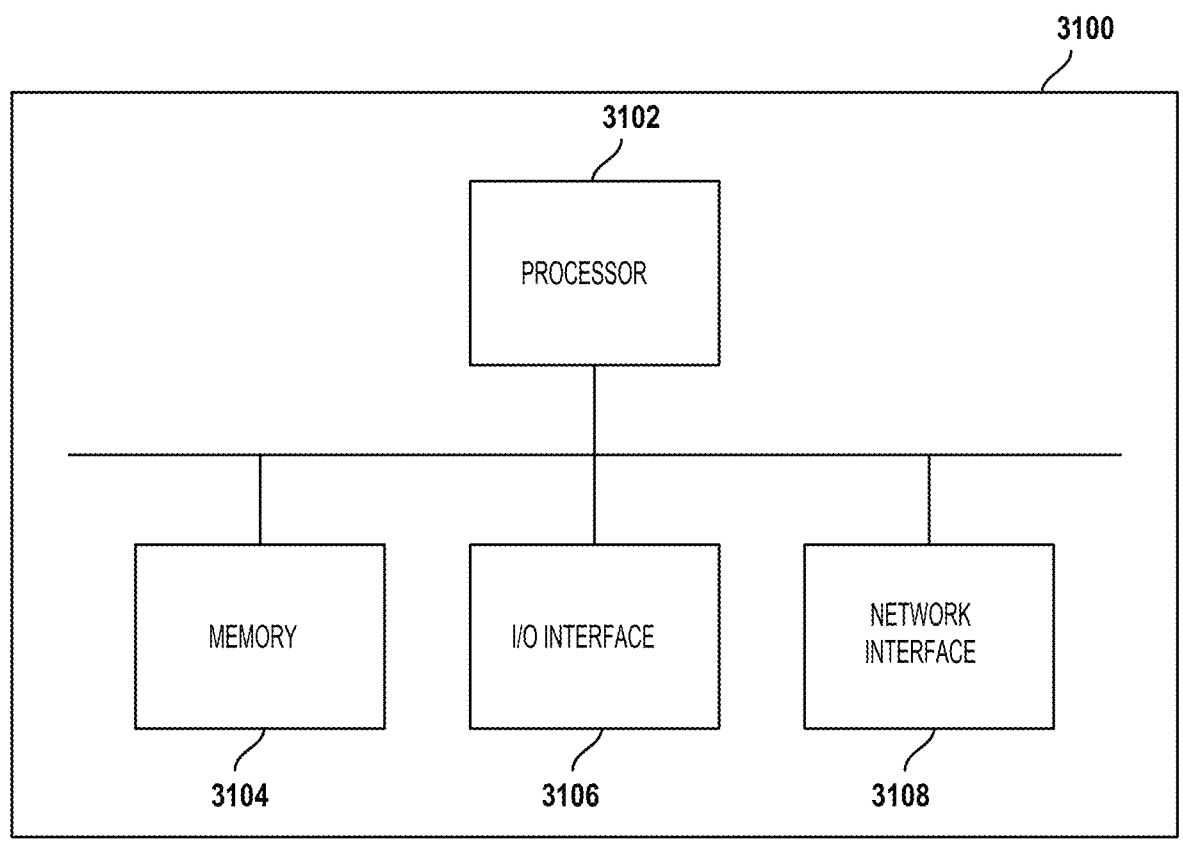
FIG. 31 illustrates, in a schematic diagram, an example of a computing device such as a server.

FIG. 31 is a schematic diagram of a computing device 3100 such as a server. As depicted, the computing device includes at least one processor 3102, memory 3104, at least one I/O interface 3106, and at least one network interface 3108.

Processor 3102 may be an Intel or AMD x86 or x64, PowerPC, ARM processor, or the like. Memory 3104 may include a suitable combination of computer memory that is located either internally or externally such as, for example, random-access memory (RAM), read-only memory (ROM), compact disc read-only memory (CDROM).

Each I/O interface 3106 enables computing device 3100 to interconnect with one or more input devices, such as a keyboard, mouse, camera, touch screen and a microphone, or with one or more output devices such as a display screen and a speaker.

Each network interface 3108 enables computing device 3100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The foregoing discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A swim in place system comprising:
   a swim in place pool;
   at least one sensor;
   at least one pump associated with said at least one sensor;
   at least one processor; and
   a memory comprising instructions which, when executed by the at least one processor, configure the at least one processor to:
      receive object location data from the at least one sensor, the object positioned in the swim in place pool;
      obtain a current angular speed of the at least one pump;
      predict a next angular speed of the at least one pump required to maintain the object within the set perimeter;
      determine a change in angular speed to apply to the at least one pump; and
      actuate the at least one pump associated with the at least one sensor when the object is positioned inside a set perimeter within said swim in place pool.

2. The swim in place system as claimed in claim 1, wherein:
   the set perimeter is an approximate center of the swim in place pool at a plane approximately at a water surface level;
   the actuated at least one pump causes a water current from a front end of the swim in place pool to a back end of a swim in place pool;
   at least one object location sensor is positioned relative to the swim in place pool to detect a location of the object; and the at least one processor is configured to adjust a revolutions per minute (RPM) of the at least one pump based on the location of the object.

3. The swim in place system as claimed in claim 2, wherein:
the set perimeter comprises at least one of:
a front end limit, or
a back end limit;
the at least one sensor comprises at least one of:
a front sensor monitoring the front end limit, or
a back sensor monitoring the back end limit; and
the at least one processor is configured to at least one of:
increase the RPM of the at least one pump when the object is near or past the front end limit, or
decrease the RPM of the at least one pump when the object is near or past the back end limit.

4. The swim in place system as claimed in claim 3, wherein:
the set perimeter comprises an average position;
the at least one sensor comprises a side sensor monitoring the average position; and
the at least one processor is configured to adjust the RPM of the at least one pump based on the location of the object relative to the average position.

5. The swim in place system as claimed in claim 1, wherein the at least one processor is configured to:
receive, from the at least one sensor, at least one of water temperature data, air humidity data, or air temperature data; and
adjust the RPM of at least one pump based on a speed setting associated with at least one of:
a water temperature setting,
an air humidity setting, or
an air temperature setting.

6. The swim in place system as claimed in claim 1, wherein the at least one processor is configured to:
store swimmer profile data; and
adjust the RPM of at least one pump based on the swimmer profile data.

7. The swim in place system as claimed in claim 1, wherein the at least one processor is configured to:
predict a future speed of the object based on a machine learning model; and
adjust the RPM of the at least one pump based on the predicted future speed of the object.

8. The swim in place system as claimed in claim 1, comprising:
a controller subsystem for controlling valve actuators and pumps of at least one circulation subsystem, said pumps comprising the at least one pump, the controller subsystem comprising:
at least one controller processor; and
a controller memory comprising instructions which, when executed by the at least one controller processor, configure the at least one controller processor to actuate at least one valve actuator and associated pump of the at least one circulation subsystem when the object is located between a corresponding sensor and a center of a basin of the swim in place pool; and
a motor drive for controlling a speed of at least one motor associated with the at least one pump, the motor drive comprising:
the at least one sensor for detecting a velocity of an object in the swim in place pool relative to one end of the basin;
at least one motor drive processor; and
a motor drive memory comprising instructions which, when executed by the at least one motor drive processor, configure the at least one motor drive processor to:
determine the velocity of the object relative to that end of the basin; and
set the speed of the at least one motor associated with that end of the basin to counter the velocity of the object.

9. The swim in place system as claimed in claim 1, wherein the at least one sensor comprises at least one of:
an electromagnetic sensor;
an infra-red transmission sensor;
a laser transmission sensor;
an ultrasonic sensor;
a time-of-flight sensor; or
a light detection and ranging sensor.

10. The swim in place system as claimed in claim 1, wherein the swim in place pool comprises:
a basin for receiving water therein, the basin having a rear end and a front end, and being adapted to receive an object;
at least one circulation subsystem having:
a primary conduit extending from an inlet located at the rear end of the basin;
a circulation conduit leading to a circulation outlet located at the front end of the basin and configured to create a swimming flow in the basin with the primary conduit inlet;
a diverter conduit having a diverter outlet leading into the basin;
a pump operable to pump water from the primary conduit inlet; and
a diverter valve connecting the primary conduit to both the circulation conduit and the diverter conduit and having a valve actuator operable to adjust the relative ratio of the water pumped from the primary conduit inlet between the circulation conduit and the diverter conduit.

11. A swim in place method comprising:
receiving object location data from at least one sensor, the object positioned in a swim in place pool;
obtaining a current angular speed of the at least one pump;
predicting a next angular speed of the at least one pump required to maintain the object within the set perimeter;
determining a change in angular speed to apply to the at least one pump; and
actuating the at least one pump associated with the at least one sensor when the object is positioned inside a set perimeter within said swim in place pool.

12. The swim in place method as claimed in claim 11, wherein the set perimeter is an approximate center of the swim in place pool at a plane approximately at a water surface level, actuating the at least one pump causes a water current from a front end of the swim in place pool to a back end of a swim in place pool, and at least one object location sensor is positioned relative to the swim in place pool to detect a location of the object; and
comprising adjusting a revolutions per minute (RPM) of the at least one pump based on the location of the object.

13. The swim in place method as claimed in claim 12, wherein the set perimeter comprises at least one of:
a front end limit, or
a back end limit;

wherein the at least one sensor comprises at least one of:
a front sensor monitoring the front end limit, or
a back sensor monitoring the back end limit; and
comprising at least one of:
increasing the RPM of the at least one pump when the object is near or past the front end limit, or
decreasing the RPM of the at least one pump when the object is near or past the back end limit.

14. The swim in place method as claimed in claim 13, wherein the set perimeter comprises an average position; wherein the at least one sensor comprises a side sensor monitoring the average position; and
comprising adjusting the RPM of the at least one pump based on the location of the object relative to the average position.

15. The swim in place method as claimed in claim 11, comprising:
receiving, from the at least one sensor, at least one of water temperature data, air humidity data, or air temperature data; and
adjusting the RPM of at least one pump based on a speed setting associated with at least one of:
a water temperature setting,
an air humidity setting, or
an air temperature setting.

16. The swim in place method as claimed in claim 11, comprising:
storing swimmer profile data; and
adjusting the RPM of at least one pump based on the swimmer profile data.

17. The swim in place method as claimed in claim 11, comprising:
predicting a future speed of the object based on a machine learning model; and
adjusting the RPM of the at least one pump based on the predicted future speed of the object.

18. The swim in place method as claimed in claim 11, wherein the at least one sensor comprises at least one of:
an electromagnetic sensor;
an infra-red transmission sensor;
a laser transmission sensor;
an ultrasonic sensor;
a time-of-flight sensor; or
a light detection and ranging sensor.

* * * * *